US006882900B1

(12) United States Patent
Terranova

(10) Patent No.: US 6,882,900 B1
(45) Date of Patent: Apr. 19, 2005

(54) FUEL DISPENSING AND RETAIL SYSTEM FOR PROVIDING CUSTOMER SELECTED GUIDELINES AND LIMITATIONS

(75) Inventor: Steven N. Terranova, Durham, NC (US)

(73) Assignee: Gilbarco Inc., Greensboro, NC (US)

( * ) Notice: Subject to any disclaimer, the term of this patent is extended or adjusted under 35 U.S.C. 154(b) by 42 days.

(21) Appl. No.: 09/671,460

(22) Filed: Sep. 27, 2000

Related U.S. Application Data

(62) Division of application No. 09/152,564, filed on Sep. 14, 1998, now abandoned.
(60) Provisional application No. 60/060,066, filed on Sep. 26, 1997.

(51) Int. Cl.[7] .............................................. G07F 17/00
(52) U.S. Cl. ...................... 700/237; 700/241; 700/242; 700/236
(58) Field of Search ............................... 700/236, 242, 700/237, 241

(56) References Cited

U.S. PATENT DOCUMENTS

| | | | |
|---|---|---|---|
| 3,536,109 A | 10/1970 | Ginsburgh et al. | 141/98 |
| 3,622,924 A | 11/1971 | Harcourt | 335/112 |
| 3,642,036 A | 2/1972 | Ginsburgh et al. | 141/94 |
| 3,650,303 A | 3/1972 | Chambers et al. | 141/1 |
| 3,786,421 A | 1/1974 | Wostl et al. | 340/149 A |

(Continued)

FOREIGN PATENT DOCUMENTS

| | | |
|---|---|---|
| GB | 2 222 714 A | 3/1990 |
| IL | 102768 | 1/1993 |
| JP | 4128186 | 4/1992 |
| JP | 6227597 | 8/1994 |
| WO | WO 94/05592 | 3/1994 |
| WO | WO 94/06031 | 3/1994 |
| WO | WO 95/14612 | 6/1995 |
| WO | WO 95/32919 | 12/1995 |
| WO | WO 96/28791 | 9/1996 |
| WO | WO 96/39351 | 12/1996 |
| WO | WO 97/24689 | 7/1997 |

*Primary Examiner*—Donald P. Walsh
*Assistant Examiner*—Michael E. Butler
(74) *Attorney, Agent, or Firm*—Withrow & Terranova PLLC

(57) ABSTRACT

The present invention provides a fuel dispensing system for setting transaction parameters in association with a remote communications unit. This system will include wireless or radio communications electronics adapted to receive signals from remote communications units, a transaction interface for carrying out transactions, and a control system and associated memory operating in conjunction with the communications electronics and a transaction interface. The control system is adapted to receive indicia from a remote communications unit and control the transaction at the transaction interface involving the remote communications unit according to predefined parameters associated with the remote communications unit. Any identification indicia and predefined parameters may be stored in the memory in association with the remote communications unit and the control system may be adapted to access these predefined parameters in the memory upon receipt of the identification indicia and control the transaction accordingly. Alternatively, the predefined parameters may be transmitted directly from the remote communications unit to the communications electronics and control system. The predefined parameters may limit a transaction to a select type or grade of fuel, a select type or amount of a product or service, as well as limiting or preventing the purchase of certain products or services. Notably, the control system may include a dispenser control system, a central site control system, a control system associated with a remote network, or a combination thereof.

14 Claims, 45 Drawing Sheets

U.S. PATENT DOCUMENTS

| | | | |
|---|---|---|---|
| 3,814,148 A | 6/1974 | Wostl | 141/98 |
| 4,263,945 A | 4/1981 | Van Ness | 141/98 |
| 4,313,168 A | 1/1982 | Stephens et al. | 364/465 |
| 4,345,146 A | 8/1982 | Story et al. | 235/381 |
| 4,469,149 A | 9/1984 | Walkey et al. | 141/94 |
| 4,490,798 A | 12/1984 | Franks et al. | 364/550 |
| 4,532,511 A | 7/1985 | Lemelson | 340/933 |
| 4,600,829 A | 7/1986 | Walton | 235/439 |
| 4,711,994 A | 12/1987 | Greenberg | 235/384 |
| 4,714,925 A | 12/1987 | Bartlett | 340/825.55 |
| 4,728,955 A | 3/1988 | Hane | 342/140 |
| 4,760,533 A | 7/1988 | Bydlon | 364/465 |
| 4,804,937 A | 2/1989 | Barbiaux et al. | 340/52 F |
| 4,834,419 A | 5/1989 | Kozaki et al. | 280/707 |
| 4,846,233 A | 7/1989 | Fockens | 141/94 |
| 4,881,581 A | 11/1989 | Hollerback | 141/113 |
| 4,887,578 A | 12/1989 | Woodcock et al. | 123/519 |
| 4,897,642 A | 1/1990 | DiLullo et al. | 340/825.06 |
| 4,967,366 A | 10/1990 | Kaehler | 364/479 |
| 5,003,472 A | 3/1991 | Perrill et al. | 364/401 |
| 5,025,253 A | 6/1991 | DiLullo et al. | 340/825.06 |
| 5,058,044 A | 10/1991 | Stewart et al. | 364/551.01 |
| 5,070,328 A | 12/1991 | Fockens | 340/825.54 |
| 5,072,380 A | 12/1991 | Randelman et al. | 364/406 |
| 5,086,389 A | 2/1992 | Hassett et al. | 364/401 |
| 5,128,862 A | 7/1992 | Mueller | 364/405 |
| 5,131,441 A | 7/1992 | Simpson et al. | 141/209 |
| 5,156,198 A | 10/1992 | Hall | 141/94 |
| 5,184,309 A | 2/1993 | Simpson et al. | 364/510 |
| 5,204,512 A | 4/1993 | Ieki et al. | 235/382 |
| 5,204,819 A | 4/1993 | Ryan | 364/465 |
| 5,217,051 A | 6/1993 | Simpson et al. | 141/59 |
| 5,218,527 A | 6/1993 | Ishikawa et al. | 364/405 |
| 5,238,034 A | 8/1993 | Corfitsen | 141/94 |
| 5,249,612 A | 10/1993 | Parks et al. | 141/219 |
| 5,249,707 A | 10/1993 | Simpson et al. | 222/40 |
| 5,253,162 A | 10/1993 | Hassett et al. | 364/405 |
| 5,267,592 A | 12/1993 | Kaplan et al. | 141/387 |
| 5,327,066 A | 7/1994 | Smith | 320/2 |
| 5,327,945 A | 7/1994 | Simpson et al. | 141/59 |
| 5,343,906 A | 9/1994 | Tibbals, III | 141/83 |
| 5,351,187 A | 9/1994 | Hassett | 364/401 |
| 5,359,522 A | 10/1994 | Ryan | 364/465 |
| 5,363,889 A | 11/1994 | Simpson et al. | 141/208 |
| 5,365,984 A | 11/1994 | Simpson et al. | 141/387 |
| 5,383,500 A | 1/1995 | Dwars et al. | 141/98 |
| 5,392,049 A | 2/1995 | Gunnarsson | 342/42 |
| 5,393,195 A | 2/1995 | Corfitsen | 414/749 |
| 5,414,427 A | 5/1995 | Gunnarsson | 342/51 |
| 5,422,624 A | 6/1995 | Smith | 340/438 |
| 5,444,742 A | 8/1995 | Grabow et al. | 375/267 |
| 5,485,520 A | 1/1996 | Chaum et al. | 380/24 |
| 5,495,250 A | 2/1996 | Ghaem et al. | 342/51 |
| 5,499,181 A | 3/1996 | Smith | 364/424.04 |
| 5,505,234 A | 4/1996 | Simpson et al. | 141/206 |
| 5,541,835 A | 7/1996 | Dextraze et al. | 364/401 |
| 5,546,523 A | 8/1996 | Gatto | 395/156 |
| 5,552,789 A | 9/1996 | Schuermann | 342/42 |
| 5,557,268 A | 9/1996 | Hughes et al. | 340/933 |
| 5,562,133 A | 10/1996 | Mitchell | 141/206 |
| 5,605,182 A * | 2/1997 | Oberrecht et al. | 141/94 |
| 5,609,190 A | 3/1997 | Anderson et al. | 141/59 |
| 5,621,411 A | 4/1997 | Hagl et al. | 342/42 |
| 5,621,412 A | 4/1997 | Sharpe et al. | 342/51 |
| 5,628,351 A | 5/1997 | Ramsey, Jr. et al. | 141/98 |
| 5,671,786 A | 9/1997 | Corfitsen | 141/94 |
| 5,717,374 A | 2/1998 | Smith | 340/438 |
| 5,859,416 A | 1/1999 | Gatto | 235/384 |
| 6,098,879 A | 8/2000 | Terranova | 235/384 |
| 6,149,055 A | 11/2000 | Gatto | 235/379 |
| 6,422,464 B1 | 7/2002 | Terranova | 235/384 |

\* cited by examiner

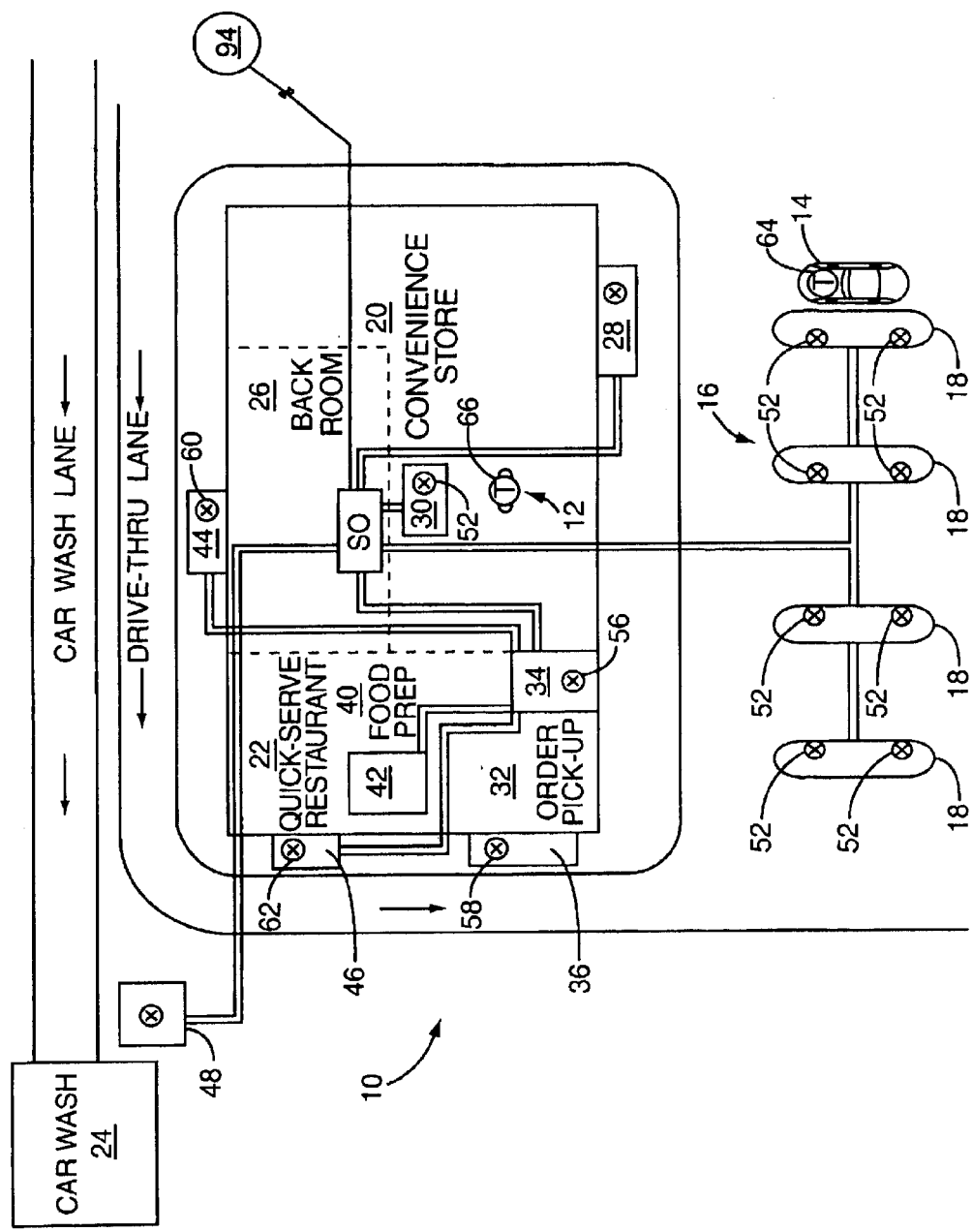

FUEL DISPENSING AND RETAIL SYSTEM FOR PROVIDING CUSTOMER SELECTED GUIDELINES AND LIMITATIONS

This is a divisional of Application Ser. No. 09/152,564, filed Sep. 14, 1998 now abandoned.

BACKGROUND OF THE INVENTION

This application claims the benefit of U.S. Provisional Application Serial No. 60/060,066, filed Sept. 26, 1997.

The present invention relates generally to fuel dispensers and, more particularly, to fuel dispensers and systems capable of communicating with various types of transponders and detecting their movement within and throughout a fueling environment.

In recent years, traditional gasoline pumps and service stations have evolved into elaborate point-of-sale (POS) devices having sophisticated control electronics and user interfaces with large displays and touch-pads or screens. The dispensers include various types of payment means, such as card readers and cash acceptors, to expedite and further enhance fueling transactions. A customer is not limited to the purchase of fuel at the dispenser. More recent dispensers allow the customer to purchase services, such as car washes, and goods, such as fast food or convenience store products at the dispenser. Once purchased, the customer need only pick up the goods and services at the station store or the outlet of a vending machine.

Remote transaction systems have evolved wherein the fuel dispenser is adapted to communicate with various types of remote communication devices, such as transponders, to provide various types of identification and information to the fuel dispenser automatically. Given the sophistication of these transaction systems and the numerous choices provided to the customer at the dispenser, conducting transactions with transponders will be useful to allow the dispenser and fuel station store to monitor the movement of a person carrying a transponder and a vehicle having a transponder, enhance transaction and marketing efficiencies, and improve safety in the fueling environment.

SUMMARY OF THE INVENTION

The present invention is a dispersing system, which cooperates with transponders to provide guidelines and limitations on transactions associated with the transponder. These may be cash, credit or debit type transactions so long as the transponder is communicably associated with the dispensing system somewhere before, during or after fueling or purchase. These guidelines and limitations on customer purchases are either stored in a database in association with a transponder ID and accessible by an associated control system or transmitted from the transponder to the dispenser during each transaction. Regardless of the manner of access, the control system will operate to carry out transactions and interest with the customer according to pre-defined guidelines and limitations.

Attempts to circumvent the guidelines or limitations will preferably result in a message to the customer or operator that the item or service presented for purchase is not available to that particular customer when the transaction is associated with the customer transponder. Uniquely, these guidelines and limitations may affect both fueling and non-fueling transactions. The guidelines and limitations may be used to set a particular dollar amount or limit what the customer associated with the transponder may spend, as well as limit the frequency and types of purchases made by the customer. Given the tremendous latitude made available with using such transponders for transactions, authorization controls provide safety and security features making the lives of those controlling the customer associated with the transponder significantly easier. The invention is also particularly useful for fleet fueling applications where drivers are limited to selected purchases and purchase amounts.

Accordingly, one aspect of the invention is to provide a fuel dispensing system for setting transaction parameters in association with a remote communications unit. This system will include wireless or radio communications electronics adapted to receive signals from remote communications units, a transaction interface for carrying out transactions, and a control system and associated memory operating in conjunction with the communications electronics and a transaction interface. The control system is adapted to receive indicia from a remote communications unit and control the transaction at the transaction interface involving the remote communications unit according to predefined parameters associated with the remote communications unit. Any identification indicia and predefined parameters may be stored in the memory in association with the remote communications unit and the control system may be adapted to access these predefined parameters in the memory upon receipt of the identification indicia and control the transaction accordingly. Alternatively, the predefined parameters may be transmitted directly from the remote communications unit to the communications electronics and control system. The predefined parameters may limit a transaction to a select type or grade of fuel, a select type or amount of a product or service, as well as limiting or preventing the purchase of certain products or services. Notably, the control system may include a dispenser control system, a central site control system, a control system associated with a remote network, or a combination thereof.

Preferably, the system includes a means for alerting the customer that a predefined parameter exists and/or has been met or exceeded. The means for alerting the customer may be anything from an audible alert to a visual indication on the display.

Typically, the communications electronics are incorporated within an interrogator associated with the dispenser and the remote communications units are classic transponders adapted to respond to interrogation signals from the dispenser with the identification indicia and any indicia relating to the parameters, if necessary.

These and other aspects of the present invention will become apparent to those skilled in the art after reading the following description of the preferred embodiments when considered with the drawings.

BRIEF DESCRIPTION OF THE DRAWINGS

FIG. 1 is a schematic representation of a fueling and retail environment constructed according to the present invention.

DETAILED DESCRIPTION OF THE PREFERRED EMBODIMENTS

Figure 2A:
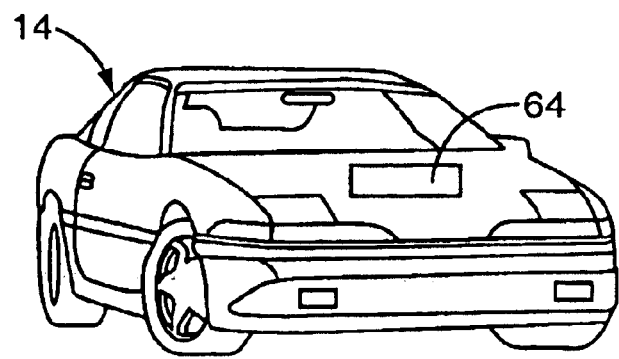
FIG. 2A depicts a vehicle having a vehicle-mounted transponder constructed according to the present invention.

In the following description, like reference characters designate like or corresponding parts throughout the several figures. It should be understood that the illustrations are for the purpose of describing preferred embodiments of the invention and are not intended to limit the invention thereto.

Given the extensive nature of the present application, an overview of the necessary hardware for the various areas in the fueling environment will be discussed followed by a description of the various functional aspects of the system and how the customer will react and interact with the system during various types of transactions.

As best seen in FIG. 1, a fueling and retail environment, generally designated 10, is shown constructed according to the present invention. The fueling and retail environment provides customers 12 the opportunity to purchase fuel for their vehicles 14 as well as other goods and services, such as fast food and car washes. The fueling and retail environment 10 may include one or more of a forecourt 16, where the fuel dispensers 18 are located, a convenience or fuel station store 20, one or more quick-serve restaurants (QSR) 22, a car wash 24, and a backroom 26. The backroom 26 is generally the central control area for integrating or coordinating control of the dispensers 18, convenience store 20, QSR 22, and car wash 24.

The convenience store 20 typically includes an inventory of a wide assortment of products, ranging from beverages and foods to household goods. The convenience store includes a transaction terminal or register 30, where a customer 12 may purchase convenience store products, fuel, car washes or QSR food.

The QSR 22 generally includes an order pick-up area 32 having a QSR transaction terminal or register 34 located within the convenience store and a drive-thru terminal and window 36. Depending on the application, the QSR transaction terminal 34 and drive-thru terminal 36 may be separated or integrated in any fashion. Usually, customers are able to place orders at the QSR transaction terminal 34 in the store as well as pick up orders in conventional drive-thru style at drive-thru terminal 36.

The QSR 22 may also include a food preparation area 40, a food preparation interface 42 for providing order instruction to QSR food preparers, a drive-thru order placement interface 44 for placing drive-thru orders in a conventional manner, and a customer position monitor 46 for determining the location or position of a customer in line to pick up a QSR order at the drive-thru window 36. Notably, the drive-thru and car wash lanes depicted in FIG. 1 are designed to control the flow of traffic through the respective lanes and aid to ensure vehicles, and their respective transponders, pass by the various interrogation points in the fueling environment as desired.

The car wash 24 includes a car wash interface 48 that interacts with the customer and controls the automatic car wash system (not shown), which may be any suitable automatic car wash. Preferably, a customer 12 will be able to order a car wash at a fuel dispenser 18, at the transaction terminal or register 30 of the convenience store 20, at the QSR transaction terminal 34, or at the car wash interface 48 directly. Similarly, customers are able to order fast-food items from the QSR 22 from various locations in the fueling environment 10, including at the fuel dispensers 18, drive-thru order placement interface 44, and the in-store QSR terminal 34.

Although various overall system and control integration schemes are available, the four major parts of the fueling environment 10—forecourt 16, convenience store 20, QSR 22 and car wash 24—typically interface at the backroom 26 using a central control system 50. The central control system 50 may include any number of individual controllers from the various parts of the fueling environment 10 to provide overall system control and integration. The central control system 50 may interface with the fuel dispensers 18, transaction terminal 30, QSR transaction terminal 34 and the car wash interface 48. Preferably the drive-thru terminal 36, drive-thru order placement interface 44 and customer position monitor 46 directly interface with the drive-thru terminal 36 in order to integrate the QSR functions prior to interfacing with the central control system 50. However, those of ordinary skill in the art will recognize several control variations capable of implementing an integrated system. Additionally, an automated vending system 28 may also interface with the central control system 50 or directly with any one of the other areas of the fueling environment 10, such as the fuel dispensers 18, in order to allow a customer 12 to purchase products from the vending system 28 at a remote location.

The present invention relates generally to providing remote communications between the customer 12 or the vehicle 14 and various parts of the fueling environment briefly described above. In short, many areas within the fueling environment 10 will be equipped with communication electronics capable of providing uni- or bi-directional communications with the customer or vehicle carrying a remote communications device. The communication electronics will typically include a transmitter for transmitting signals to the remote communications device and a receiver for receiving signals emanating from the remote communications device. The remote communications device may also include a receiver and transmitter. The transmitter and receiver of the remote communications device may separately receive and separately transmit signals in cooperation with an associated control system or may be configured so that the transmitter actually operates on and modifies a signal received from the communication electronics in the fueling environment 10. The latter embodiment encompasses traditional transponder-type communication systems wherein the remote communications device may be either passive or active.

For the sake of conciseness and readability, the term "transponder" will be used herein to describe any type of remote communications device capable of communicating with the communication electronics of the fueling environment 10. The remote communications device may include traditional receivers and transmitters alone or in combination as well as traditional transponder electronics adapted to modify an original signal to provide a transmit signal. A transponder as defined herein may provide either unidirectional or bidirectional communications with the communications electronics of the fueling environment 10.

Likewise, the communication electronics associated with the various aspects of the fueling environment 10 will be called an "interrogator." An interrogator will generally include a transmitter and receiver capable of communicating with a transponder as defined above. Please note that an interrogator, as defined herein, need not contain both a receiver and a transmitter for various aspects of the invention.

Figure 2B:
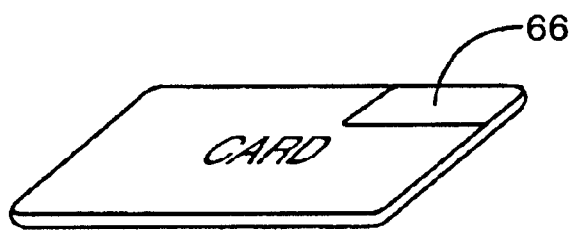
FIG. 2B depicts a personal transponder integrated into a debit/credit or smartcard constructed according to the present invention.
Figure 2C:
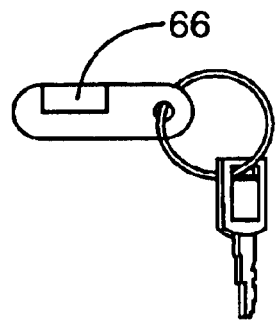
FIG. 2C depicts a personal transponder integrated into key fob constructed according to the present invention.

With the above in mind, the fueling environment 10 may include many interrogators of varying capability. These interrogators may include: dispenser interrogators 52, a store transaction interrogator 54, a QSR transaction interrogator 56, a drive-thru pick-up interrogator 58, a drive-thru order interrogator 60, and a drive-thru position interrogator 62. As shown in FIGS. 2A, 2B and 2C, the dispenser interrogator 52 is generally adapted to communicate with vehicle-mounted transponders 64 and personal transponder 66. The personal transponder 66 may be mounted on a key fob 68, a wallet card 70, or any other device typically carried by the customer 12, as shown in FIGS. 2B and 2C. FIG. 2A depicts a vehicle 14 having a vehicle-mounted transponder 64.

The levels of sophistication of the vehicle-mounted transponder 64 may vary drastically. The transponder 64 may be integrated with the vehicle's main computer and control system, or may simply be a sticker placed on a window or on another part of the vehicle. The transponder 64 may be active or passive, and may be adapted to either simply send out an identification number or carry out high-level communications and have the ability to process, store and retrieve information. Various features of the invention will be disclosed in greater detail.

Figure 3:
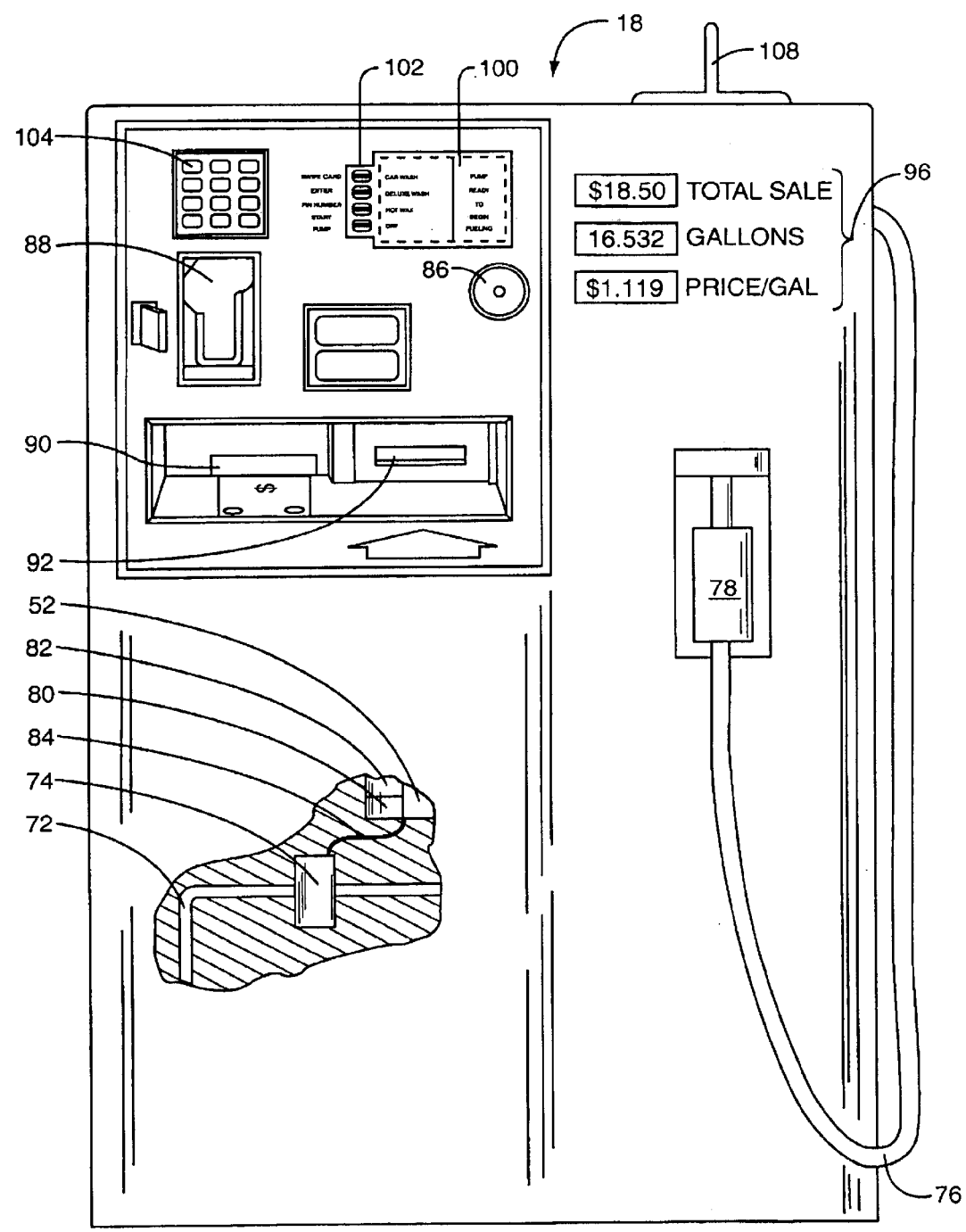
FIG. 3 depicts a fuel dispenser shown constructed according to the present invention.

As best seen in FIG. 3, a fuel dispenser 18 is shown constructed according to and as part of the present invention. The dispenser provides a fuel delivery path from an underground storage tank (not shown) to a vehicle 14, (shown in FIGS. 1 and 2A). The delivery path includes a fuel delivery line 72 having a fuel metering device 74. The fuel delivery line 72 communicates with a fuel delivery hose 76 outside of the dispenser 18 and a delivery nozzle 78. The nozzle 78 provides manual control of fuel delivery to the vehicle 14.

The dispenser 18 also includes a dispenser control system 80 having one or more controllers and associated memory 82. The dispenser control system 80 may receive volume data from the metering device 74 through cabling 84 as well as provide control of fuel delivery. The dispenser control system 80 may provide audible signals to an audio module and speaker 86 in order to provide various beeps, tones and audible messages to a customer. These messages may include warnings, instructions and advertising.

The dispenser 18 is preferably equipped with a payment acceptor, such as a card reader 88 or cash acceptor 90, along with a receipt printer 92. With these options, the dispenser control system 80 may read data from the magnetic strip of a card inserted in the card reader 88 or receive cash from a customer and communicate such information to the central control system 50 (as shown in FIG. 1), such as the G-site controller sold by Gilbarco Inc., 7300 West Friendly Avenue, Greensboro, N.C. The central control system 50 typically communicates with a remote network 94, such as a card verification authority, to ascertain whether a transaction proposed to be charged to or debited from an account associated with the card inserted in the card reader 88 is authorized.

The dispenser 18 will include one or more types of displays, preferably one or more alpha-numeric displays 96 together with a high-resolution graphics display 100. The graphics display 100 will generally have an associated key pad 102 adjacent to the display or integrated with the display to provide a touch interface. The dispenser may include an additional, auxiliary key pad 104 associated with the card reader 88 for entering secret codes or personal identification numbers (PIN's). Notably, the displays 96, 100 and key pads 102, 104 may be integrated into a single device and/or touch interface. The dispenser control system 80 is preferably comparable to the microprocessor-based control systems used in CRIND (card reader in dispenser) and TRIND (tag or transponder reader in dispenser) type units sold by Gilbarco Inc. under the trademark THE ADVANTAGE.

As noted, the dispenser control system 80 may include or be associated with dispenser communication electronics referred to as interrogator 52 for providing remote unidirectional or bidirectional communications between a transponder and the dispenser. These transponders may incorporate the Micron Microstamp™ produced by Micron Communications, Inc., 8000 South Federal Way, Boise, Id. 83707-0006. The Micron Microstamp™ engine is an integrated system implementing a communications platform referred to as the Microstap™ standard on a single CMOS chip. A detailed description of the Microstamp™ engine and the method of communication is provided in its data sheets in the Micron Microstamp™ Standard Programmers Reference Manual provided by Micron Communications, Inc. These references and the information provided by Micron Communications on their web site at http://www.mncc.micron.com are incorporated herein by reference. Although the preferred communications method includes radio frequencies in the microwave range, these communications may include infrared, acoustic or other known remote communication methods acceptable for use in a fueling environment. Additionally, the dispenser 18 may include one or more antennas 108 associated with the dispenser interrogator 52.

Figure 4A:
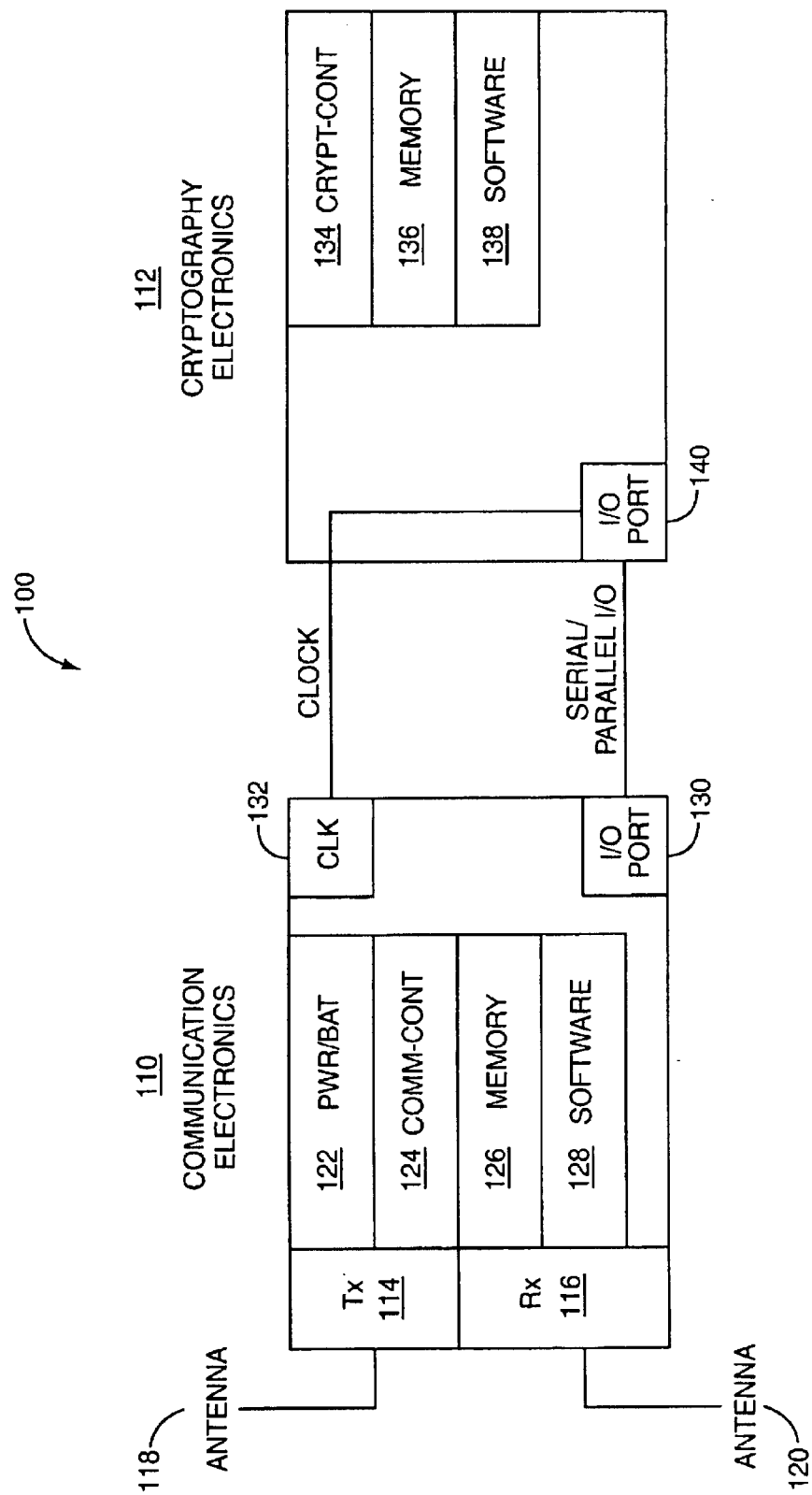
FIG. 4A is a schematic representation of a transponder having separate communication and cryptography electronics constructed according to the present invention.

Turning now to FIG. 4A, the preferred embodiment of a transponder is shown. Transponder communication electronics 110, adapted to provide remote communications with the various interrogators, include a transmitter 114 and receiver 116 having associated antennas 118, 120. The transmitter 114 and receiver 116 operate to transmit and receive data to and from an interrogator. The communication electronics 110 may include a battery power supply 122, a communication controller 124 associated with a memory 126, having software 128 necessary to operate the communication electronics 110 and optional cryptography electronics 112.

Serial communications between the communication electronics 110 and cryptography electronics 112 is provided via the input/output (I/O) ports 130, 140 associated with the respective electronics. The communication electronics 110 provide a signal from a clock 132 to the I/O port 140 of the cryptography electronics 112. The cryptography electronics 112 include a controller 134, memory 136 and software 138 necessary to encrypt and decrypt data, as well as provide any additional operations. The memory 126, 136 may include random access memory (RAM), read only memory (ROM), or a combination thereof. Notably, the communication controller 124 and the cryptography controller 134 may be integrated into one controller. Similarly, the software and memory of the communication and cryptography modules may be integrated or embodied in hardware.

Figure 4B:
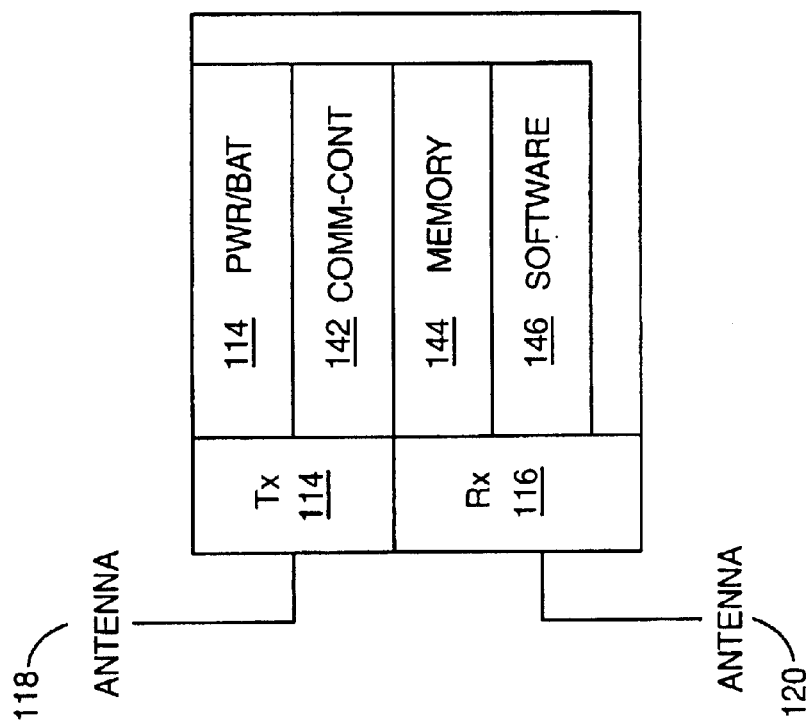
FIG. 4B is a schematic representation of transponder having integrated electronics constructed according to the present invention.

As shown in FIG. 4B, the communication and cryptography electronics, as well as any associated controllers, may be integrated into a single controller system and/or integrated circuit. In such cases, a single controller 142 is associated with memory 144 having software 146 as necessary for operation. In such an integrated system, the controller 142 will carry out any cryptography functions as well as any other functions necessary for operation.

In the preferred embodiment, the communications controller 124, 142 specifically provides a spread-spectrum processor associated with an 8-bit microcontroller. The memory 126, 144 includes 256 bytes of RAM. The receiver 116 operates in conjunction with the spread-spectrum processor and is capable of receiving direct sequence, spread-spectrum signals having a center frequency of 2.44175 GHz. The transmitter 114 is preferably a DPSK modulated back-scatter transmitter transmitting differential phase shift key (DPSK) modulated back scatter at 2.44175 GHz with a 596 KHz sub-carrier. The various interrogators in the fueling environment 10 are adapted to receive and transmit the signals to properly communicate with the transponders. For additional information on a transponder/interrogator system providing for highly secure transactions between a transponder and a host authorization system through a dispenser, attention is drawn to application Ser. No. 08/895,417 filed Jul. 16, 1997, entitled CRYPTOGRAPHY SECURITY FOR REMOTE DISPENSER TRANSACTIONS in the name of William S. Johnson, Jr.; application Ser. No. 08/895,282 filed Jul. 16, 1997, entitled MEMORY AND PASSWORD ORGANIZATION FOR REMOTE DISPENSER TRANSACTIONS in the name of William S. Johnson, Jr.; and application Ser. No. 08/895,225 filed Jul. 16, 1997, entitled PROTOCOL FOR REMOTE DISPENSER TRANSACTIONS in the name of William S. Johnson, Jr. The disclosures of these applications are incorporated herein by reference.

Figure 5:
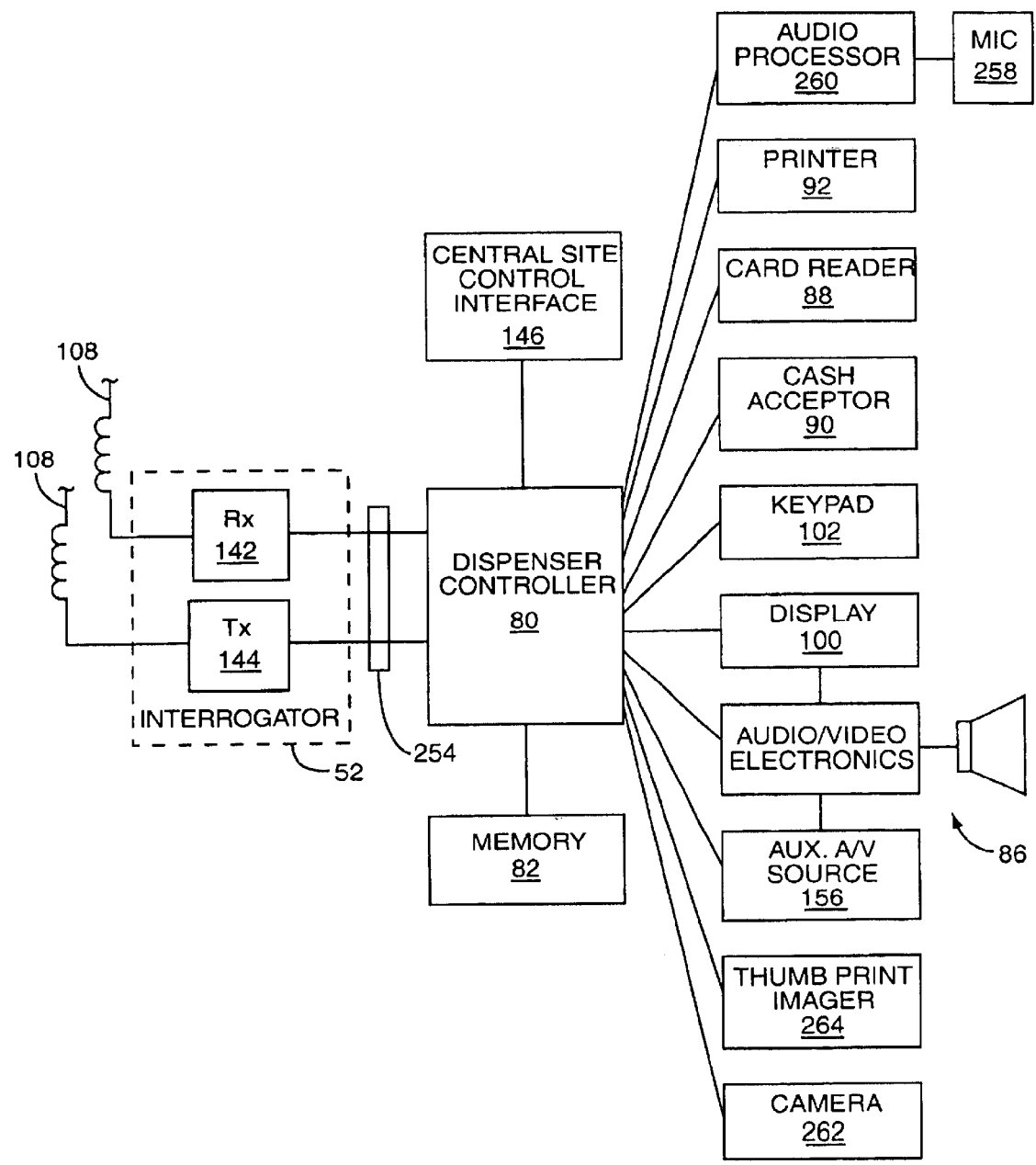
FIG. 5 is a schematic representation of fuel dispenser electronics constructed according to the present invention.

FIG. 5 shows a basic schematic overview of the dispenser electronics wherein a dispenser control system 80 includes a controller associated with the memory 82 to interface with the central control system 50 through an interface 146. The dispenser control system 80 provides a graphical user interface with key pad 102 and display 100. Audio/video electronics 86 is adapted to interface with the dispenser control system 80 and/or an auxiliary audio/video source 156 to provide advertising, merchandising and multimedia presentations to a customer in addition to basic transaction functions. The graphical user interface provided by the dispenser allows customers to purchase goods and services other than fuel at the dispenser. The customer may purchase a car wash and/or order food from the QSR while fueling the vehicle. Preferably, the customer is provided a video menu at the display 100 to facilitate selection of the various services, goods and food available for purchase. The card reader 88 and cash acceptor 90 allow the customer to pay for any of the services, goods or food ordered at the dispenser while the printer 92 will provide a written record of the transaction. The dispenser control system 80 is operatively associated with a dispenser interrogator 52, which has a receiver 142 and a transmitter 144. The receiver and transmitter typically associate with one or more antennas 108 to provide remote communications with a transponder. The dispenser control system 80 communicates with the central control system 50 in the backroom 26.

Figure 6:
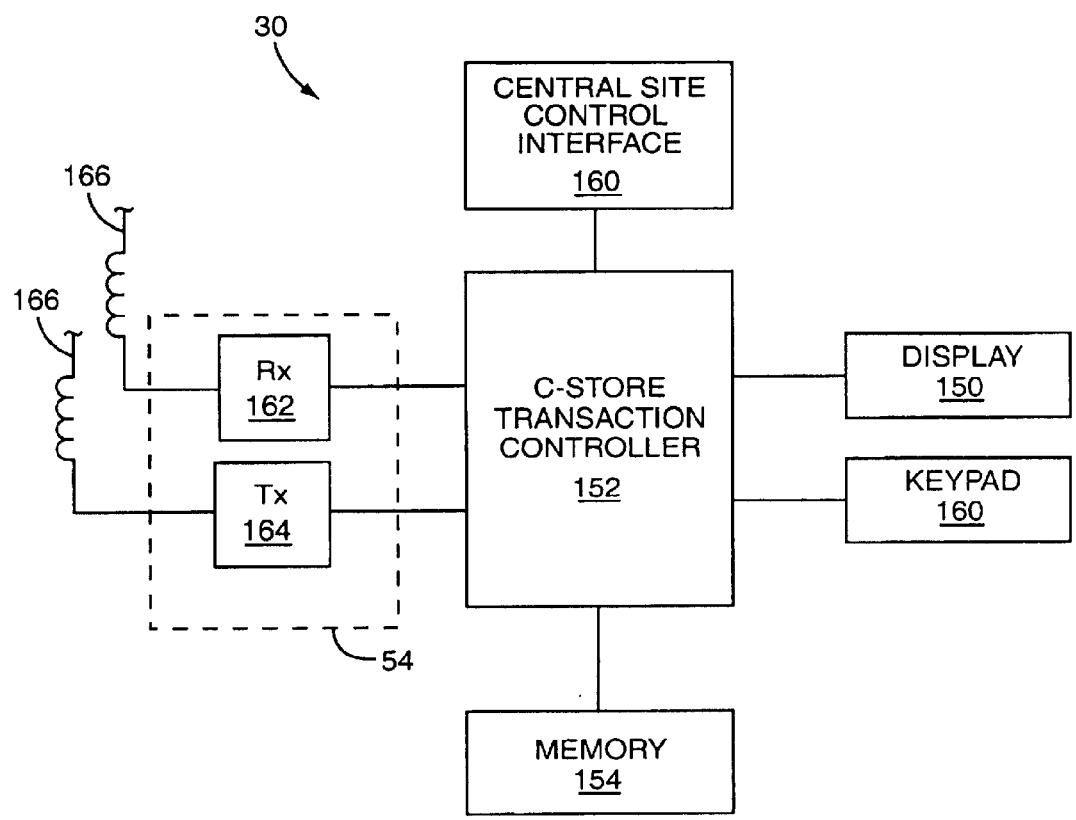
FIG. 6 is a schematic representation of convenience store transaction electronics, including a transaction terminal, for a fueling environment constructed according to the present invention.

In like fashion, the convenience store transaction electronics shown in FIG. 6, and more specifically the transaction terminal register 30, include a store transaction controller 152, associated memory 154, the interrogator 54, and a display and key pad 150, 160 forming a transaction terminal interface. The transaction controller 152 interacts with the central control system 50 through the central site control interface 160. The interrogator 54 includes a receiver 162 and a transmitter 164, both of which are associated with one or more antennas 166. The transaction terminal 30 is adapted to provide typical transaction functions of a cash register and a card authorization terminal in addition to communicating with transponders within the store and/or proximate to the terminal. The communications between the transponder and the store transaction terminal are generally related to transactional and customer identification and monitoring, although other features will become apparent to those skilled in the art upon reading this disclosure.

Figure 7:
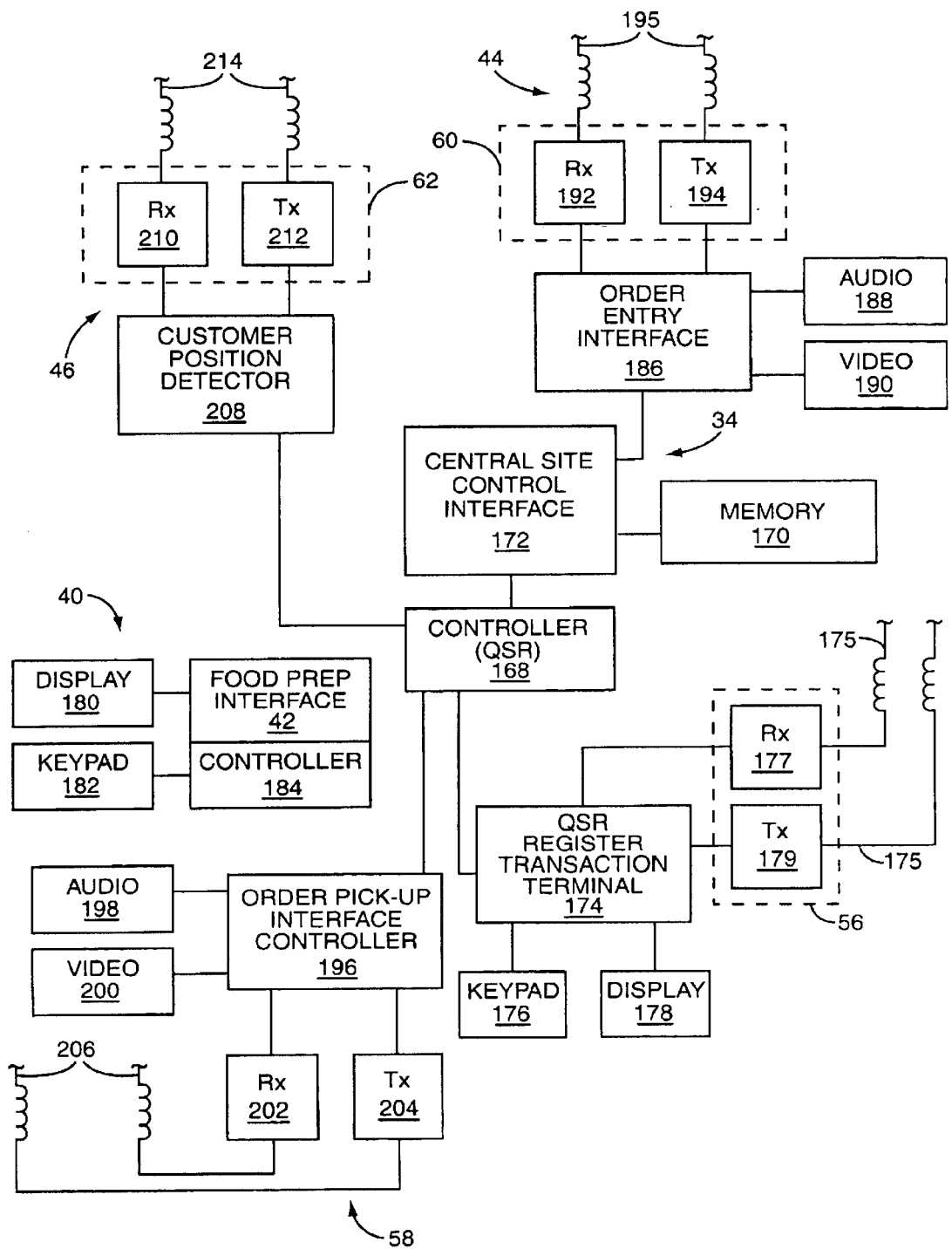
FIG. 7 is a schematic representation of a quick-serve restaurant control system for a fueling environment constructed according to the present invention.

Attention is now drawn to FIG. 7 and the schematic outline of the QSR electronics shown therein. The QSR will generally have a controller 168 and associated memory 170 capable of interfacing with the central control system 50 through a central site control interface 172. As with many QSR's, a transaction terminal or register 174 is provided having a key pad 176 and display 178. The QSR transaction terminal 174 is used by a QSR operator to take customer orders from within the store in conventional fashion. The orders are either verbally or electronically communicated to the food preparation area 40 through the QSR controller 168. The QSR transaction terminal 174 is associated with interrogator 56 having a receiver 177 and a transmitter 179 associated with one or more antennas 175. The food preparation area will typically have a food preparation interface 42 having a display 180 and a key pad 182. The food preparation interface 42 may be a terminal run from the QSR controller 168 or may contain a food preparation controller 184 within the food preparation interface 42. However the system is arranged, order information is passed from one of the order interfaces to the food preparation display 180 to alert food preparers of an order.

In a QSR embodiment providing drive-thru capability, a remote order entry interface 186 is provided. The order entry interface 186 may include a simple menu board and audio intercom system 188, or in a more sophisticated embodiment, may provide for bi-directional video intercom using the audio intercom 188 and a video system 190 allowing the customer and QSR operator to audibly and visually interact with one another during order placement.

The order entry interface i 86 may also include an interrogator 60 having a receiver 192 and a transmitter 194, associated with one or more antennas 195, for communicating with a transponder of a customer when the customer is placing an order at the order entry interface 186.

Typically, orders placed at the order entry interface 186 are sent to the order pickup interface 196, which is normally situated proximate to the pick-up window 36 at the end of the drive-thru lane. The order pick-up interface 196 will have an audio system 198 to provide the audio intercom and an optional video system 200 if video intercom with the order entry interface 186 is desired. The order pick-up interface 196 also has an associated interrogator 58 having a receiver 202 and a transmitter 204 associated with one or more antennas 206.

Unlike existing QSR's, the present invention may include a customer position detector 208, preferably placed somewhere along the drive-thru lane to detect when a customer is at or is past that position en route to pick up an order, which may have been placed at a fuel dispenser 18. The customer position detector 208 is associated with the drive-thru position interrogator 62 and includes a receiver 210 and a transmitter 212 associated with one or more antennas 214.

Figure 8:
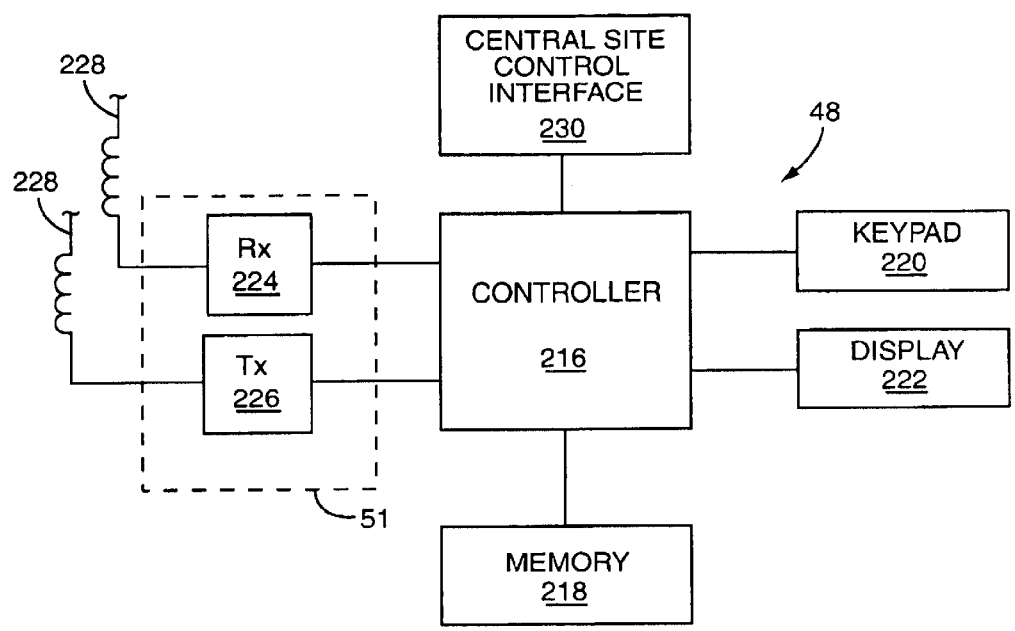
FIG. 8 is a schematic representation of a car wash control system constructed according to the present invention.

FIG. 8 depicts the basic outline of the car wash electronics, which includes a controller 216, memory 218, a key pad 220, a display 222 and the interrogator 51. The key pad 220 and display 222 combine with the controller 216 to provide a customer interface 48. The interrogator 51 includes a receiver 224 and a transmitter 226 associated with one or more antennas 228. Additionally, the car wash controller 216 preferably communicates with the central control system 50 in the store via a central site control interface 230. The interrogator 51 will typically communicate with a customer transponder to automatically authorize a car wash previously paid for at the dispenser or inside the store. The key pad may be used to insert a secret code or other information to select a type of wash or otherwise authorize the car wash.

Figure 9:
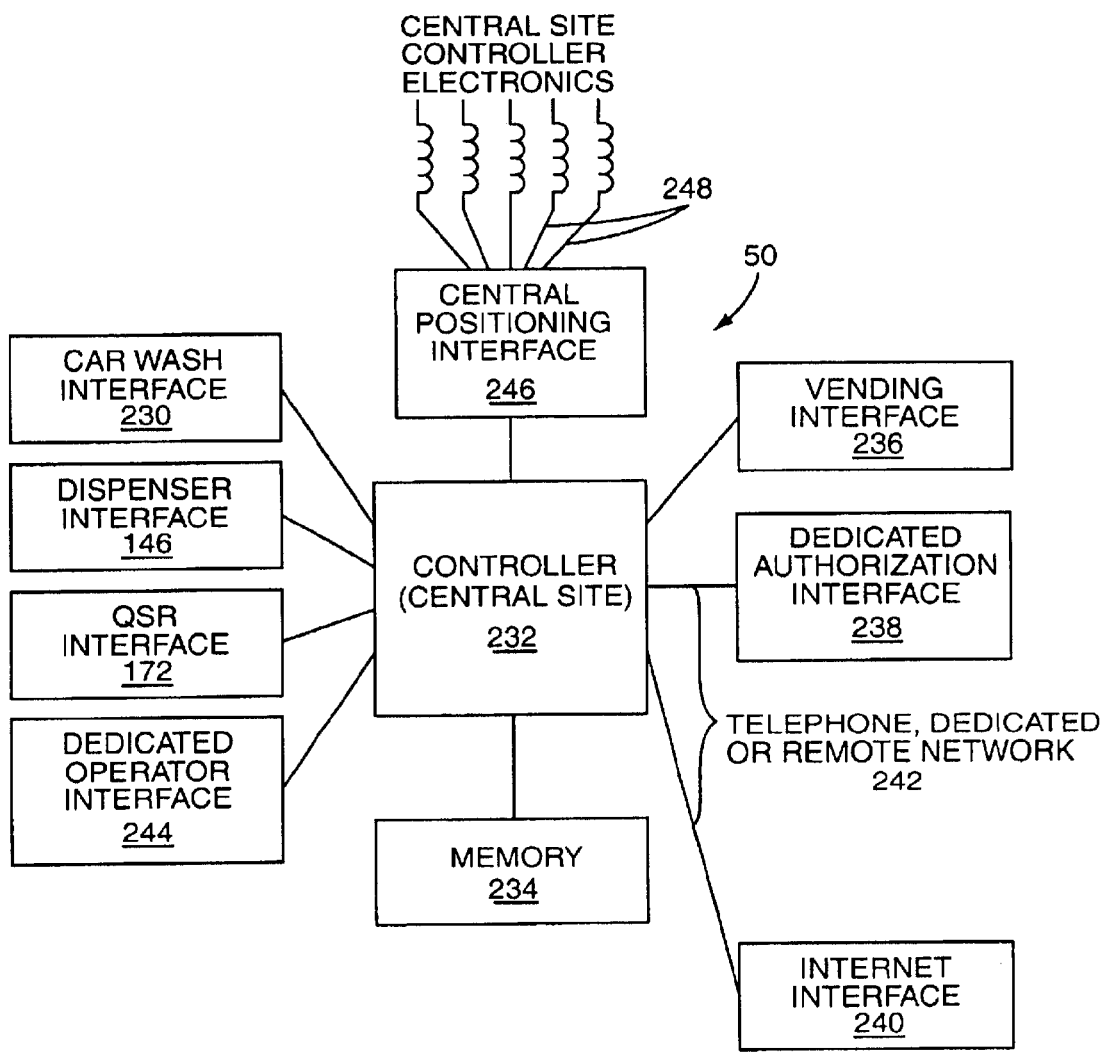
FIG. 9 is a schematic representation of a central control system for a fueling environment constructed according to the present invention.

FIG. 9 generally depicts the central control system 50 found in the backroom 26 of the fueling environment 10. The central control system 50 may include one or more controllers 232 associated with memory 234. The central control system 50 may include multiple interfaces with the various areas in the fueling environment 10. These interfaces include the car wash interface 230, dispenser interface 146, QSR interface 172 and the vending interface 236 connected to an automated vending machine 28. Additionally, the central controller 232 may have a dedicated network or authorization interface 238 connected to a host transaction network 94 for authorizing credit and debit transactions and the like. An Internet interface may also be provided for transactions and other information relating to operation, advertising, merchandising and general inventory and management functions.

The dedicated authorization interface and/or Internet interface may operate on a dedicated service line or a telephone system 242. Furthermore, the central control system 50 may have a direct operator interface 244 associated with the controller 232 to allow an operator to interact with the control system. In more advanced embodiments, a central positioning interface 246 associated with multiple antennas 248 may be used to determine transponder position and location throughout the fueling environment. Those skilled in the art will be aware of a multitude of positioning and locating techniques, such as triangulation, wherein various characteristics of a signal emitted from the transponder are measured and monitored to determine movement as well as precise location. The antennas 248 associated with the central positioning interface 246 may take the place of or act in conjunction with the various antennas throughout the fueling environment to locate and monitor movement of the transponders in the fueling environment. Attention is drawn to application Ser. No. 08/966,237 entitled TRANSPONDER DISTINCTION IN A FUELING ENVIRONMENT-filed Nov. 7, 1997, in the name of William S. Johnson, Jr. and application Ser. No. 08/759,733 filed Dec. 6, 1996, entitled INTELLIGENT FUELING in the name of Hartsell, et al. The entire disclosure of these two patent applications is incorporated herein by reference.

Multistage Ordering

One of the many unique aspects of the present invention is providing for monitoring customer position throughout the fueling environment in order to associate orders placed at the fuel dispenser with the particular customer that placed the order at the appropriate receiving point, such as the QSR drive-thru terminal and window 36, QSR transaction terminal 34 in the store, or, in the case of a car wash, at the car wash interface 48. In addition to associating the customer picking up the order with the appropriate order, the QSR can monitor or detect the position of the customer in the drive-thru line or elsewhere in the fueling environment to determine when to start order preparation.

For example, during the fueling operation, the customer may decide to order a few items from the QSR menu displayed at the dispenser 18. As the customer enters the order, the order is associated with the transponder carried by the customer or mounted on the customer's vehicle. The customer may choose to pay for the order along with the fuel at the dispenser, at the order pick-up place at the drive-thru window, or at one of the in-store registers associated with the QSR or the convenience store. Continuing with our example and assuming the transaction was paid for at the dispenser along with the fuel, the customer will enter his vehicle and proceed to drive around the fuel station store along the drive-thru lane and pass the customer position monitor 46. As the customer approaches the customer position monitor 46, the drive-thru position interrogator 62 will receive a signal from the customer transponder indicating the customer is at a known position in the drive-thru lane. At this point, the QSR control system 168 will alert the food preparation area 40 to prepare the order and indicate to the order pick-up interface and controller 196 the position of the customer in the drive-thru lane. Once the customer reaches the order pick-up window, the order pick-up interrogator will determine the presence of the customer transponder and associate the customer's order accordingly so that the drive-thru window operator can deliver the freshly prepared order to the correct customer. Associating the customer with the appropriate order in a fueling environment having a QSR is quite different from traditional QSR drive-thru systems. With QSR's in a fueling environment, orders for pick up at the drive-thru window, or within the store for that matter, may be placed in a different sequence than the sequence in which the orders are actually picked up. The reason for the possible discrepancy between order placement and order pick up arises because orders can be placed at several locations, including the fuel dispenser and the traditional order entry interface 44. In particular, those customers placing orders at the dispenser will most likely intermingle in the drive-thru line with those placing orders at the order entry interface 44. The present invention uses transponders to appropriately associate orders placed at different locations with the appropriate customer at a common pick-up location.

Figure 10A:
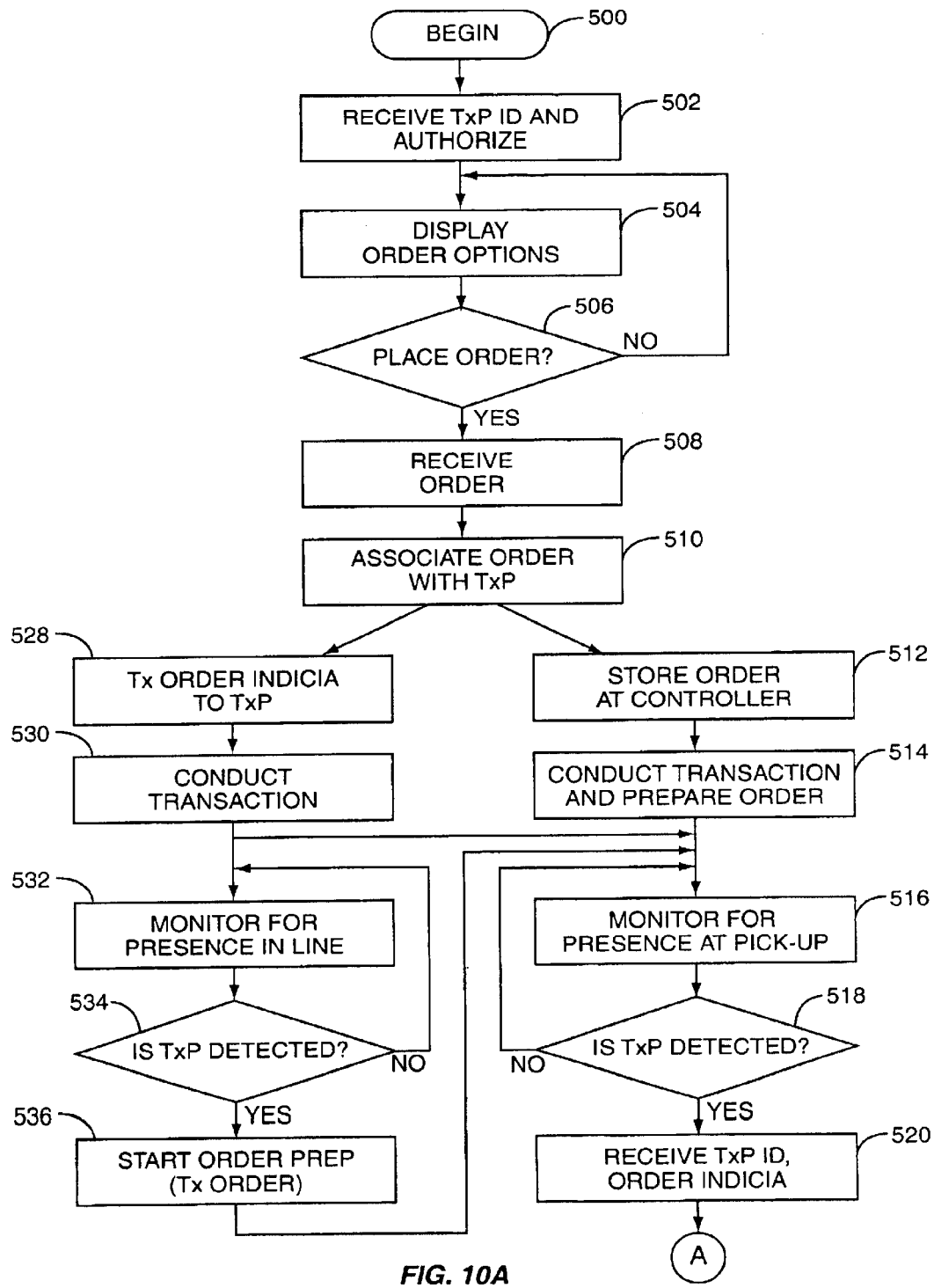
FIGS. 10A and 10B are a flow chart representing a basic flow of a multistage ordering process according to the present invention.
Figure 10B:
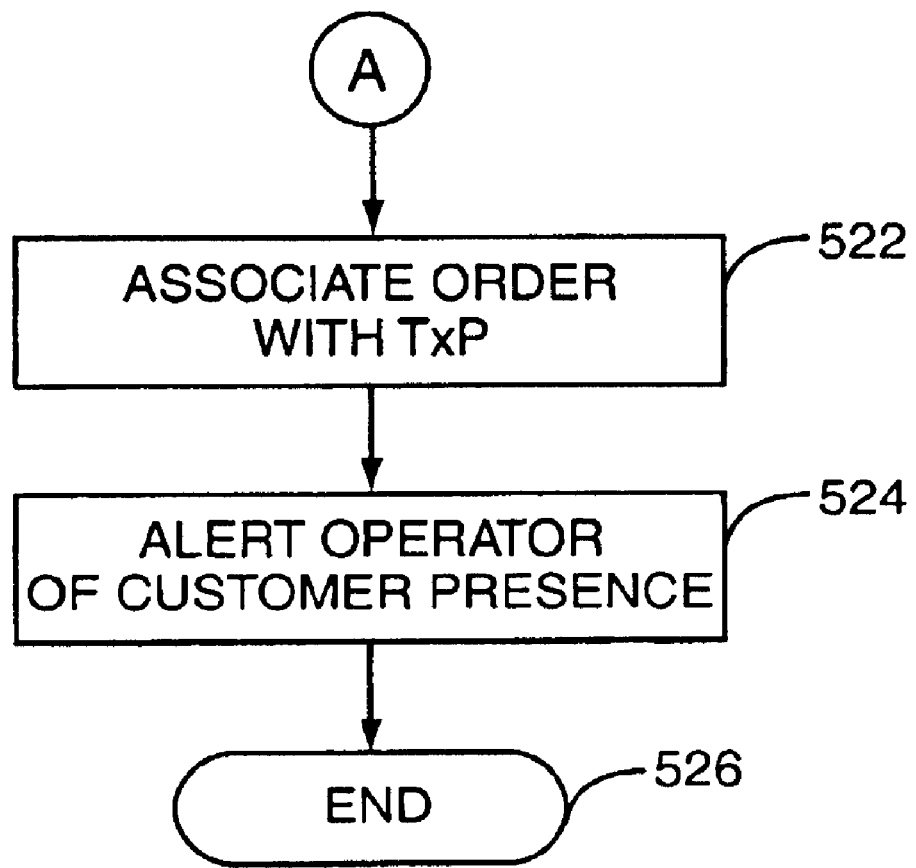

With this in mind, attention is drawn to the flow chart of FIGS. 10A and 10B representing the basic flow of various multistage ordering processes. The process begins (block 500) when the dispenser interrogator 52 receives a signal from a transponder 12, 14 and the dispenser control system 80 forwards transponder identification indicia (ID) to the central control system 50 for authorization (block 502). Authorization may occur locally at the central site controller 232 or at a remote host authorization network. The information to be authorized is generally financial or account information and can either be transmitted with the transponder ID or stored at the central control system 50 or the host network 94 in association with the transponder ID. In the latter case, either the host network 94 or the central control system 50 will associate the ID with the stored account information and then authorize the transponder based on the correlated account information. Preferably, the transponder is read and authorized as the customer and/or vehicle approaches or initially stop's at the fueling position and preferably, at least, before a transaction is initiated to increase transaction efficiency. As the customer fuels the vehicle, the dispenser may display various types of information including advertising and instructional information. Preferably, the dispenser 18 will display options for ordering food items from the QSR or ordering a car wash at the car wash 24 (block 504). The dispenser 18 will determine whether an order is placed (block 506). The dispenser 18 will receive any orders placed by the customer (block 508) and associate the order with the transponder in some fashion (block 510). Typically, the order is associated with a transponder by (1) associating the order with the transponder ID at one of the control. systems, (2) transmitting and storing a code associated with the order on the transponder, or (3) actually storing the order on the transponder. Those of ordinary skill in the art will recognize that there are many variations available for associating an order with a transponder. These variations are considered within the scope of this disclosure and the claims that follow.

Although there are various options, two general methods for associating an order with a transponder will be discussed below. With the first, no information is transmitted to the transponder relating to the order. Instead, the electronics at the dispenser 18, central control system 50 or the QSR 22 stores the order information and associates the order with the transponder ID. When one of the interrogators subsequently reads the transponder ID, the pertinent system will correlate the order with the transponder ID. The second method involves writing information to the transponder at the dispenser 18 and subsequently transmitting that information to one of the system interrogators for authorization or order identification. The information written to the transponder may range from a code for identification authorization purposes to the complete order placed at the dispenser.

Returning to FIG. 10A, the basic flow of both of the above-discussed methods are shown. In cases where one of the control systems associates an order based on the transponder ID, the customer order is transferred to the QSR controller 108 through the central control system 50 (block 512). The dispenser 18 will effect payment for the transaction (typically adding the QSR purchase total to the fueling charge) and the QSR controller 168 will alert the food preparation area to prepare the order (block 514).

In a basic environment, the QSR order pick-up interface 198 will monitor for the presence of a transponder through the drive-thru pick-up interrogator 58 or the in-store QSR transaction terminal interrogator 56 (block 516). If a transponder is not detected, the systems continue to monitor for a transponder (block 518). Once a transponder is detected, the transponder ID is received (block 520) and the transponder ID is associated with the appropriate order (block 522). At this point, the QSR operator located at the pick-up window or the in-store transaction terminal is informed of the order corresponding to the customer at the window or terminal (block 524) and the fueling and retail transaction for that particular customer ends (block 526).

Alternatively, once a customer places an order and the dispenser 18 receives the order (block 508), and the order is associated with the transponder (block 510), the dispenser 18 may transmit order indicia, such as a code for the order itself, to the transponder for storage (block 528). Next, the dispenser 18 will effect payment for the transaction as discussed above (block 530). In the more basic embodiment discussed above, the QSR interrogators associated with the QSR window or in-store terminal will monitor for the presence of a transponder (block 516 and 518), receive the transponder order indicia (block 518), and associate the order with the indicia received from the transponder (block 522). The operator is then informed of the order for that particular customer (block 524).

In any of the above embodiments, the customer position detector 46 may be used to alert QSR operators of the approach and location in the drive-thru line of a particular customer. For the sake of clarity, the process of FIG. 10A only depicts using the customer position detector 46 in a process where order indicia is transmitted to the transponder. Please note that using the customer position detector 46 may be used in any of the embodiments, as those of ordinary skill in the art will appreciate.

Once the order is placed, received and associated with the transponder in normal fashion (blocks 500–510), indicia of the order is transmitted to the transponder (block 528) and the transaction is effected (block 530) in normal fashion. At this point, the customer position detector 46 will monitor for the presence of a transponder via the interrogator 62 (blocks 532 and 534). Once a transponder is detected, the customer position detector 46 will forward the transponder indicia to the food preparation area 40 through the QSR controller 108. This allows for the food preparation operators to timely prepare a customer order based on the customer's approach to the pick-up window (block 536). This information may also be sent to the pick-up operator to indicate customer position. The customer will proceed along the drive-thru lane until the pick-up window is approached where the transponder is detected by the order pick-up interrogator 58 (blocks 516 and 518). The transponder ID or indicia is received by the QSR electronics, and the operator is informed of the order corresponding to the customer at the window (blocks 522–526).

Although there are numerous variations to multistage ordering, the important aspects of the invention are associating a transponder with an order placed by a customer at the fuel dispenser and subsequently using information from the transponder to reassociate the order with that particular transponder. Optionally, an additional interrogation stage may provide a further alert to a QSR operator of the approach of a customer to initiate food preparation or simply indicate the position of the customer in line.

The multistage ordering works equally well with QSR's and car wash systems. When a car wash is ordered at the dispenser, the particular car wash ordered is associated with the transponder at the dispenser and subsequently reassociated when the customer approaches the car wash area 24 and is interrogated by the car wash interrogator 51. In the preferred embodiment, the dispenser operates in conjunction with the central control system 50 to provide authorization of the car wash purchased at the dispenser. When the customer is at the car wash 24, the customer's transponder is interrogated for an ID or a code, which the car wash controller and/or the central control system 50 recognizes as preauthorized. If additional security is necessary on any of these embodiments, the customer may receive a code or other indicia, which they are required to enter or submit when the corresponding goods or services are received.

Furthermore, the fuel dispenser 18 is not the only point of sale where ordering may take place. A customer having a transponder may, for instance, order a car wash in conjunction with placing an order at the in-store QSR terminal or the convenience store terminal while purchasing food or other merchandise. The interrogators at either of these terminals can just as easily associate the car wash with the customer transponder and operate through the central control system 50 to subsequently reassociate the customer and the car wash ordered at the car wash interface 48. The multistage ordering disclosed herein provides a solution for keeping track of various transactions in a fueling environment where customer orders are picked up in locations separate from where they are placed and very likely may not be picked up in the order they were placed.

Loyalty Benefits

Figure 10C:
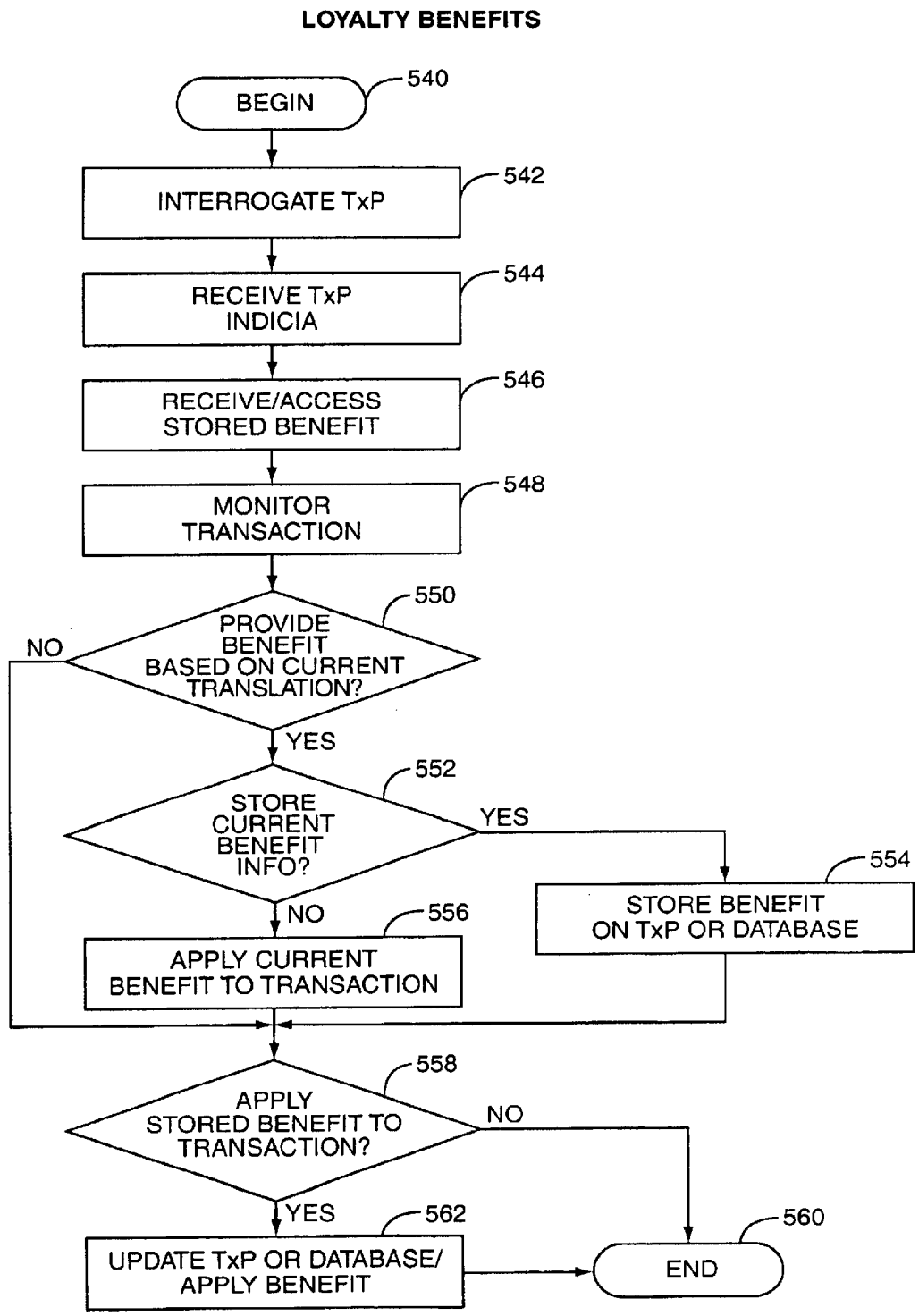
FIG 10C is a flow chart representing a basic flow of a loyalty benefit process according to the present invention.

The present invention may also be configured to provide various types of loyalty benefits based on past and/or current transactions. Loyalty benefits will be provided to a customer in order to encourage subsequent return to a particular fueling environment or one of an associated group of environments. The benefit may also encourage the purchase of additional products during the current or a subsequent transaction. A loyalty point may be earned by a customer for each transaction, transaction amount, or type or quantity of a particular product or service. For example, a loyalty point may be earned for each gallon of gas purchased or for a fill-up requiring eight or more gallons of gas. The store operators have tremendous flexibility in determining the various criteria for earning loyalty points. Additionally, the loyalty benefits or points are preferably redeemed by a customer in part, or in whole, on subsequent visits to the same or an associated fueling environment. Redeeming points at a subsequent transaction provides an incentive for a customer to return to environments participating in the benefit program. Although redeeming points on a subsequent purchase is preferred, benefits may be made immediately available based solely on the current transaction. Furthermore, the benefits may be based upon current and prior transactions, and allow for both current and subsequent benefit. The basic flow of the process for providing such benefits is shown in FIG. 10C.

The process begins (block 540) when a transponder is interrogated (block 542). Preferably, indicia, including identification indicia, is received from the transponder (block 544). Once the relevant controller receives the transponder indicia, one of two events typically occurs. The first option is to receive loyalty information, which is included in the transponder indicia, directly from the transponder. Optionally, the controller may use the transponder indicia, preferably identification indicia, to look up benefit information, including loyalty points, stored in an associated database anywhere within the fueling environment or at a remote network (block 546). Thus, loyalty information may be stored on the: transponder and transmitted to the relevant control system or accessed from virtually any location based on some type of identification provided by the transponder.

At this point, the customer is engaging in a transaction and the relevant control systems will monitor such transaction (block 548) and determine whether to provide a benefit based on the current transaction (block 550). If a benefit is to be provided based on the current transaction, the controller will determine how to apply the current benefit information (block 552). The controller basically has two options. The controller may store the benefit information on the transponder or the relevant database (block 554), or apply the current benefit information to the current transaction (block 556).

Regardless of whether a benefit is provided based on the current transaction, the controller will preferably determine whether or not to apply a stored benefit to the current transaction based on prior transactions (block 558). If a stored benefit is not available or the controller is not adapted to provide such benefit, the process ends (block 560). If a stored benefit is available for application to the current transaction, the transaction is updated and the appropriate database in the transponder or associated with the controller is updated (block 562). Typically, the benefit is applied to the current transaction at this time, and the process is ended (block 560).

The loyalty benefits capable of being provided by this process allow tremendous flexibility and automatically implement incentives to increase customer loyalty and improve business.

Cash Customers

Another important aspect of the present invention is providing refunds and loyalty points or benefits to cash customers. Traditionally, service stations were not able to monitor cash transactions or cash customers for merchandising efforts or to provide these customers with benefits that were provided to card customers. The card customers provided the service station operators with information to determine what types of purchasing activities specific customers had in addition to providing the customer with various benefits based on prior purchases and transactions. For example, a system comparable to the central control system 50, alone or in conjunction with a remote host network 94, could track customer purchases and provide a benefit based on a purchase type or an amount of a series of purchases. Prior to applicant's invention, cash customers were basically "invisible" to these types of merchandising aspects of the fuel station environment.

Additionally, efforts have been made to provide cash acceptors at the fuel dispensers 18 to enable customers to pay cash at the dispenser in order to expedite the fueling transaction for the benefit of the station operator and customer. The difficulty in using cash acceptors is providing the customer proper change when the amount of fuel dispensed differs from the cash amount inserted into the cash acceptor 90. Although the fuel dispenser 18 is a sophisticated instrument, it is not economical to further include a change machine at each fueling position of each dispenser. Thus, cash acceptor technology has not caught on in most fueling environments. Furthermore, requiring a customer to enter the store to receive his or her cash refund or change defeats the purpose of paying at the dispenser. Similarly, since the customer's vehicle tank ullage is unknown, fueling to a prepaid dollar amount is often impractical and inconvenient to the customer.

The present invention provides a solution to the above problems by keeping track of cash customers and their respective refunds and loyalty points using transponder technology. A cash customer either carries a transponder or has a transponder mounted on his or her vehicle, and the transponder is used to associate any refunds or loyalty benefits with the otherwise invisible cash customer. The customer may use the cash acceptor 90 of the fuel dispenser 18 and receive any change as credit on or associated with the transponder. The transponder may simply provide an ID and the central control system 50 or remote host network 94 will keep track of the refund associated with that ID for later credit. Alternatively, the refund amount or credit may be directly transmitted to and stored on the transponder wherein that amount is transmitted to a dispenser for credit on a subsequent fueling transaction.

With this invention, customer loyalty and merchandising programs are made available using a transponder associated with a cash customer. Whether the customer pays at the dispenser or at one of the registers inside the store, interrogators placed at the dispensers, registers or anywhere else in the store can interact with the customer transponder in order to keep track of loyalty points, benefit information or simply monitor the customer's purchasing habits. This information is preferably stored at the central control system 50, at a remote host network 94 or directly on the transponder.

Figure 11A:
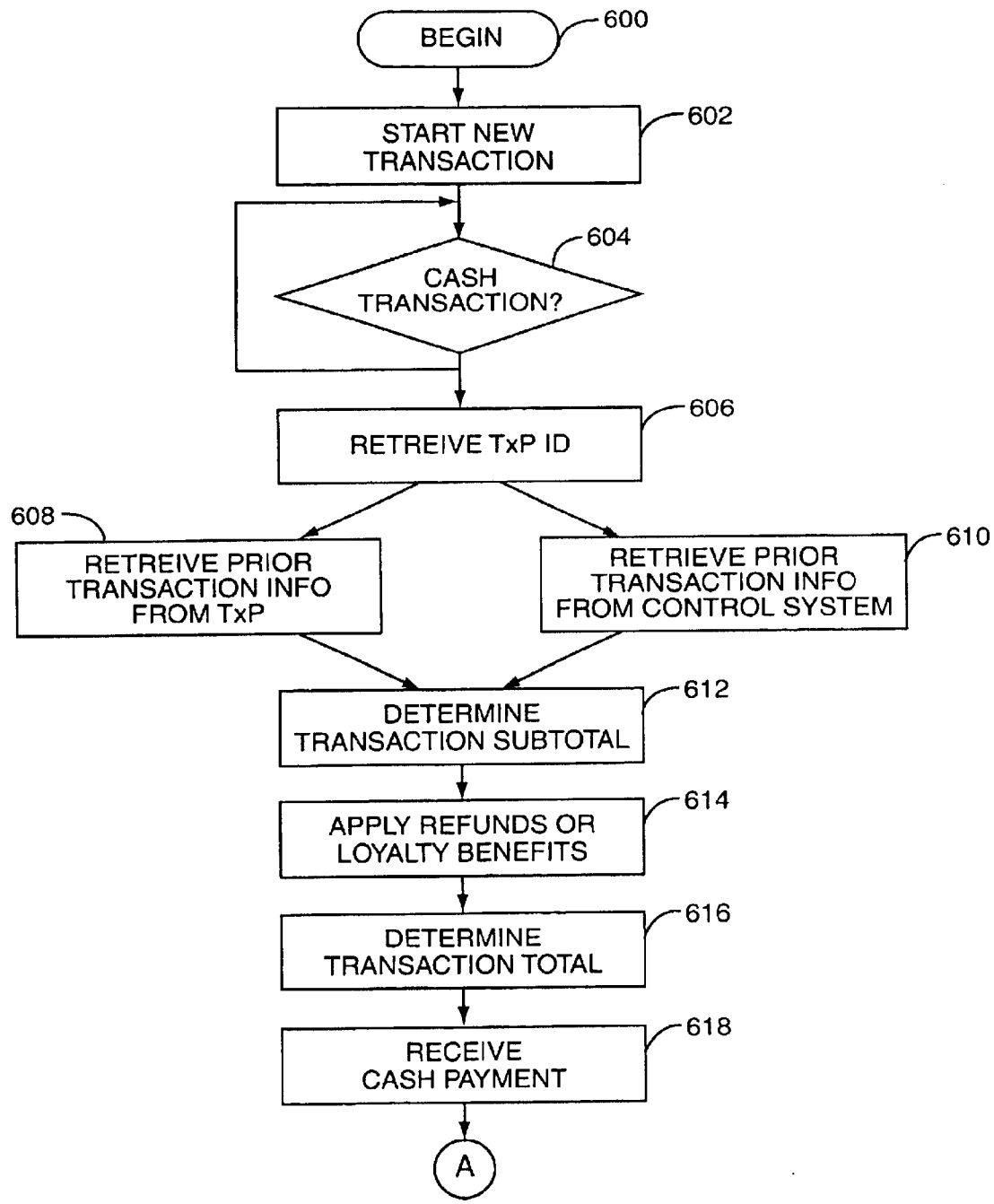
FIGS. 11A and 11B are a flow chart representing a basic interaction with a transponder during a cash transaction according to the present invention.
Figure 11B:
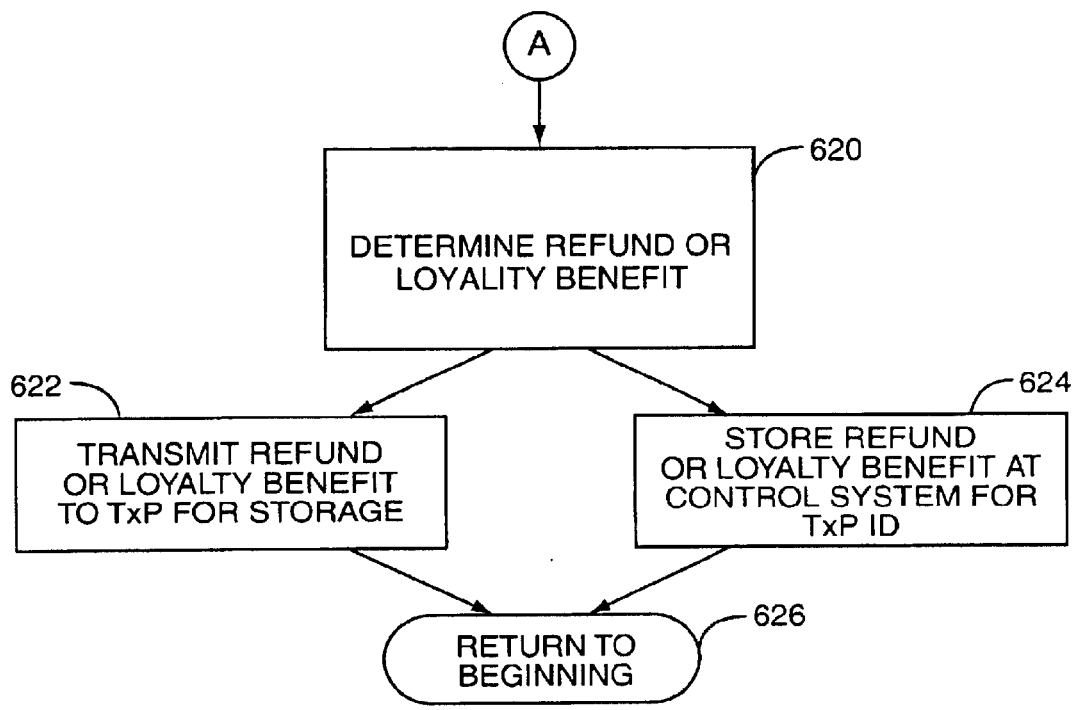

Attention is drawn to FIGS. 11A and 11B depicting a flow chart representing basic interaction with the transponder of the cash customer. Typically, a new transaction begins when a cash customer having a personal transponder 12 or vehicle mounted transponder 14 drives up to a fueling position at one of the dispensers 18 and begins fueling (block 600). The customer will generally start a new transaction by beginning fueling (block 602). This is typically accomplished by initially interacting with the fuel dispenser user interface comprising the key pad and display 102, 100 to select a cash or credit transaction. The dispenser control system 80 will determine if the customer is making a cash transaction (block 604) and relay that information to the central control system 50. Although determining whether or not the customer is conducting a cash transaction occurs at the beginning of the fueling process in FIGS. 11A and 11B, this determination can be made anytime during the fueling operation and at virtually any payment location, including the register or transaction terminal in the store.

At this point, the dispenser control system 80, operating in conjunction with the dispenser interrogator 52, will retrieve the transponder ID (block 606). The dispenser control system 80 and central control system 50 will operate to retrieve information relating to prior transactions which may affect the current transaction. This information may be cash refunds from previous transactions, credits or loyalty points, or benefits based on prior transactions. Depending on system configuration, this information may be stored on the transponder, or at any of the control systems in the fueling environment, such as the central control system, in addition to being maintained at a remote host network 94 system communicating with other stations. When the information is stored on the transponder or at the remote network, loyalty programs and refund data is made easily attainable by other fueling environment systems. Thus, the dispenser 18 may retrieve prior transaction information from the transponder (block 608) or retrieve this information from a database stored at one of many control systems associated with the dispenser (block 610). Regardless of system architecture, some type of identification indicia is necessary to associate a particular customer's information with a corresponding transponder. Subsequently, one of the controllers associated with the dispenser such as the dispenser control system 80, convenience store transaction controller 152 or central site controller 232, will determine a transaction subtotal (block 612). The controller will apply any prior refinds, loyalty points or benefits the customer has accumulated due to the current transaction and/or any prior transactions (block 614).

A new transaction total is then determined (block 616).

Next, payment is received at one of the in-store registers, such as the in-store transaction terminal 30, or at the cash acceptor 90 of the dispenser 18 (block 618). Notably, initial dispenser authorization may depend upon receiving the cash payment at the beginning of the fueling operation and before fueling begins. The dispenser control system 80, or one of the associated controllers, will subsequently determine a refund amount and any loyalty points or benefits accumulated based on the current transaction and any earlier transactions, accordingly. The station operator has tremendous freedom in determining the criteria for issuing benefits and points based on a single transaction or a series of transactions. Depending on whether the information is stored directly on a transponder or elsewhere, the refund and loyalty information must be transmitted to the transponder through the appropriate interrogator, such as the dispenser interrogator 52 or the store transaction interrogator 54. The appropriate interrogator primarily depends on where the actual cash transaction takes place. If the information is not stored on the transponder, the information will be stored at one of the local control systems or the host network 94 (block 624). Once the transaction is over, the system will begin anew by waiting for another transponder-carrying cash customer (block 626).

Discount for Transponder Use

Another aspect of the invention is providing a system capable of applying a discount to a transaction when a transponder or other preferred method of payment is used. The system is preferably adapted to provide benefits or discounts to a transaction when a transponder is associated with the transaction to encourage transponder use, while avoiding cash payment or other less desirable payment methods.

Figure 11C:
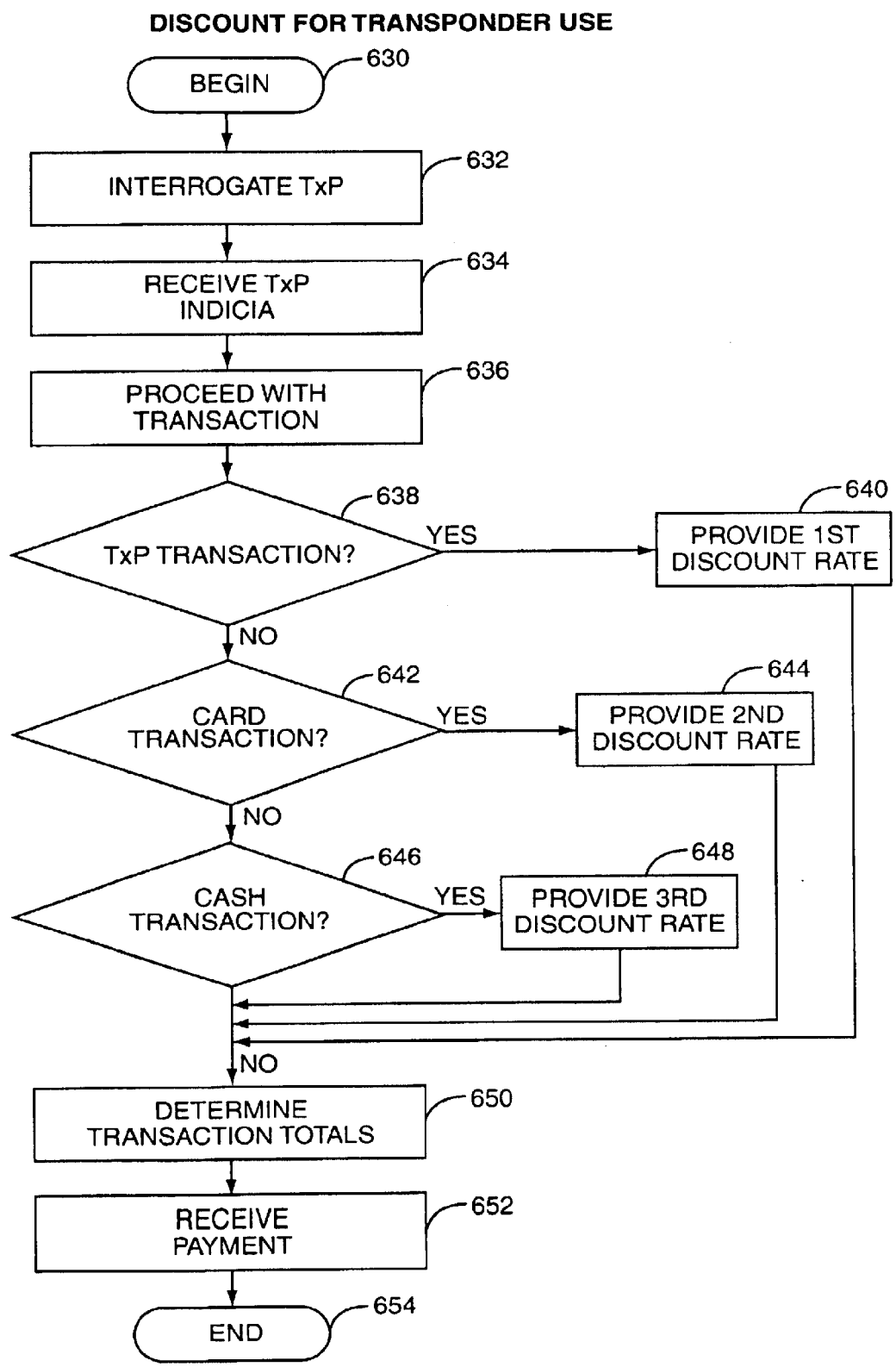
FIG. 11C is a flow chart representing a basic process for providing a discount for transponder use during a transaction according to the present invention.

Attention is now directed to FIG. 11C where a basic process for discounting a transponder related transaction is shown. As the process begins (block 630), a transponder is interrogated (block 632) and transponder indicia is received by one of the control systems in the fueling environment (block 634). The control system will proceed with the transaction (block 636) and will ultimately determine what type of method will be used for the transaction and what, if any, discount will be provided based on the chosen method of payment.

Initially, the control system will determine whether or not a transponder is being used in association with the transaction (block 638). If a transponder is being used, the control system will provide a first discount rate to all or a portion of the transaction (block 640), and proceed to determine transaction totals (block 650). If a transponder is not used in association with the transaction, the control system may determine whether or not a card, such as debit, credit or smartcard, is used with the transaction (block 642). If a card is used in association with the transaction, the control system may provide a second discount for all or a portion of the transaction (block 644), and proceed to determine transaction totals (block 650).

If there is no transponder or card associated with the transaction, the control system may determine whether or not the transaction is a cash transaction (block 646). This may be by default if no card or transponder is used, or may result from the customer selecting a cash transaction or an operator indicating a cash transaction at a POS position. If a cash transaction is determined, the control system is configured to provide a third discount rate to all or part of the transaction (block 648) and proceed to determine transaction totals (block 650).

The system operator may elect to provide different rates for the first, second and third discount rates associated with the transponder, card and cash transactions, respectively. Furthermore, the operator may elect not to provide a discount for all or any combination of the various methods of payment. Preferably, a greater discount is provided for transactions using a transponder in order to encourage transponder use with transactions. Similarly, to avoid the use of cash transactions, the system operator may decide not to provide any discount for cash transactions. Once the transaction totals are determined (block 650) and the appropriate discount rates are applied, payment is received (block 652) and the process comes to an end (block 654). Those skilled in the art should quickly recognize the benefits inherent in certain payment methods to improve transaction efficiencies and encourage methods of payment beneficial to the station operator.

Cash Prepay with Transponder

Another aspect of the present invention is to provide a system and method for providing a prepaid transponder capable of being used with dispensers and other POS terminals in a fueling environment. The present invention allows a customer to prepay for subsequent transactions at a terminal capable of communicating with the transponder in order to store the amount of prepayment on the transponder, or at least associate the amount of prepayment in a database associated with the terminal and any future transaction locations, such as a fuel dispenser.

Figure 11D:
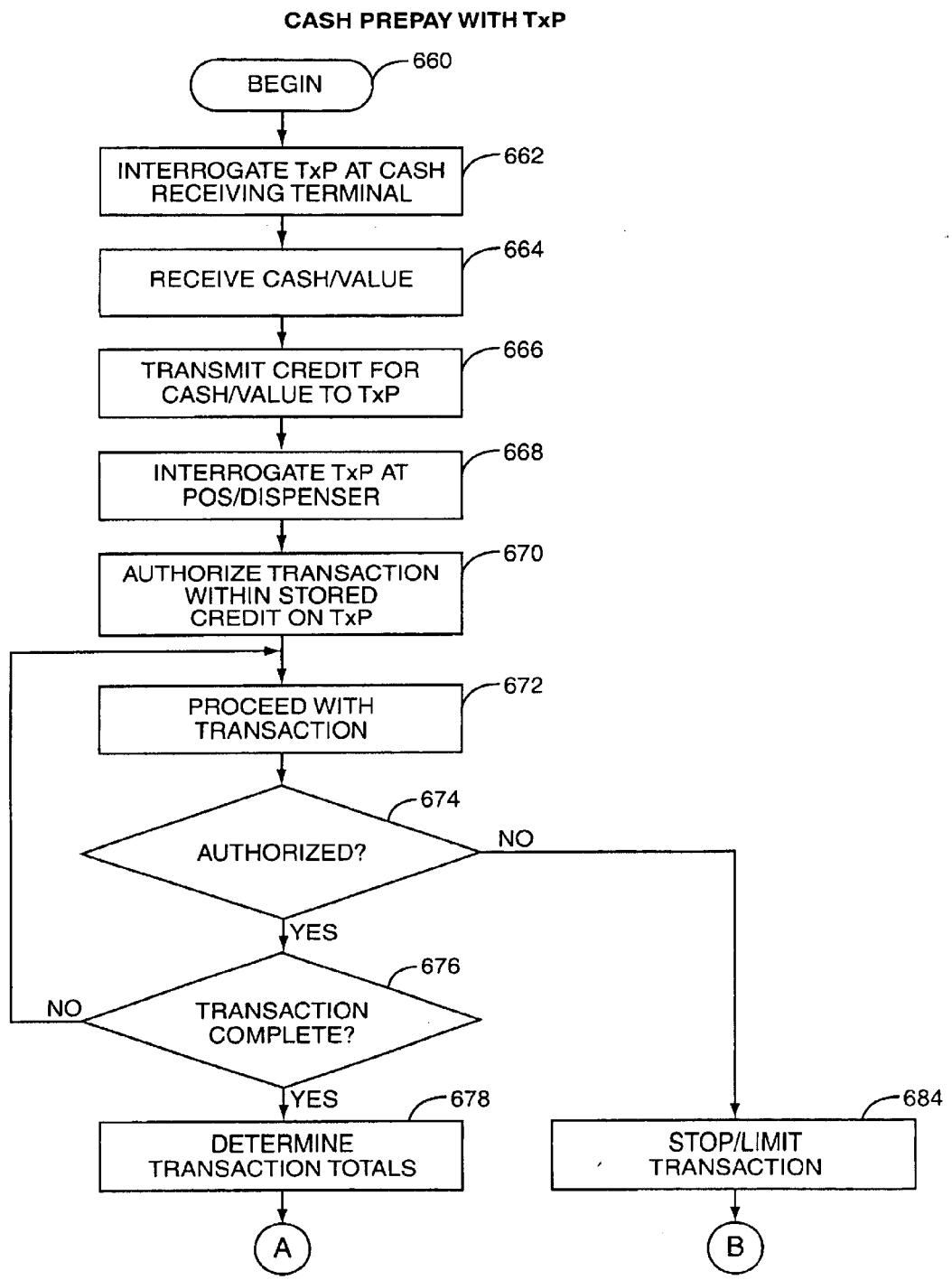
FIGS. 11D and 11E are a flow chart of a basic process for providing prepayment on a transponder for subsequent transactions according to the present invention.
Figure 11E:
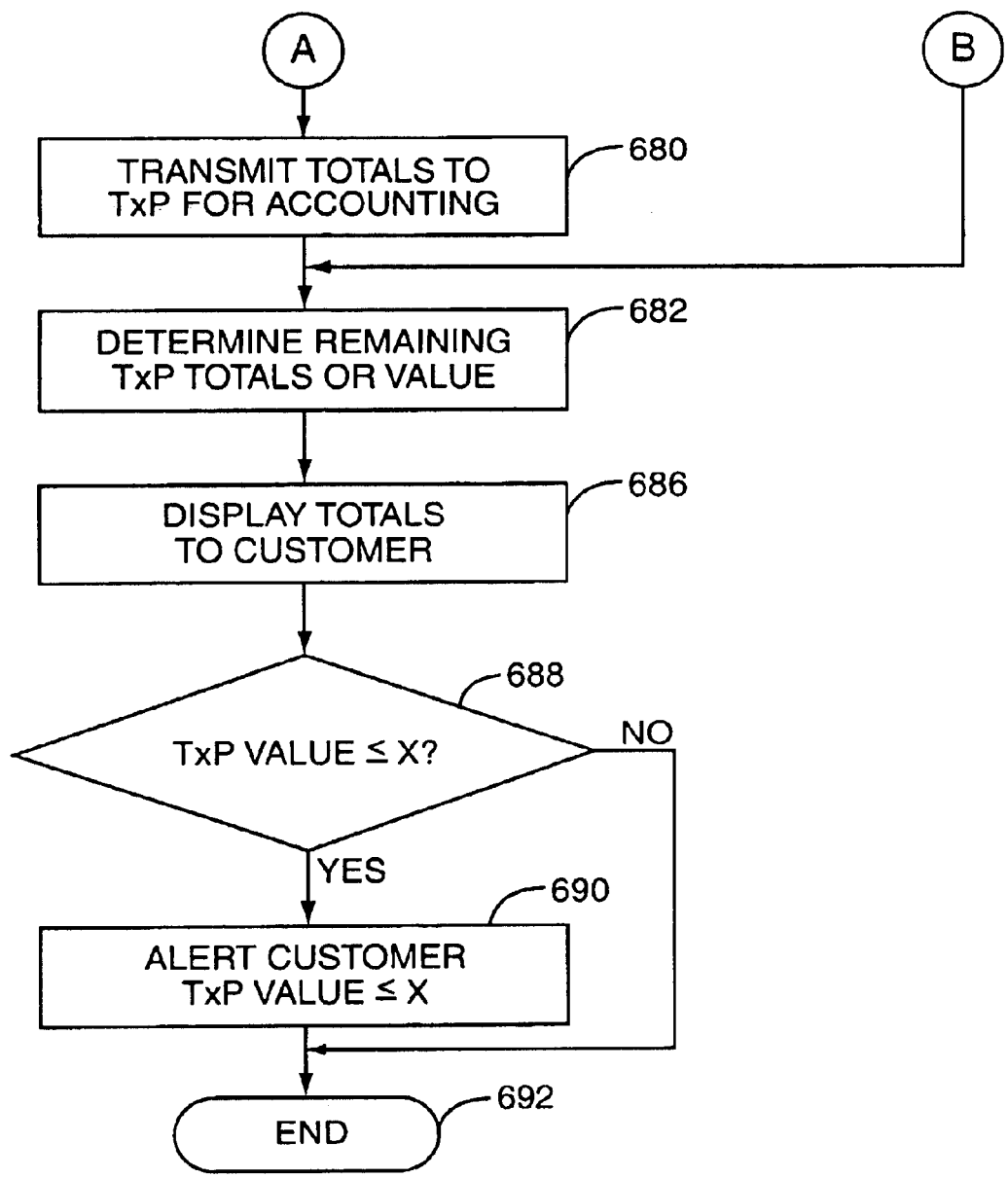

Attention is directed to FIGS. 11D and 11E where a basic process for using a prepaid transponder is shown. When the basic process begins (block 660), a transponder is interrogated at a cash or other payment receiving terminal (block 662). The terminal will receive cash or other value (block 664), and either transmit to the transponder a value for the cash or other prepayment received or store that value in a database associated with the controller (block 666).

At this point, the transponder has value (or is associated with value) and is capable of being interrogated at various POS terminals. In this example, the POS is an interface at a fuel dispenser. During the transaction, the dispenser will interrogate the transponder (block 668) and authorize a transaction within the stored credit or value of the transponder (block 670). The transaction will proceed (block 672) and the appropriate control system will determine that the values incurred during a transaction remain less than the value of the transponder (block 674). As the transaction is monitored, the control system will stop or limit the transaction (block 684) before the value of the transponder is exceeded. As long as the transaction remains less than the value of the transponder, the transaction will proceed until completed (block 676). Once the transaction is complete, the control system will determine transaction totals (block 678) and transmit such totals to the transponder for accounting (block 680). Alternatively, these totals may be sent to a database corresponding to the respective transponder in order to keep track of prepayment and associated totals. The accounting may be done at the transponder, wherein the value of the transaction is received by the transponder and the appropriate calculations are completed. Alternatively, the control system may simply update the value associated with the transponder by either transmitting this value directly to the transponder or storing it in the databases associated with the transponder.

Preferably, the control system will interact with the transponder or the database maintaining the value associated with the transponder to determine the remaining transponder totals or value (block 682), and display such totals to the customer (block 686). These totals may include the amount of prior transactions, the remaining value of the transponder before the transaction, or the value of the transponder after the transaction. The system operator will have great flexibility in deciding the various accounting information made available to the customer. Preferably, the information will be sufficient to allow the customer to recognize when the transponder value is approaching zero (0) or a predefined threshold to alert the customer that it is time to add value to the transponder.

For example, the control system may monitor the transponder value to determine whether that value is less than or equal to a predefined value, such as zero, or any other desired threshold. If the value is less than or equal to the set value, the control system may be configured to alert the customer of the current transponder value and that it has dropped below the threshold amount (block 690) and the process ends (block 692). If the transponder value is greater than the threshold, the system operator may elect not to provide a warning to the customer and end the process (block 692).

Notably, during any portion of the process described above, the control system may allow the customer to add value to the transponder at the current transaction terminal. For instance, the customer may use the cash acceptor or card reader at the fuel dispenser to add value to the transponder. The customer will simply determine an amount to add to the transponder, and the dispenser interrogator will simply interrogate the transponder and transmit the relevant added value information to the transponder or receive the transponder ID and update an associated database accordingly (blocks 662–666). Storing this value should be interpreted to include adding to or subtracting from an existing value or any other accounting necessary for operation.

Transponder Monitoring and Location Detection

In several aspects of the present invention, it is desirable to determine the location and/or proximity of a transponder, whether vehicle mounted or carried by a customer, with respect to a specific fueling position of a dispenser or interrogation system. In other aspects, it is desirable to track the transponder throughout the fueling environment 10. Although the embodiments described herein use the dispenser as a reference, any of the interrogation systems in the fueling environment may be adapted to determine transponder location and/or proximity.

Determining location and proximity of a transponder with respect to a fuel dispenser in a fueling environment presents a unique problem because the fueling environment includes multiple dispensers with multiple positions. At any given time, numerous transponders will be in or moving about the fueling environment and the many interrogation fields associated with the various interrogators. The dispensers and associated control systems must distinguish between personal and vehicle-mounted transponders used to carry out a transaction from transponders attached to a vehicle driving by the fueling position or carried by a person walking by the dispenser. Fueling environments must be able to avoid communicating with a second transponder during a transaction with a first transponder.

Texas Instruments has made an attempt at implementing a system in a fueling environment capable of communicating with transponders. The beta sites for the Texas Instruments system are believed to communicate with transponders using an interrogator transmitting an interrogation signal having a 134 kHz carrier. Any transponders within range of the 134 kHz signal will transmit a signal back to the interrogator using a 903 MHz carrier. The Texas Instruments system includes a very large loop antenna associated with the dispenser for transmitting the 134 kHz signal and a much smaller antenna for receiving the 903 MHz signal from the transponder. The 134 kHz transmission signal from the interrogator has a very limited communication range, which requires the transponder to be within 2–6 inches of the large loop antenna to provide the transponder sufficient energy to transmit information back to the interrogator.

Additionally, the 903 MHz signal transmitted from the transponder to the interrogator is substantially non-directional and can be heard throughout the entire fueling environment and most likely for quite some distance outside the fueling environment. Transponder transmissions carrying throughout the fueling environment add significant difficulty in correlating a transponder with the proper dispenser and respective fueling position.

In addition to the inherent difficulties in locating and distinguishing between transponders within the fueling environment, the Texas Instruments system requires different types of antennas, modulation schemes and communication electronics for transmitting and receiving signals to and from the transponders. Given the limited operating field provided by the 134 kHz loop antenna, it may be difficult to communicate with vehicle-mounted transponders, which necessarily should never be within 2–6 inches of the fuel dispenser.

Applicants' invention provides a solution to the difficulties of locating and communicating with transponders within the fueling environment by (1) providing a communications system operating at frequency ranges which are very directional, (2) .controlling the power at which the communications system operates and (3) simplifying the communications electronics by operating at the same carrier frequencies communicating with the transponder. Communicating at substantially the same carrier frequency allows interrogators to use the same or similar antennas to transmit and receive. Furthermore, these more directional frequencies require smaller antennas, which are easily integrated into the fueling environment or dispenser in an economical and aesthetically acceptable manner.

Figure 12A:
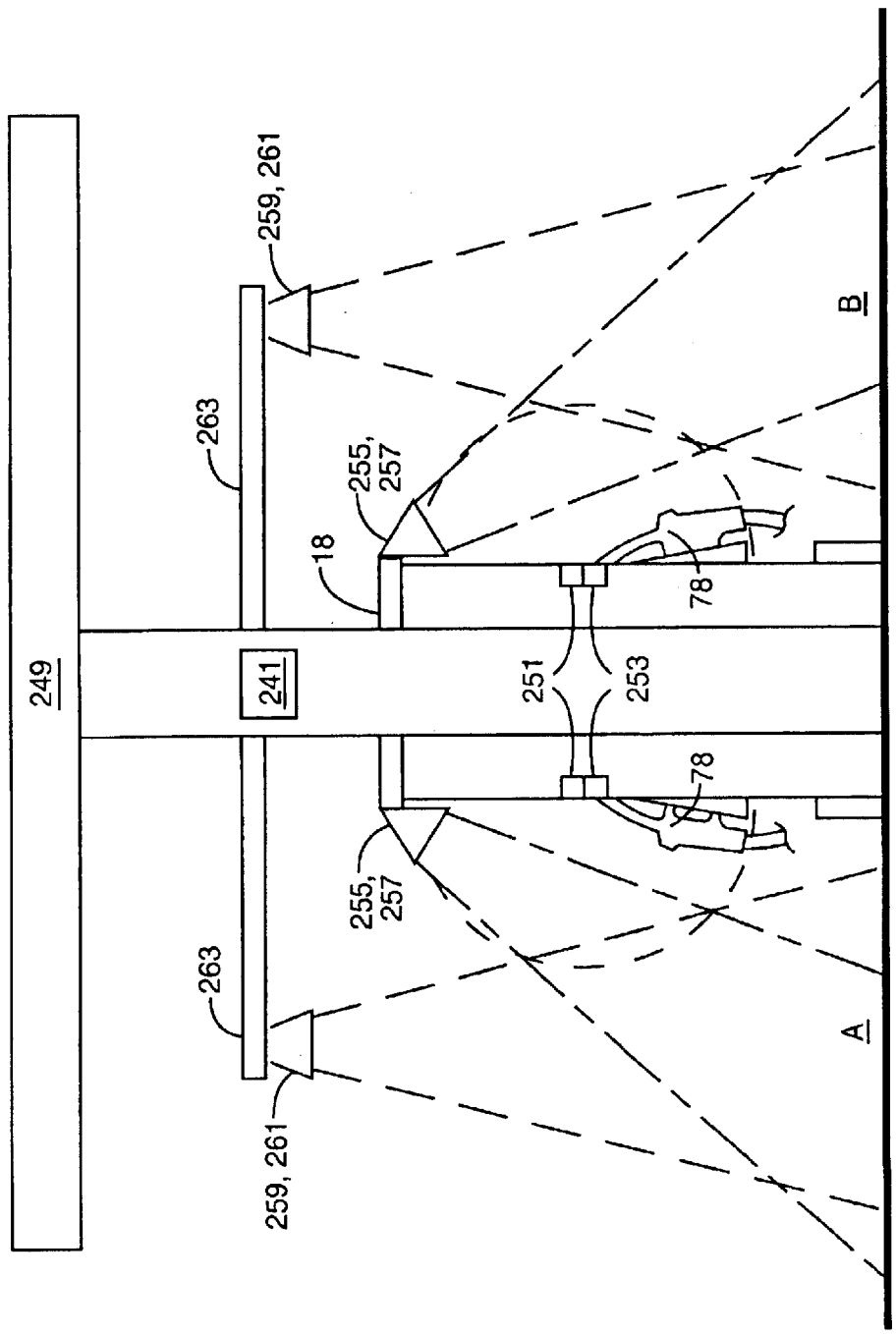
FIG. 12A is a schematic representation of a side view of a dispenser having multiple antenna arrangements for providing directional interrogation fields constructed according to the present invention.
Figure 12B:
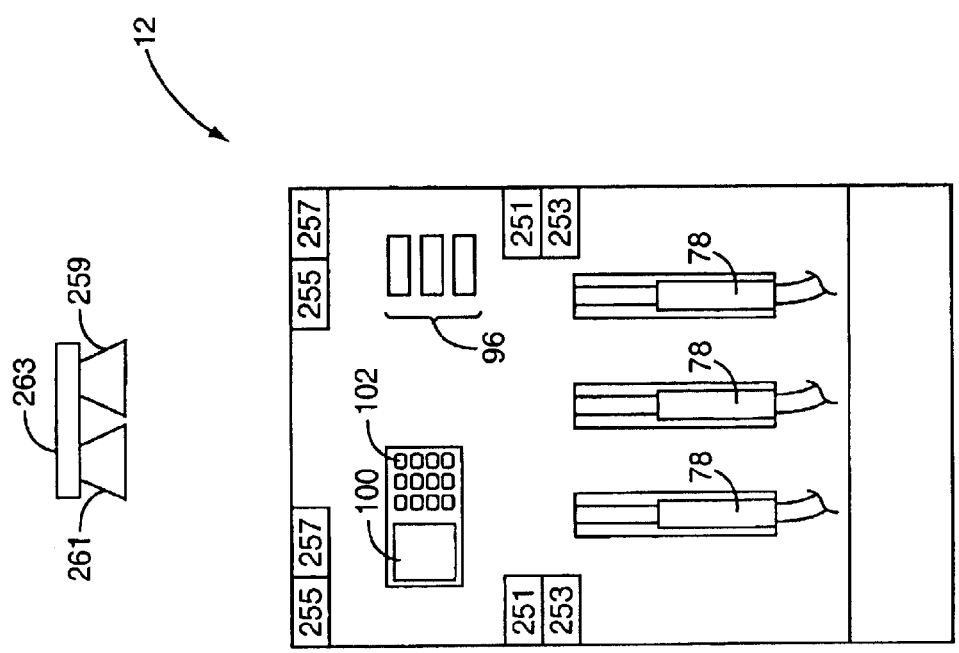
FIG. 12B is a schematic representation of a front view of a dispenser having multiple antenna arrangements for providing directional interrogation fields constructed according to the present invention.

The preferred arrangement of applicants' antennas is shown in FIGS. 12A and 12B. In FIG. 12A, a side view of a fuel dispenser under an awning 248 is shown with multiple configurations of antennas adapted to communicate with various transponders proximate to either of the fueling positions A or B. The antennas are adapted to transmit, receive or transmit and receive at substantially directional frequencies, including those in the microwave range, and preferably around about 2.45 GHz. In these embodiments, there are basically three suggested antenna locations wherein various combinations of antennas at these locations are used. Please note that the antennas of FIGS. 12A and 12B are not referenced as 108, for the sake of clarity in describing antenna placement. As illustrated in FIGS. 12A and 12B, the antennas may be positioned within a cabinet of the fuel dispenser 18, or alternatively, the antennas may be positioned above the fuel dispenser 18.

The first antenna location is near the middle of a front face of the dispenser 18. A mid-dispenser transmit antenna 251 and mid-dispenser receive antenna 253 are placed near this midpoint. The antennas may be located in the central portion of the dispenser or located anywhere along the front face of the dispenser, including near the respective sides of the dispenser as shown in FIG. 12B. The mid-dispenser antennas 251, 253 preferably provide a limited power and limited range field pattern to communicate with a transponder 66 carried by a customer. The field provided by the mid-dispenser transmit antenna 251 is preferably large enough to properly communicate with the customer-carried transponder 66 in the fueling position and in front of the dispenser without requiring the customer to remove the transponder from a purse, wallet or pocket and wave the transponder next to the dispenser 18 or a receiving antenna.

Additionally, a top-mount transmit antenna 255 and top-mount receive antenna 257 may be provided at or near the top of the dispenser 18 and adapted to provide a focused, directional and preferably conically shaped field downward over the respective fueling position. These top-mount antennas 255, 257 are preferably located on each side of the dispenser 18 as shown in FIG. 12B in similar fashion to the preferred placement of the mid-dispenser antennas 251, 253. The duplication and spacing of these antennas help avoid interference caused by people or other objects breaking the communication path between the respective antenna and transponder. This allows the transponder to communicate with the dispenser through one antenna or set of antennas, even if something blocks the field from the other set of antennas.

Another option is to place the antenna substantially directly over the fueling position A or B. In such an embodiment, overhead receive antenna 259 and overhead transmit antenna 261 are mounted over the fueling position A, B using an overhead antenna mount 263. The overhead antennas 261, 263 operate in the same manner as the top-mount antennas 255, 257, and may also be spaced apart to provide varying positions to create an interrogation field. Notably, the antennas for receiving and transmitting may be combined into one wherein a suitable circulator or like electronics 241 is incorporated into the interrogator or communications electronics to provide for reception and transmission from a single antenna. With any of these embodiments, the antennas may cooperate directly with the central control system 50 or with the dispenser control system 80 to allow overall system monitoring of transponders at the various positions. In these situations, the selected control system will alert the dispenser of transponder presence.

As noted, various combinations of these antennas can be used. For example, the preferred embodiment includes two mid-dispenser transmit antennas 251, two top-mount transmit antennas 255, and two top-mount receive antennas 257. The top-mount receive antennas 257 are adapted to receive signals transmitted from the transponder in response to signals from either the mid-dispenser transmit antennas 251 or the top-mount transmit antennas 255. In operation, when a customer-carried transponder 66 enters the field provided by the mid-dispenser transmit antenna 251, the transmitter reflects a signal which is received by the top-mount receive antenna 257. Alternatively, vehicle-mounted transponders 64 may enter the interrogation field provided by the top-mount transmit antenna 25and respond with a signal received by the top-mount receive antenna 257.

The interrogation fields provided by any of the transmit antennas 251, 255, 259 may be adjusted to control the size and shape of the respective fields. For example, the system may be configured to more easily distinguish between transponders carried by a person and vehicle-mounted transponders by configuring the respective interrogation fields provided by the mid-dispenser transmit antenna 251 and the top-mount transmit antenna 255 or overhead transmit antenna 259, such that the respective interrogation fields do not overlap or overlap in a desired and select pattern. Thus, communications resulting from an interrogation with the mid-dispenser transmit antenna 251 indicate a transponder carried by the customer while communications resulting from the top-mount or overhead transmit antenna 255, 259 may be indicative of vehicle-mounted transponders.

Figure 12C:
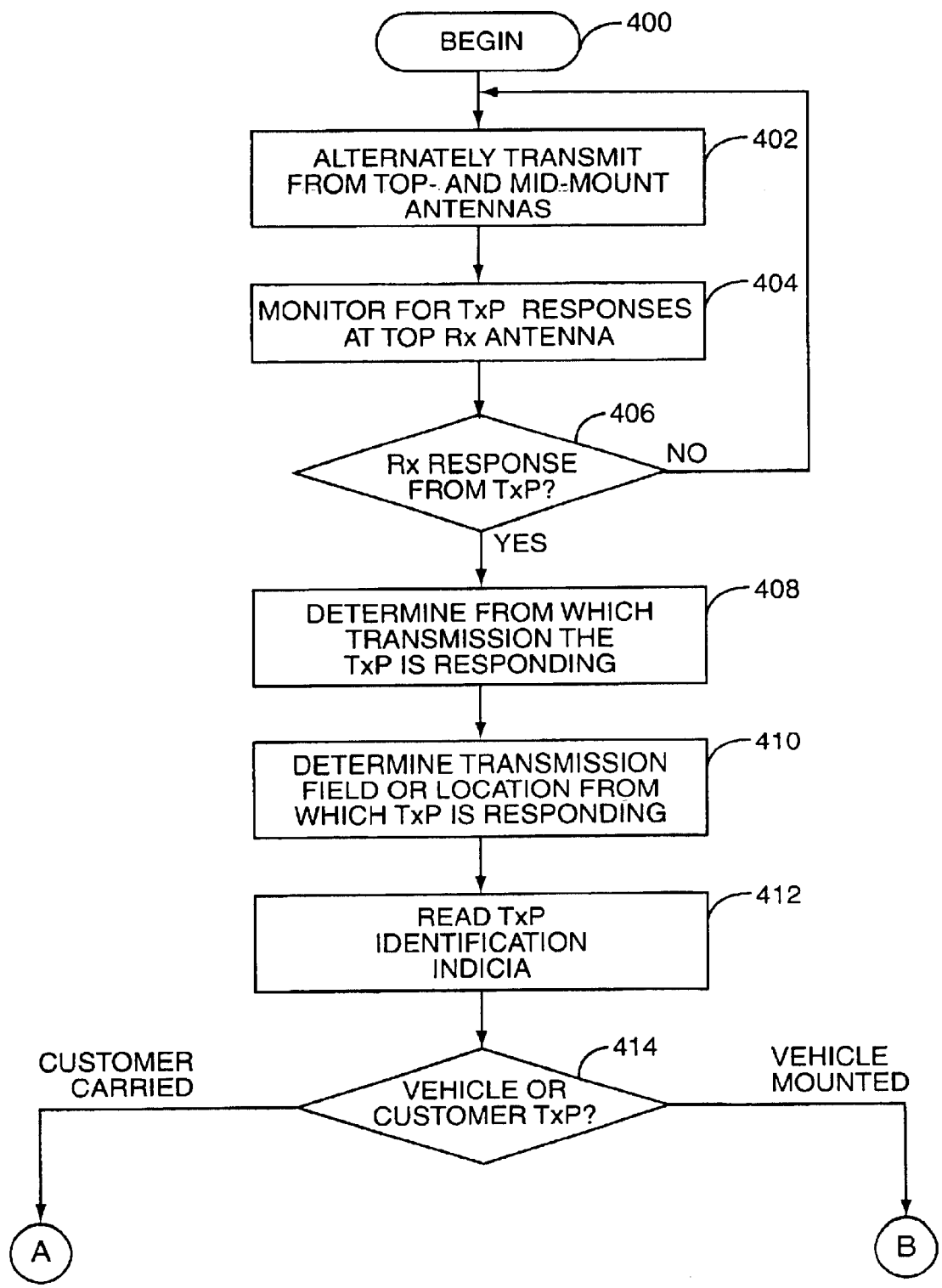
FIGS. 12C and 12D are a flow chart of a basic process for monitoring the location and type of transponder at a fueling position according to a preferred embodiment of the present invention.
Figure 12D:
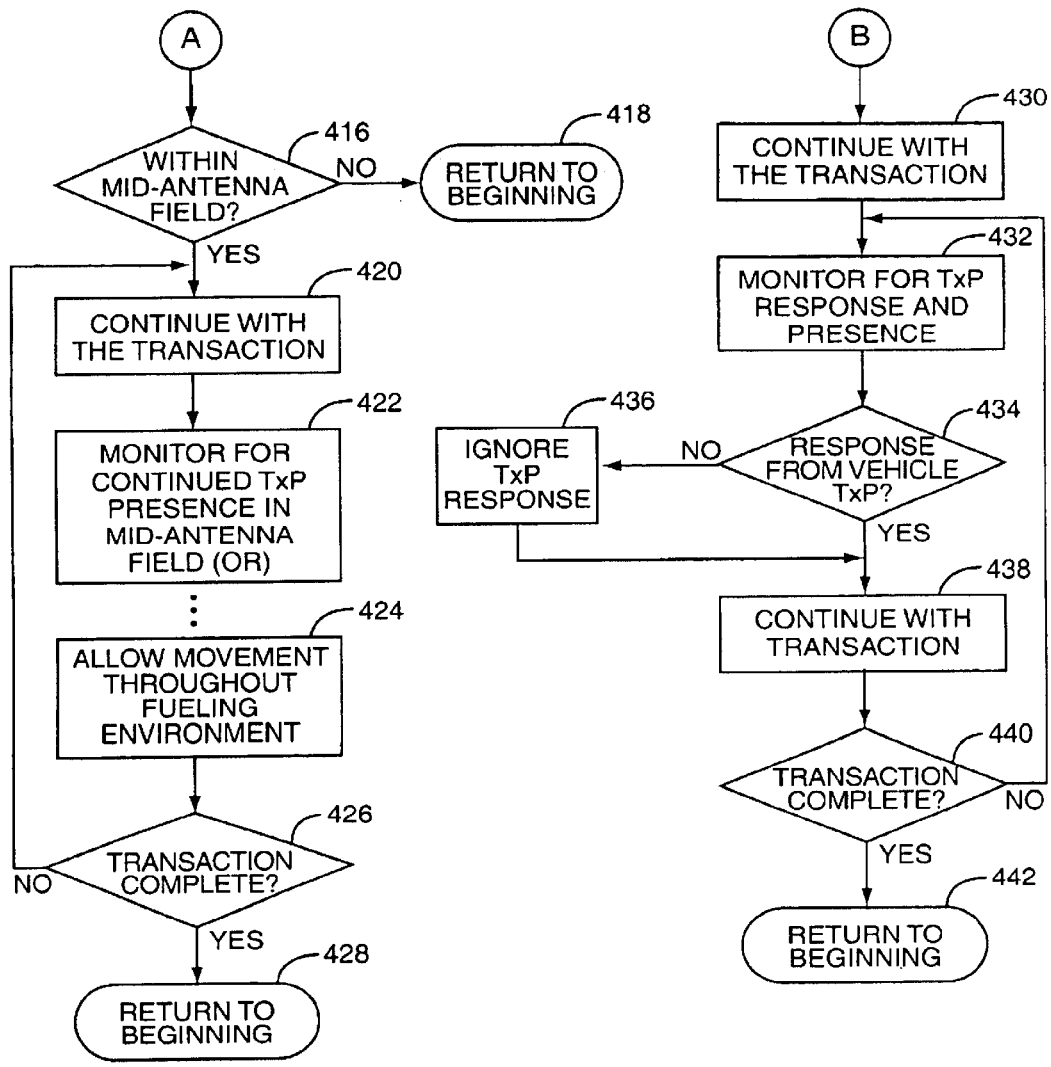

Attention is now drawn to FIGS. 12C and 12D, which depict a flow chart of a basic process for monitoring the location and position of a particular type of transponder using top-mount transmit antennas 255 or overhead transmit antennas 259 and a mid-dispenser transmit antenna 251 in conjunction with one or more top-mount or overhead-mount receive antennas 257, 261. In this preferred embodiment, one or more of the transmit antennas mounted substantially above the customer will alternate sending interrogation signals with one or more of the mid-dispenser transmit antennas 251. A response to either of these interrogation signals is received at a receive antenna mounted substantially above the customer, such as one of the top-mount receive antennas 257 or overhead receive antennas 261.

The basic operation of this embodiment begins (block 400) by alternately transmitting from the top and mid-mount antennas (block 402). The central control system 50 or dispenser control system 80 will monitor for responses from transponders within one of the interrogation fields (block 404). The control system will continue to monitor for a transponder response until a signal from a transponder is received (block 406). The control system will next determine from which transmission field the transponder is responding (block 408). In this embodiment, where the transmission fields alternate, the control system will simply determine if a transponder response was received during a time period when the top or overhead-mount antennas were generating the interrogation field or if the response occurred during the time the mid-dispenser transmit antenna 251 was generating the interrogation field.

Once the control system determines the field in which the transponder is responding, the appropriate location of the transponder is known (block 410). Typically, the transponder's response to the interrogation signal provides transponder identification indicia indicative of the type of transponder being interrogated (block 412). The type of transponder is generally vehicle mounted or carried by the person. Determining whether the transponder is vehicle mounted or carried by the person enables the control system to determine how to react to the presence of other transponders passing through the various interrogation fields during a communication with another transponder or make sure a transponder is properly located for the desired transaction. If the control system determines the transponder is one carried by a person (block 414) and that the transponder was within the mid-antenna field (block 416), the control system allows the transaction to continue (block 420). If the transponder is a customer-carried transponder that is not within the mid-antenna field (blocks 414 and 416), the control system will return to the beginning of the process (block 418). The latter situation is indicative of a transponder carried by the person being interrogated in one of the top or overhead antenna fields, which are preferably used to interrogate vehicle-mounted transponders exclusively. Thus, the system preferably ignores transponders carried by the person outside of the mid-antenna field, which is preferably focused in a manner requiring the customer to be substantially in front of the customer interface of the appropriate fueling position. The field associated with the mid-dispenser transmit antenna 251 is limited only by design choice and may extend several or more feet in front and to the sides of the fuel dispenser.

If the control system is communicating with a customer-carried transponder within the mid-antenna field, the control system may monitor for the continued presence of the transponder in the mid-antenna field (block 422) or allow movement of the customer-carried transponder throughout the fueling environment (block 422). Notably, it is often desirable to only require the customer-carried transponder to be within the mid-antenna field long enough to start the transaction and fueling operation, and allow the customer to leave the fueling area during the fueling operation. Unlike a customer-carried transponder, the control system would preferably require the presence of the vehicle in the appropriate transmission field throughout the fueling operation for safety reasons. Regardless of how the control system monitors the presence or movement of the customer-carried transponder during the transaction, the transaction will continue until complete (block 426), wherein the process will begin anew (block 428).

If the control system determines a vehicle-mounted transponder is within the appropriate transmission field (block 414), the transaction will continue (block 430). Preferably, the control system will make sure that the vehicle has stopped moving and has been in position long enough to indicate a transaction associated with the responding transponder is likely. As noted above, the control system will preferably continue to monitor for the vehicle-mounted transponder's presence (block 432) throughout fueling. The control system is preferably capable of distinguishing responses from the vehicle-mounted transponder associated with the transaction from other personal or vehicle-mounted transponders entering one or more of the transmission fields (block 434). If a response to an interrogation signal is received that does not correspond to the vehicle-mounted transponder associated with the transaction, the response is ignored (block 436).

Preferably, the control system will ignore all responses of customer-carried transponders in the top-mount or overhead transmission fields. Erroneous responses from other vehicles are rejected based on the control system recognizing a response from a vehicle-mounted transponder having a different identification indicia from the vehicle-mounted transponder associated with the ongoing transaction. Likewise, the control system will ignore responses from transponders other than the authorized transponders to avoid communicating with transponders of other customers entering the field during a transaction. In such case, the control system may check the identification indicia to ensure communication continue with the appropriate transponder. During this time, the control system will continue with the transaction (block 438) until the transaction is completed (block 440).

If the transaction is not complete, the control system will continue to monitor for the presence of the vehicle-mounted transponder and any other transponders in the area (blocks 432-440). Once the transaction is complete (block 440), the process returns to the beginning (block 442). Although the preferred embodiment provides for mid and overhead transmission fields wherein transponder responses are received near the top or above the dispenser, those skilled in the art will recognize that numerous modifications of this configuration are within the inventive concept disclosed herein and subject to the claims that follow.

As noted, the interrogation communications system preferably communicates using substantially directional radio frequencies in conjunction with antennas configured to provide precisely shaped and directed interrogation fields. Communications at these frequencies are generally limited to line-of-sight communications wherein arranging the antennas to cover a common interrogation field from different locations avoids parallax and the effect of interference from objects coming between the transponder and one of the antennas. Generally, communications will require the absence of metal objects coming between the antennas and transponders. Thus, when antennas are mounted within the dispenser, glass or plastic dispenser walls are preferable. Furthermore, vehicle-mounted transponders are preferably placed on the windows or behind non-metal portions of the vehicle to avoid interference.

Preferably, high-gain antennas are used to provide a highly directional and configurable cone shape covering an area most likely to include a transponder when a vehicle is properly positioned for fueling. The antenna range and transmission power is typically adjusted to provide the desired interrogation field while minimizing the potential for the transponder to reflect signals to antennas associated with other fueling positions.

Another benefit provided by an embodiment of the present invention is that spread-spectrum communications limits the likelihood that an interrogator in the system will synchronize with a transponder being interrogated by another interrogator. Thus, a preferred embodiment of the present invention provides for a communications system capable of distinguishing between transponder types, limiting the potential of transponders erroneously communicating with another interrogator, simplifying communications by using the same carrier for transmission and reception, extending the interrogation field to more easily communicate with vehicle-mounted transponders, reducing the size of the antennas required for communication, and allowing either the same or same type of antenna to be used for transmission and reception.

Alternate Antenna Configuration

Figure 13A:
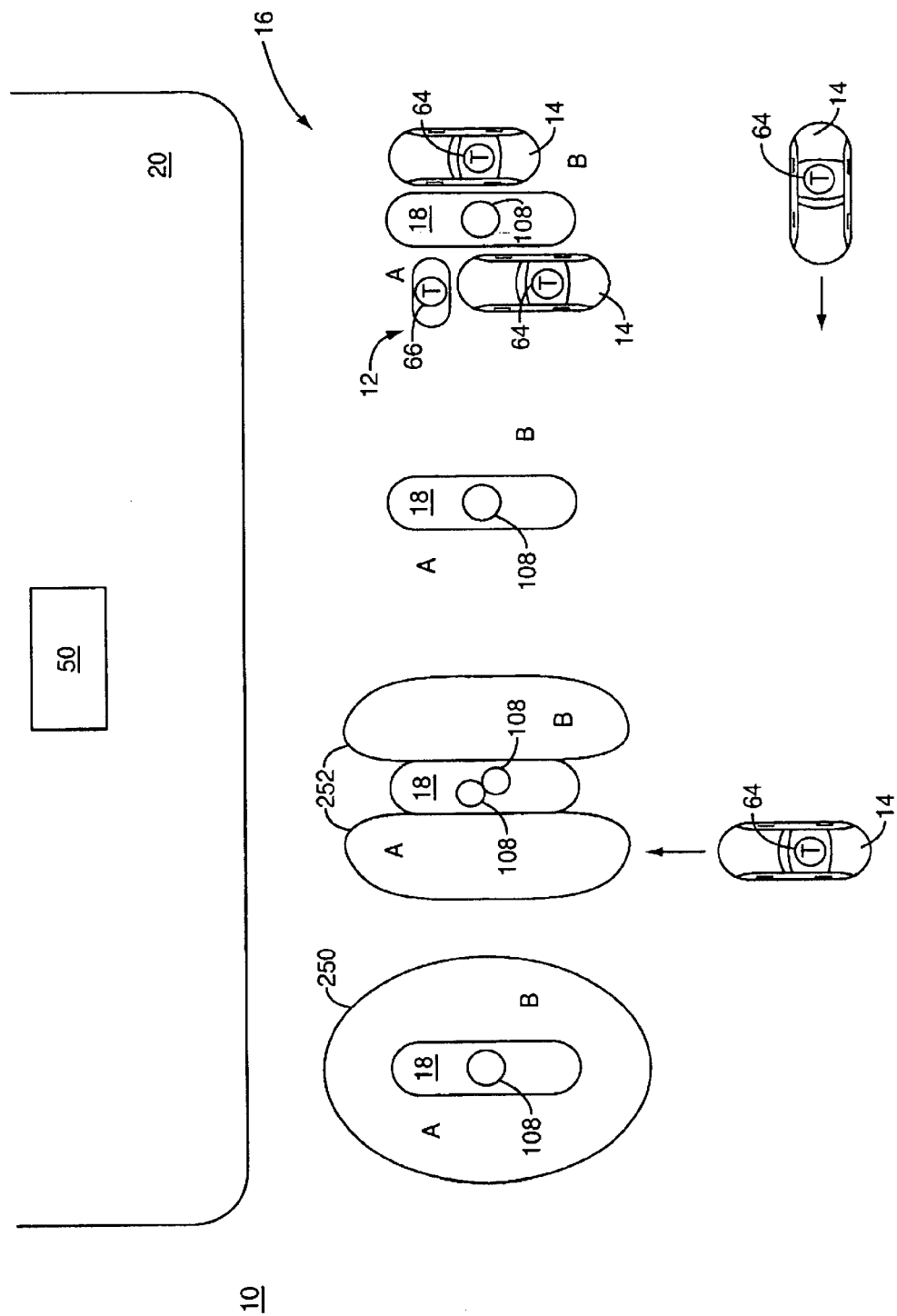
FIG. 13A is an overhead schematic representation of a fueling environment having antenna arrangements providing various interrogation fields.

Turning now to FIG. 13A, an alternative fueling environment is shown having a station store and the central control system 50 configured to communicate with each of the dispensers 18. Multiple vehicles 14 are depicted in and around the various fuel dispensers 18. Each of the dispensers may include an antenna 108. These antennas 108 may be operatively associated with a corresponding dispenser interrogator 52 and dispenser control system 80 (see FIG. 5). Please note that antenna placement will depend upon the application and may include placing the antennas anywhere in the fueling environment separate from the dispensers 18. Placing the antennas at non-dispenser locations is especially operable in applications where the antennas are used to determine transponder location.

The antenna 108 and dispenser 18 configuration in FIG. 13A is specifically adapted to determine the proximity of a vehicle relative to a particular fueling position A, B associated with each dispenser 18. The different reception patterns are depicted in association with the two left most dispensers 18. The circular reception pattern 250 would be used to determine the proximity of a vehicle with respect to a particular dispenser 18. Generally, only one antenna 108 is required for such an embodiment. As a vehicle approaches the dispenser having the circular pattern 250, the dispenser's corresponding interrogator 52 and dispenser control system 80 will receive a signal transmitted from the transponder 12, 14. The dispenser control system 80 will analyze certain characteristics of the signal received from the transponder, such as magnitude or strength, to determine a relative proximity to the dispenser. Typically, a dispenser 18 having an antenna configuration providing the basic circular pattern 44 is not able to distinguish at which side or fueling position A, B, the vehicle is positioned.

Figure 16:
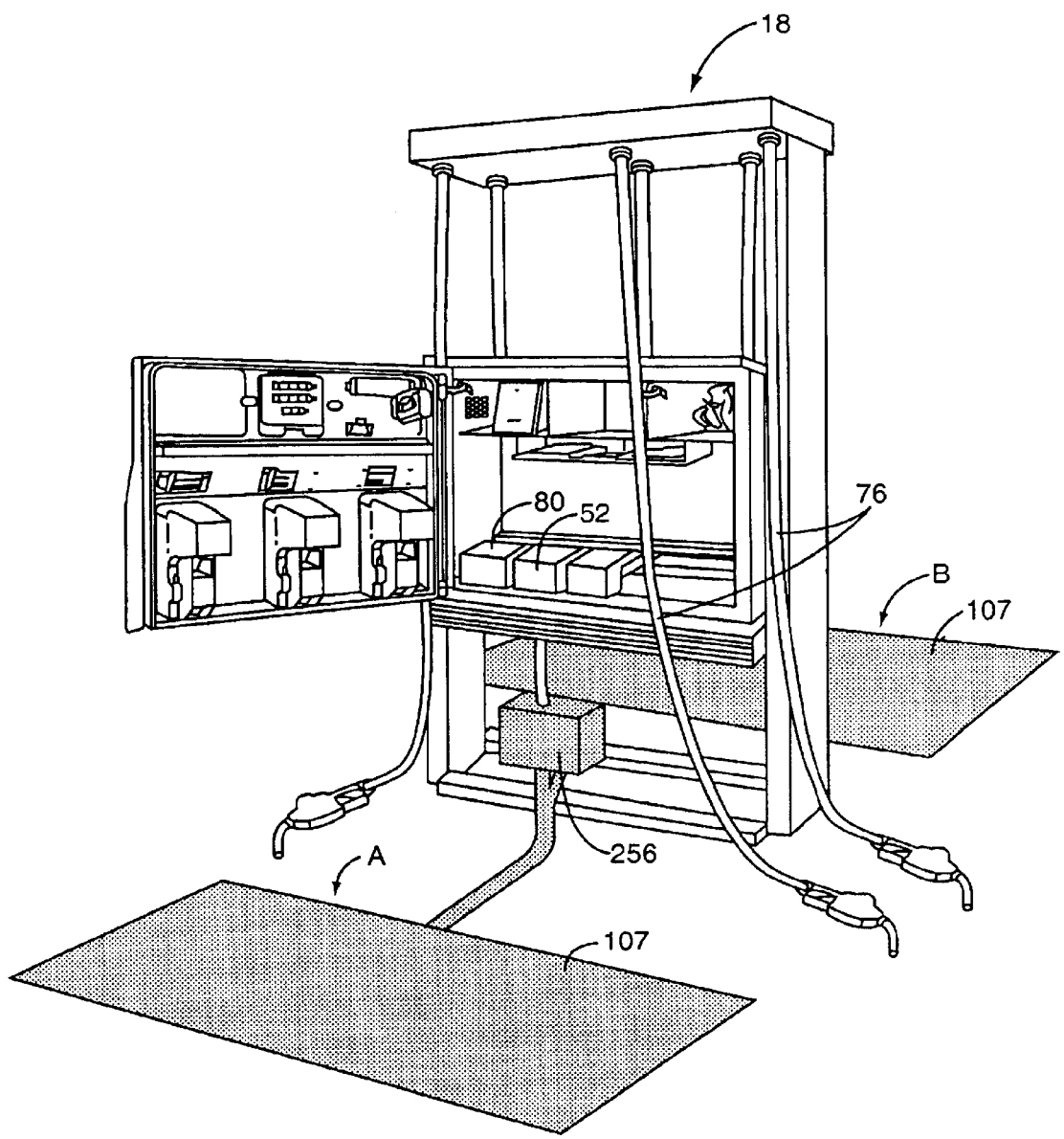
FIG. 16 is a perspective view of a fuel dispenser having underground antennas constructed according to the present invention.

A dual-lobed pattern 252 associated with the second dispenser 18 from the left in FIG. 13A provides the dispenser control system 80 the ability to determine at which fueling position A, B the vehicle is located or approaching. In order to determine the particular fueling position A, B, a directional component is necessary in addition to the proximity component described above. To provide this directional component, multiple antennas may be used to create various types of reception lobes where the antennas may be configured to only receive signals from certain pre-set directions or areas. Regardless of the configuration, the dispenser control system 80 will monitor a characteristic of the signal determinative of proximity, such as magnitude or strength, in conjunction with determining the fueling position A, B to which the signal appears most proximate. In the dual-lobed embodiment 252, the dispenser control system 80 may measure the signal characteristics received at both antennas 108 to determine from which antenna the received signal was strongest in order to determine direction. Using directionally configured antennas will allow each antenna to focus on one fueling position. Alternatively, placing the antennas 107 in the forecourt under each fueling position allows for easy determination of vehicle placement relative to a fueling position as shown in FIG. 16.

The dispenser control system 80 may include electronics capable of detecting signal strength or magnitude and monitor for variations therein. The magnitude monitoring circuitry 256 preferably includes automatic gain control electronics feeding the received signal into an analog-to-digital converter. Signal strength is turned into an 8-bit digital string corresponding to a signal magnitude. The dispenser control system 80 will monitor the string for variations in signal strength. As the signal magnitude increases, the dispenser control system 80 will determine that the transponder is approaching, and vice versa.

Figure 14A:
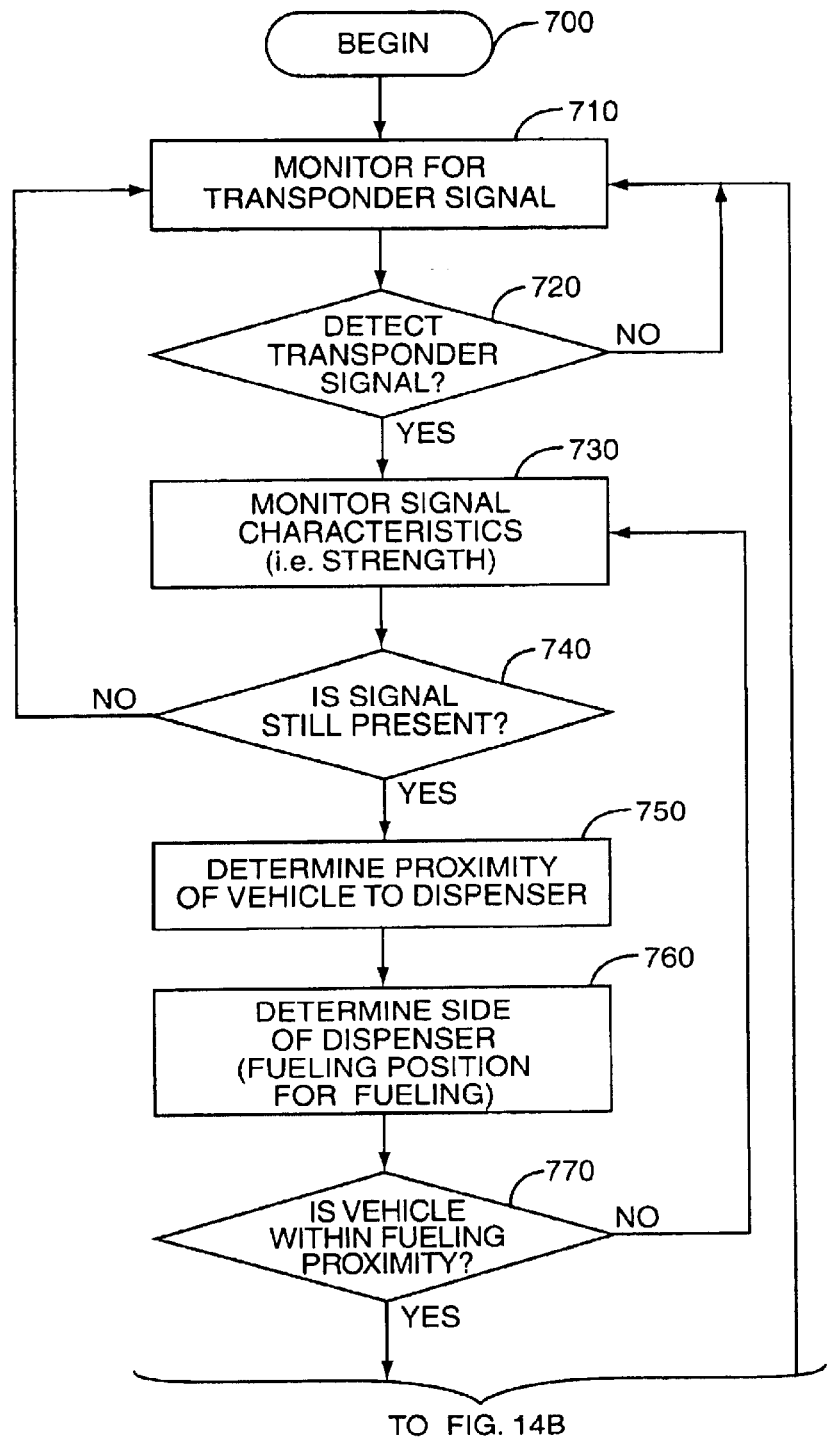
FIGS. 14A and 14B are a flow chart of a basic process for determining the proximity or location of a transponder with respect to a particular fueling position at a dispenser according to the present invention.
Figure 14B:
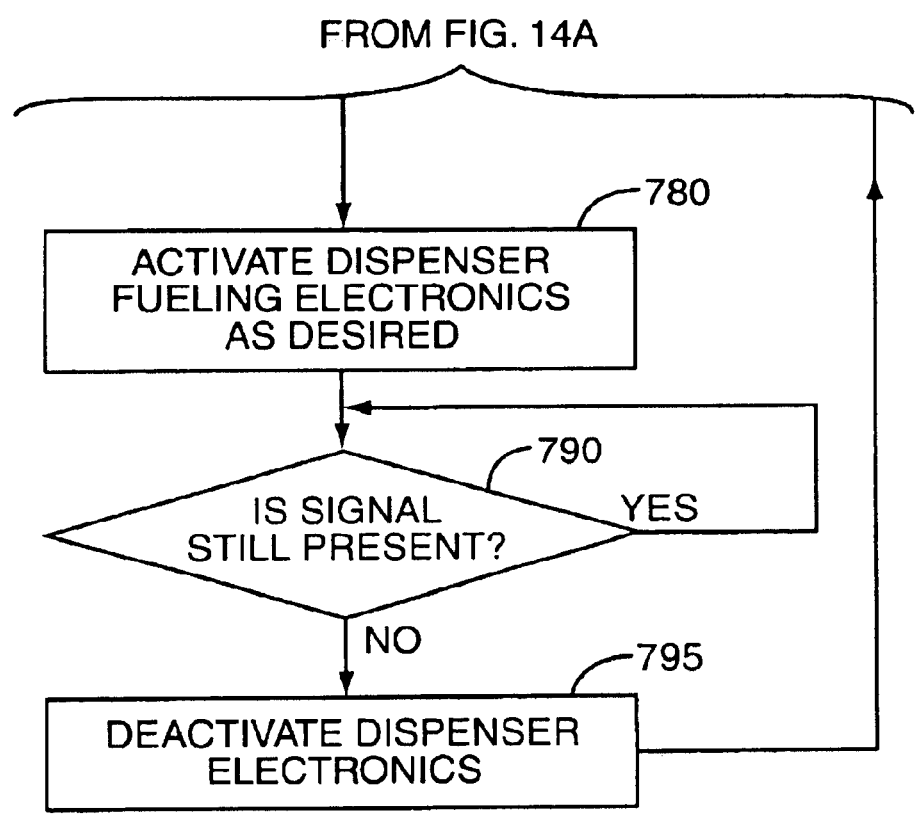
Figure 15:
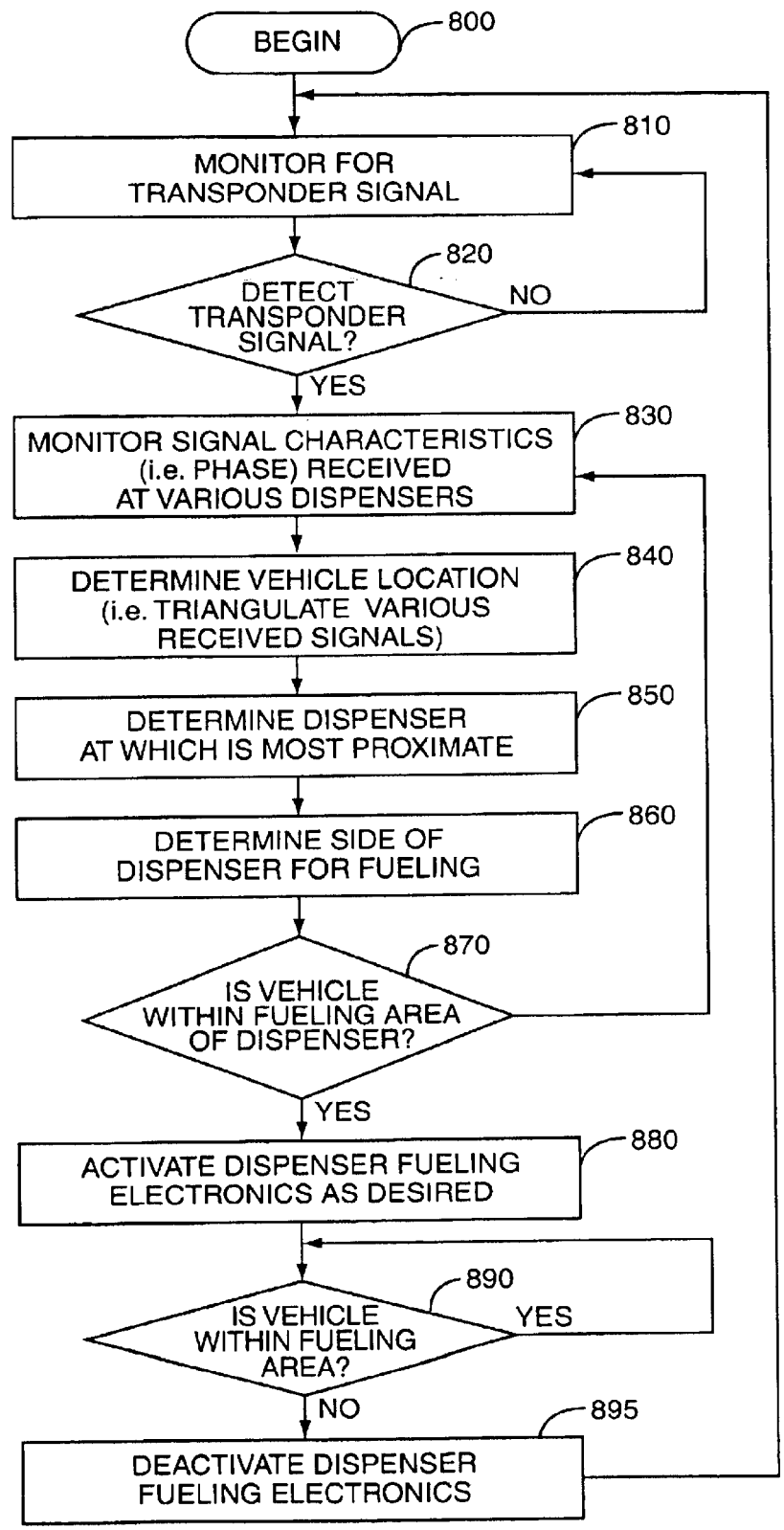
FIG. 15 is a flow chart of a basic control process for determining transponder location for an embodiment similar to that depicted in FIG. 13B.

The flow chart of FIGS. 14A and 14B outlines the process undertaken by the dispenser control system 80 to determine the proximity or location of a transponder 64, 66 with respect to a particular fueling position A, B of a dispenser 18. The process begins (block 700) with the dispenser control system 80 beginning to monitor for a transponder signal (block 710). The signal may originate from an active transmitter in the transponder or may reflect or scatter back to a dispenser interrogator 52 and antenna 108. Upon detection of a transponder signal (block 720), the dispenser control system 80 will monitor a characteristic, such as magnitude or phase of the signal (block 730). At this point, the dispenser control system 80 recognizes a transponder 64, 66 as near or approaching the dispenser 18 and continues to monitor for the presence of the signal (block 740). If the signal is lost or decreases, the dispenser control system 80 will determine that the transponder has left or is leaving the reception area and will begin to monitor for a new transponder signal (block 710). If the signal remains present and/or increases, the dispenser control system 80 will determine the proximity of the vehicle with respect to the dispenser (block 750). Preferably, the dispenser control system 80 will monitor to determine whether or not the signal strength is changing to ensure that the vehicle-mounted transponder 64 does not move during the fueling operation.

In order to determine the particular fueling position A, B at which the transponder is located, the dispenser control system 80 must determine which side of the dispenser the vehicle is at or approaching (block 760). The dispenser control system 80 may simply monitor the signal with antennas at or near the particular fueling position designed to receive using a directionally sensitive antenna configuration, such as the embodiment of FIGS. 12A and 12B, the dual-lobed configuration 252 of FIG. 13A, or the underground antennas 107 shown in FIG. 16.

Reference is again directed to FIGS. 14A and 14B. As a transponder approaches a particular fueling position A, B, the dispenser control system 80 determines if the transponder is within a certain fueling proximity (block 770). When the vehicle is within fueling proximity, it is in a position close enough for the fuel dispenser 18 at the corresponding fueling position A, B to allow fueling of the vehicle. If the vehicle is not within fueling proximity, the dispenser control system 80 continues to monitor the strength and direction of the signal (blocks 730–760). The dispenser control system 80 may determine whether the transponder or vehicle is within fueling proximity by simply receiving the transponder signal, receiving a signal magnitude above a predefined threshold, and/or determining whether the signal magnitude is changing, indicating that the transponder and vehicle are moving.

Once the vehicle is in position for fueling, the dispenser control system 80 activates the dispenser's fueling electronics as desired (block 780). During the fueling operation, the dispenser control system 80 continues to monitor for the presence of a signal in decision block 790. When the signal is no longer present, the dispenser electronics are deactivated at block 795, and the dispenser control system 80 monitors for the next transponder signal at block 7causing the process to repeat.

Figure 13B:
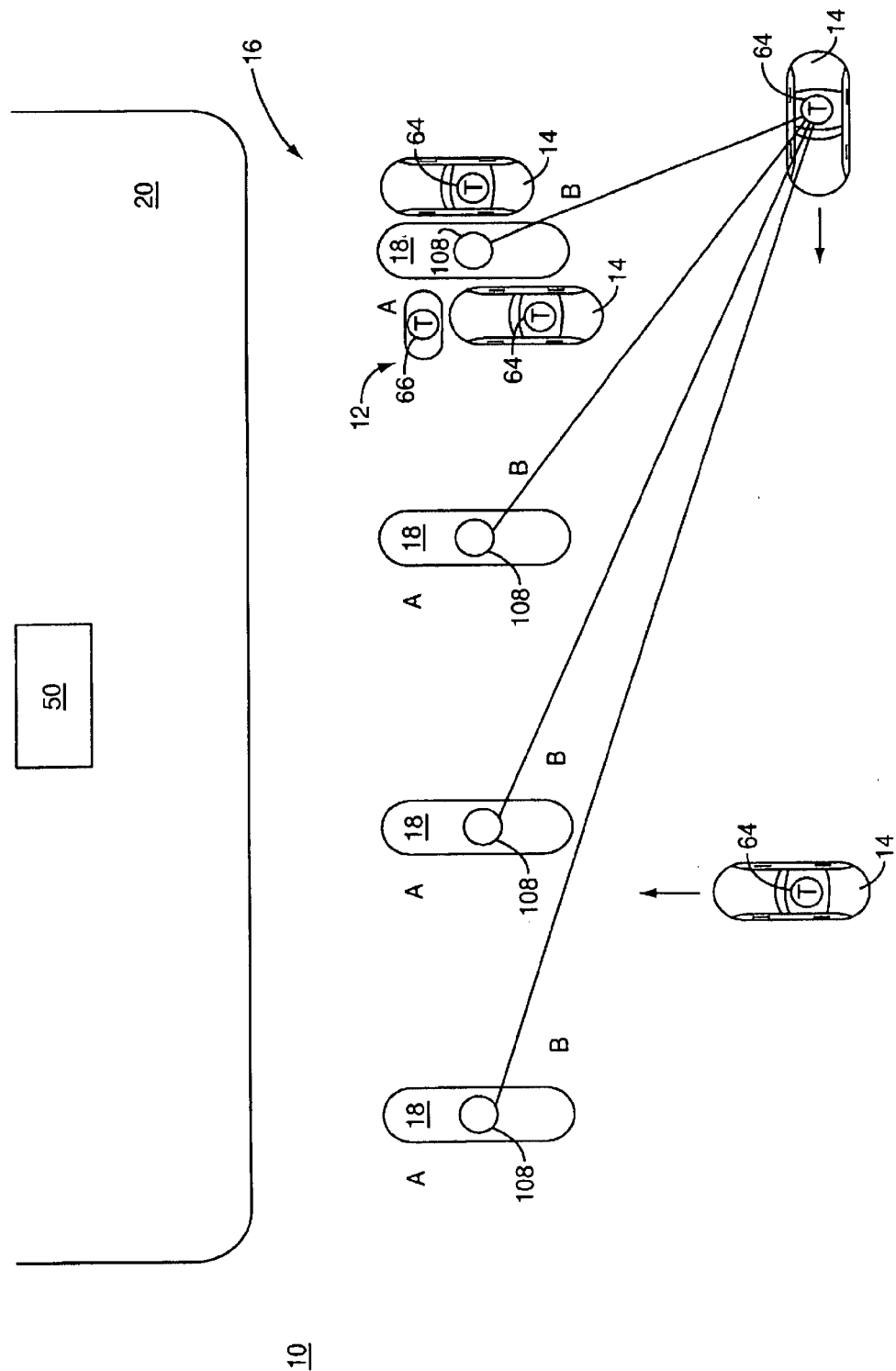
FIG. 13B is an overhead schematic representation of a fueling environment having antenna arrangements providing continuous location monitoring of transponders in the fueling environment.

FIG. 13B depicts an embodiment wherein the location of transponders may be tracked as they travel throughout the service station environment 10. In this embodiment, the dispensers 18 each include an antenna 108 capable of receiving a signal from a transponder 64. Preferably, signals from the antennas 108 are multiplexed together at the central control system 50. The various control systems will receive the transponder signal and monitor the location of the vehicle and determine the dispenser 18 and fueling position A, B at which the vehicle stops. The dispenser control system 80 may, for example, monitor a characteristic, such as the phase, of the signal received by the various antennas 108 associated with the dispensers 18 and use known computational techniques, based on the signal characteristics received at the various antenna locations, to determine vehicle location. One such technique using phase differences is triangulation.

Although the signal of only one vehicle transponder 64 is depicted, the various dispensers 18 and/or the central control system 50 may monitor for the presence and location of a plurality of vehicles to determine proximity, direction of travel and location throughout the fueling environment 10. Triangulation and other similar positioning and locating techniques generally require at least two antennas and provide better resolution as the number of antennas 108 increase. The location of the respective antennas 108 may be virtually anywhere in the fueling environment 10. Another alternative to multiplexing the various antennas located at the respective dispensers 18 or elsewhere in the fueling environment is to use multiple antennas in each dispenser or throughout the fueling environment 10. Additionally, a global positioning system (GPS) could be used to communicate vehicle position directly or through a remote network 94 to the central control system 50 and on to the fuel dispenser 18.

The flow chart of FIG. outlines the control process for the embodiment depicted in FIG. 13B. The process begins (block 800) and initially monitors for the presence of a transponder signal (block 810). Once the signal is received (block 820), the dispenser control system 80 monitors the characteristics of the signal for various antennas (block 830). The dispenser control system 80 will next determine the location of the transponder (block 840) using the monitored signal characteristics at the various antennas to triangulate or otherwise determine vehicle location. The precise fueling position A, B of the corresponding dispenser 18 is determined (blocks 850 and 860) by calculating the position at which the vehicle stopped. The dispenser control system 80 for the dispenser where the vehicle stopped will determine if the vehicle is within the fueling area (block 870). If the vehicle is within the fueling area, the dispenser's fueling electronics are activated as desired (block 880). The dispenser control system 80 will continually monitor the location of the vehicle to determine if the vehicle remains within the fueling area (block 890). Once the fueling operation is over and the vehicle leaves the fueling area, the dispenser control system 80 deactivates the dispenser's fueling electronics (block 895) and monitors for a new transponder signal (block 810), whereupon the process is repeated.

With respect to FIG. 16, an embodiment depicting underground antennas 107 is shown. The two antennas 107 correspond to fueling positions A and B. The antennas are preferably multiplexed at an antenna multiplexer 256. The multiplexer 256 sends the multiplex signals received by the corresponding antenna 107 to the interrogator 52.

Preferably, intrinsically safe barriers are used to provide electrical isolation between the antennas and the multiplexer 256 and/or interrogator 52.

Dual-stage Preconditioning and Authorization Using Transponders

There are numerous examples of transponders being used in fleet-type applications for identifying a vehicle as being authorized to receive fuel at a specific fueling site. There are examples of radio frequency transmissions being used to interface with onboard vehicle computers for the purpose of transferring vehicle information to various locations, such as toll plazas, fuel dispensers and parking garages. A number of schemes are known for identifying an individual for completing financial transactions. These typically involve personal identification numbers (PIN), which are "secret" codes known only to the consumer and used in conjunction with financial account information in order to complete a transaction. These schemes typically include standard debit cards with associated PIN's, contact and contactless smart cards with associated PIN's, and smart-wired and wireless PIN pads used in conjunction with card reading devices such as the devices disclosed in U.S. Pat. No. 4,967,366 to Kaehier.

Consumers have reacted favorably as the petroleum retailing industry has accepted card readers in the dispensers as a means for reducing the time required to complete payment for gasoline transactions. However, both consumers and the industry desire still further improvements of transaction efficiencies. One aspect of the current invention is to use transponder technology in a fueling environment to simplify the financial payment operation associated with the transaction at a fuel dispenser and provide an enhanced level of security such that basic transponder communications cannot be "tapped" by unauthorized devices and personnel in order to replicate communications to generate fraudulent transactions. This aspect involves an initial radio frequency identification process to provide preconditioning of the fuel dispenser, followed by an authentication process to provide transaction security for the financial aspects of the transaction. The invention is applicable to both vehicle-mounted 64 and personal transponders 66, and, in certain embodiments, may require a second transponder associated with the vehicle or customer for the authentication step. The secondary authentication process may require the customer to enter a PIN, speak for a voice match, or supply a physical identifier, such as a fingerprint, or other biometric identifier. Preferably, a voice print or other biometric signature of the customer is taken and stored in the transponder's memory or a database associated with the dispenser control system. Thus, the information must be received from the transponder or the database associated with the dispenser control system as necessary. Alternatively, a second transponder may be used for part of the process to supplement and authenticate the first transponder, or the first transponder may act alone and provide a secondary transmission capable of authenticating the first transmission.

Figure 17:
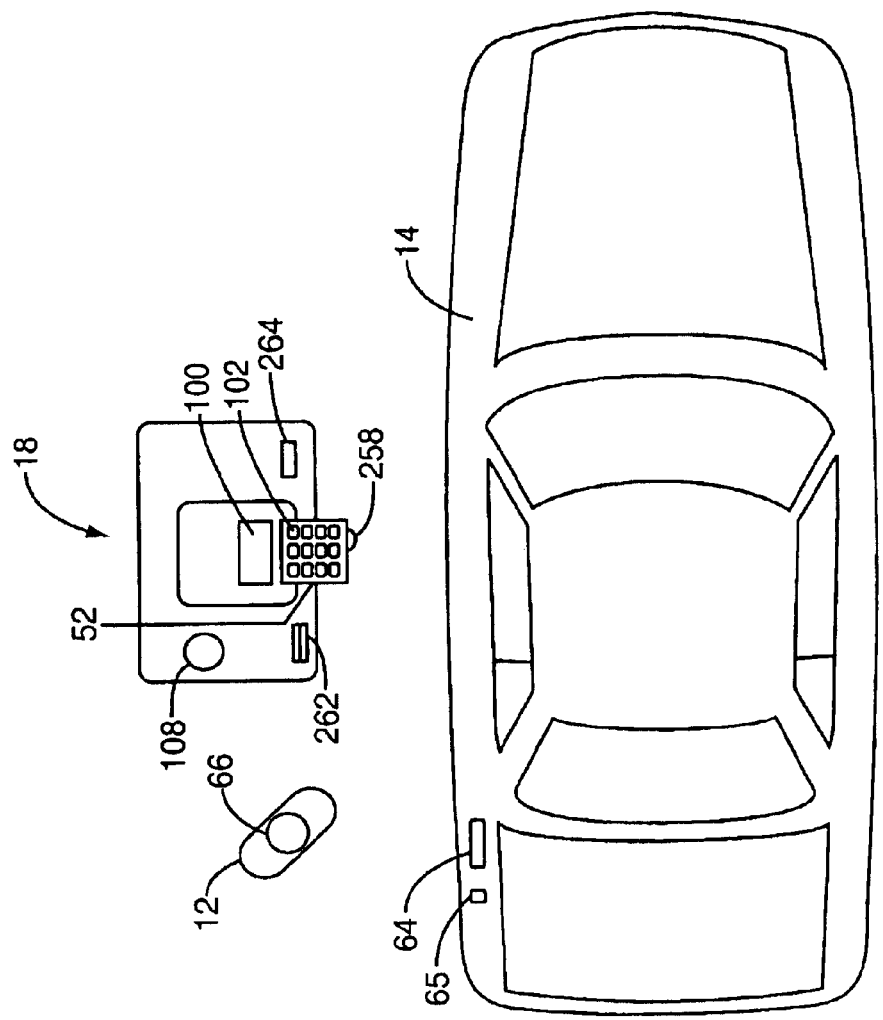
FIG. 17 is an overhead schematic representation of a fuel dispenser constructed according to the present invention.
Figure 18A:
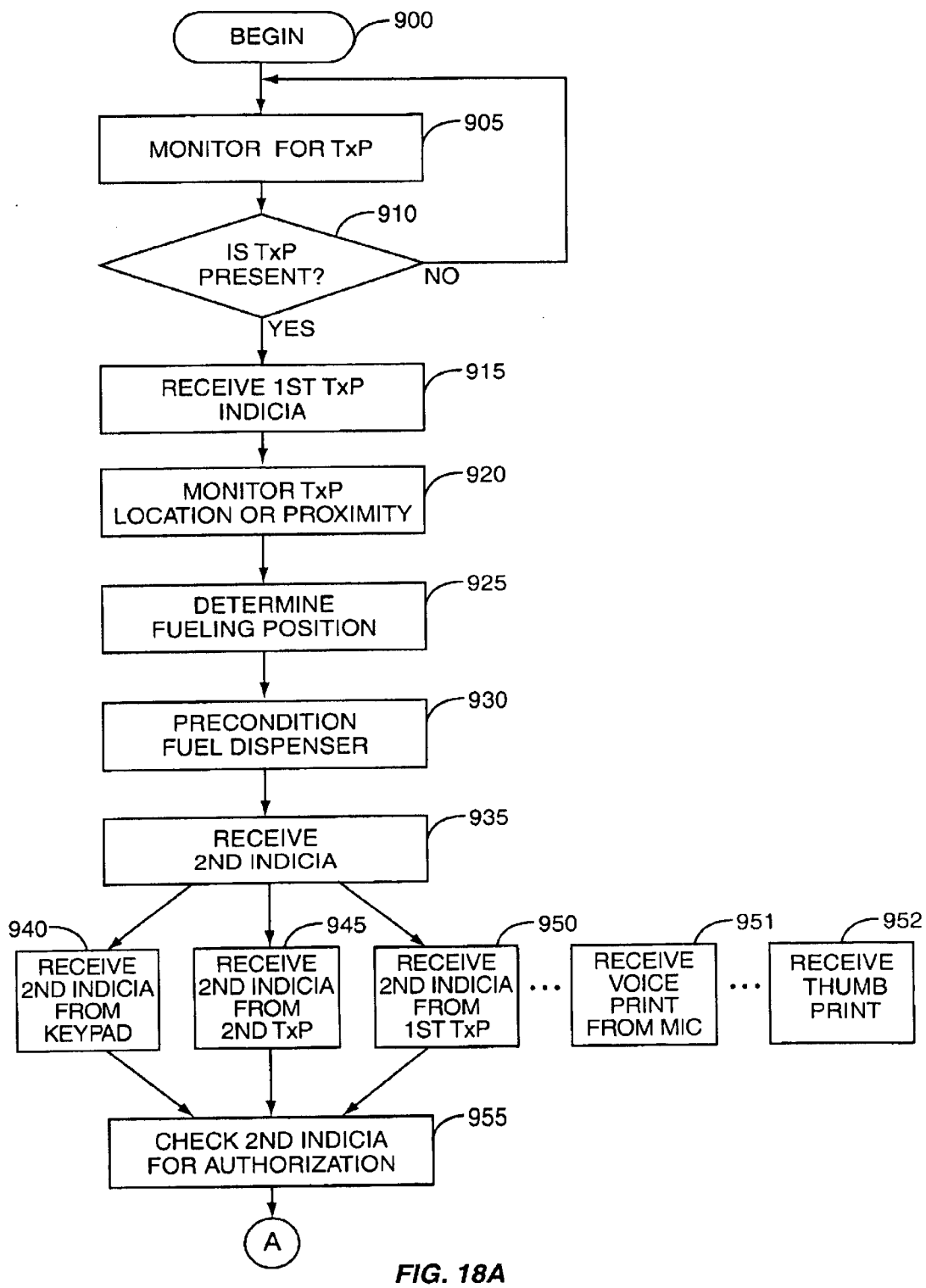
FIGS. 18A and 18B are a flow chart of a basic process for preconditioning a dispenser followed by secondary transaction authorization according to the present invention.
Figure 18B:
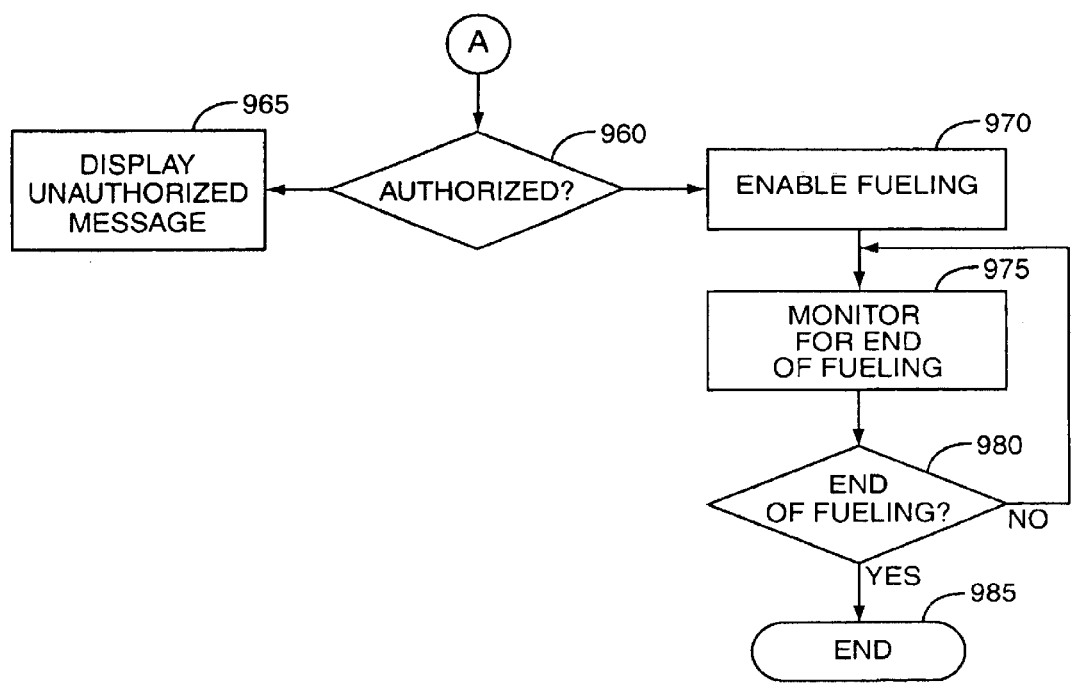

Attention is drawn to FIGS. 17, 18A and 18B wherein a schematic and flow chart are depicted detailing the system and process of a preferred embodiment implementing dispenser preconditioning followed by a transaction authorization. In FIG. 17, a vehicle 14 has a first vehicle-mounted transponder 64 and a second vehicle-mounted transponder 65. The customer 12 may also have a personal transponder 66. Although not depicted, fuel dispenser 18 is preferably connected as discussed above with the central control system 50, and includes a customer interface having a display 100 and key pad 102, a dispenser interrogator 52 and an associated antenna 108. The dispenser may also include a microphone 258 operatively associated with audio processing circuitry 260 (see also FIG. 5) and a video camera 262. The microphone 258 and camera 262 may provide a bidirectional audio/video intercom between the dispenser 18 and the QSR or convenience store operator interfaces. In this application, the microphone 258, in conjunction with the audio processing circuitry 260 or the camera 262, may function to provide a voice print of the customer or an image of the customer to authenticate a transponder. Likewise, a fingerprint imager 264 may use a customer's fingerprint to authenticate the transponder.

With this dispenser architecture in mind, specific reference is made to the flow chart of FIGS. 18A and 18B. As a customer 12 approaches a fueling station (within vehicle 14), and, in particular, a fueling position at a dispenser 18, either the customer transponder 66 or vehicle transponder 64 is initially interrogated as the interrogator 52 monitors for the presence of a transponder (blocks 900 and 905). Typically, the interrogator 52 in conjunction with the dispenser control system 80 will continuously check to see if a transponder is present (block 910). If a transponder is not present, the dispenser control system 80 will continue to monitor for the transponder (block 905). If a transponder is detected, the dispenser control system 80 will receive indicia from the first transponder corresponding to the particular transponder's identification information (block 915). Preferably, the dispenser 18 will continuously monitor the transponder's location or proximity to a particular fueling position (block 920). Further information is provided relating to vehicle monitoring and positioning in applicants' U.S. patent application entitled INTELLIGENT FUELING filed on Dec. 6, 1996, Ser. No. 08/759,733, the disclosure of which is incorporated herein by reference.

Typically, the transponder is read using energy provided from the antenna 108 located on the dispenser 18, forecourt 16, or anywhere else in the fueling environment 10. The transponder may respond to this energy by providing signals to the dispenser interrogator 52. The dispenser control system 80 will operate to determine the general location or proximity of the vehicle 14 with respect to a corresponding fueling position at the fuel dispenser 18. Preferably, the dispenser interrogator 52 will maintain constant contact with the transponder. The dispenser control system 80 will monitor transponder communications to determine the fueling position at which the vehicle (and customer) stop (block 925).

Once the appropriate fueling position is determined, information received from the vehicle (or customer) transponder is used to "precondition" the fuel dispenser 18 (block 930). Preconditioning means readying the dispenser for the fueling transaction. The extent of readiness may vary with each application, but may include determining the proper fuel, fuel type, flow rates for the vehicle and/or running initial checks on account information, or simply initializing the pump electronics. For example, a fuel dispenser may be preconditioned to a point where fueling will be authorized once secondary information is received to authorize the information used for preconditioning and/or the transponder. The customer may also elect to receive select information or targeted advertising as discussed below under "Customer Preferences." The preconditioning may take place solely at the fuel dispenser control system 80, in conjunction with the central control system 50, or may require communication with an on- or off-site database, such as the remote network 94. Having achieved the preconditioning of the dispenser based on a first transponder indicia, which is generally related to transponder identification, the financial aspects of the transponder are subsequently authorized.

Receiving additional or second indicia is required for authorization in addition to the indicia received for preconditioning (block 935). One option is to have the dispenser control system 80 adapted to prompt the customer to enter a PIN on the key pad 102 so that both the transponder data and an associated PIN number are made available to the appropriate database as a matched pair in order to obtain authorization and subsequent payment information (block 940).

Another option is to receive the second indicia from a second transponder, distinct from the first transponder that initially transmits the information for preconditioning (block 945). In this embodiment, the first transponder may be either an additional transponder 65 on the vehicle 14, or the personal transponder 66 carried by the customer 12. If the first or preconditioning transponder is transponder 64 on the vehicle 14, the second transponder providing authorization may be a customer transponder 66 or the other vehicle transponder 65. If the first or preconditioning transponder is the customer transponder 66, the second transponder may be one of the vehicle transponders 64, 65.

As easily seen, many configurations are available where a first transponder transmits information for preconditioning, and a second associated transponder provides information for authorization. Once the first transponder provides the preconditioning indicia, the second transponder will subsequently provide second indicia from which authorization or authentication is derived. This secondary indicia may be an authentication ID which is matched in a database in one of the associated control systems with the ID or information received from the first transponder. If the information from both transponders corresponds appropriately, the transaction is authorized.

A third alternative is to provide a transponder capable of providing both the first preconditioning indicia followed by a secure or encrypted transmission representing the second indicia required for authorization or authentication (block 950). Preferably, the transponder is capable of processing data received from the dispenser interrogator 52, processing or encrypting the data and transmitting the data or secure code back to the dispenser for authorization or authentication. Again, one of the control systems associated with the dispenser will compare the original preconditioning indicia and the second authorization or authentication indicia before authorizing the financial portion of a transaction and allowing the dispensing of and payment for fuel.

When only a customer transponder 66 is present (the vehicle transponder is not present), the transaction is initiated or preconditioned solely by the customer transponder 66 located on a key fob/ring or card. Upon selecting a fueling position, the customer will exit the vehicle and prepare for fueling. Preferably, the dispenser will read the customer transponder 66 and recognize that a vehicle transponder is not present. Such recognition may result from a vehicle transponder not being detected or information transmitted by the personal transponder indicating that a personal transponder is present or a vehicle transponder is not available. In this situation, the dispenser will prompt the customer for a PIN, which is compared with the information received from the transponder in order to authenticate the transaction. Optionally, the customer transponder is a secure, intelligent transponder capable of being read by the dispenser interrogator, providing information such as a code, performing a secured computation at the transponder, and responding with secondary information in order to validate the transponder and authorize the transaction.

Another option for secondary authorization or authentication indicia is to receive a voiceprint using the microphone 258 and audio processing circuitry 260 in conjunction with one of the associated dispenser control systems. Fingerprints may also be compared using the thumb- or fingerprint imager 264 (shown in FIG. 5).

Regardless of how the second indicia for authorization or authentication is received, one of the control systems will check the second indicia for authorization purposes as discussed above (block 955). If the control system determines the second indicia is not proper authorization or authentication of the first, preconditioning indicia, the control system will display a message indicating the transaction is not authorized (block 965) and will prevent fuel delivery. If the transaction is authorized (block 960), the control system will enable fueling (block 970) and monitor for the end of fueling (blocks 97and 980) until the transaction ends (block 985).

With the embodiments requiring second indicia from the same or separate transponder for authentication or authorization, the transponder is adapted to bi-directionally communicate with the dispenser, which further communicates with a host network 94 in cooperation with the central control system 50 to provide secure authorization of the transponder(s) and to enable transactions. In certain applications, it is desirable to avoid transmitting data from which valuable account or financial information could be derived between the tag and the dispenser, or the dispenser and the host network 94. Preferably, all or a majority of the account or financial information requiring absolute security is stored only at the host network 94. Thus, in the preferred embodiment, neither the transponders, dispenser 18 nor central control system 50 has access to critical financial or account information. In more localized applications, the central control system 50 may have access to such information.

Certain embodiments of the present invention also provide high levels of security for transmissions. In order to avoid placing certain information at risk during transactions, the invention provides a unique identifier indicia for each transponder, and the host network maintains account and financial information associated with the transponder having the unique identifier. The identifier is transmitted to the host network 94 through the dispenser 18 and central control system 50. The host network 94 checks to see that the transponder, and not a counterfeit, has provided the identifier. Once the host system determines that an authorized transponder sent the identifier, the host network 94 authorizes the dispenser to further interact with the transponder and authorize subsequent transactions based thereon.

Figure 19:
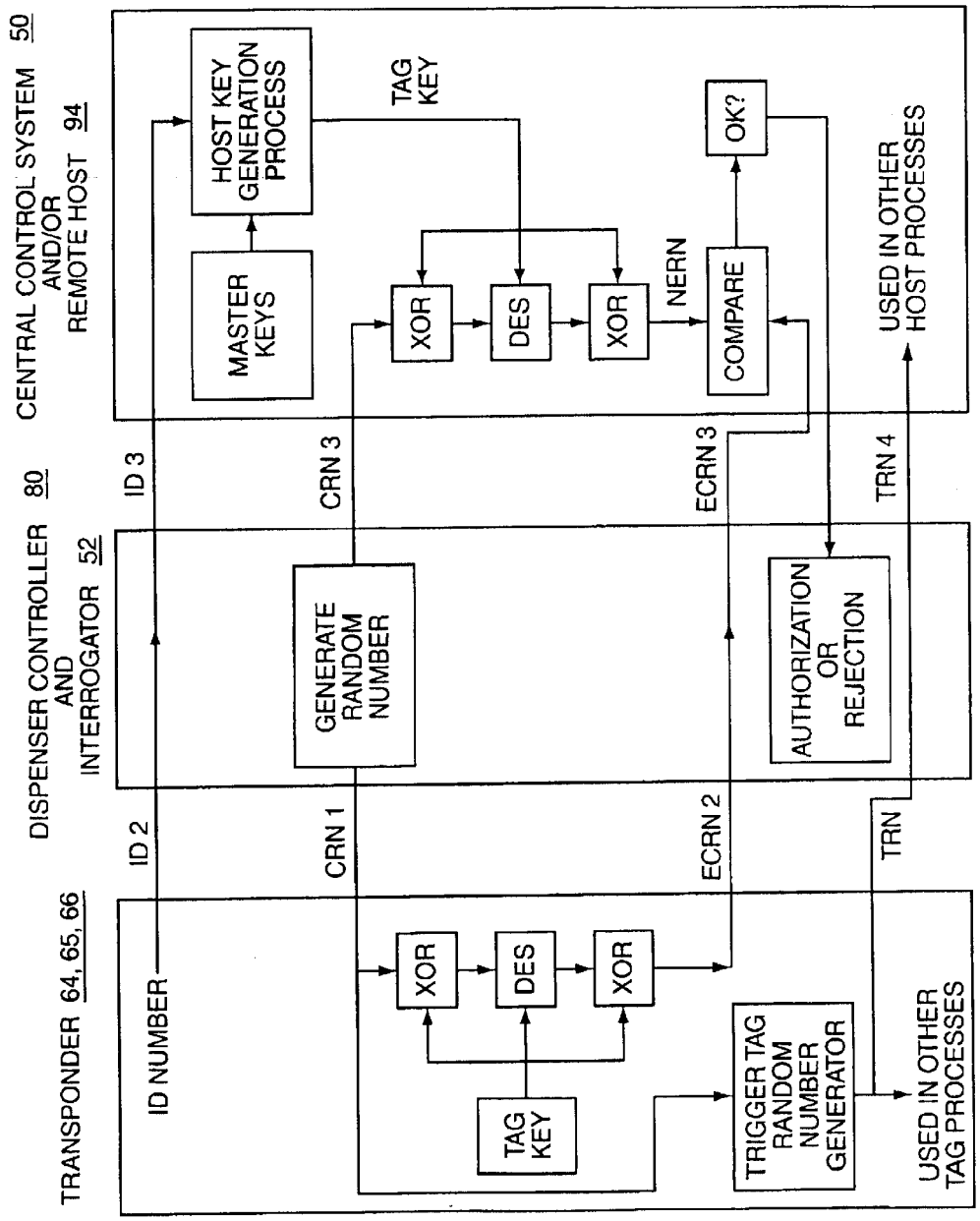
FIG. 19 depicts a preferred process for providing secure communications between a transponder and a host network through a fuel dispenser.

Preferably, the transponder is authenticated using cryptography techniques known only by the transponder and host, but not by the dispenser or central control system 50. The preferred authentication or authorization process is shown in FIG. 19. In step one, the dispenser control system 80, in conjunction with the dispenser interrogator 52, generates and sends a random number (CRN) to the transponder. The transponder will encrypt the random number (CRN) and return the encrypted random number (TRN) to the dispenser along with a transponder identification number (ID) in step two. In step three, the dispenser 18 relays the transponder ID, the encrypted random number (TRN) received from the transponder, and the random number (CRN) to the host network 94 without modification. When using the host network 94, this information is transferred through the central control system 50. In more localized applications, the primary functions of the host network 94 may be provided by the central control system 50. In the preferred embodiment, the tag ID number is 10 bytes, the random number (CRN) is 8 bytes, and the encrypted random number (TRN) is 8 bytes.

Upon receipt of the transponder ID from the dispenser 18 (through central control system 50), the host network 94 calculates or looks up in a database a main transponder key associated with the transponder using the transponder ID. Preferably, the host network 94 will have initially generated the main keys stored in the transponder and will use the same keys to cryptographically communicate with the transponder. The host network 94 will have cryptography electronics adapted to encrypt the random number using the main transponder key and compare the result to the encrypted random number received from the transponder. If the numbers match, the transponder is a valid transponder, and most likely not a counterfeit. The host network will then use the ID number to look up transaction billing data or other customer related information corresponding to the transponder and authorize the dispenser to carry out the desired and authorized transactions in step four. Additional information is provided in U.S. patent application Ser. No. 08/895,417 filed Jul. 16, 1997, entitled CRYPTOGRAPHY SECURITY FOR REMOTE DISPENSER TRANSACTIONS in the name of William S. Johnson, Jr., the disclosure of which is incorporated herein by reference.

Transponder Theft

Figure 20:
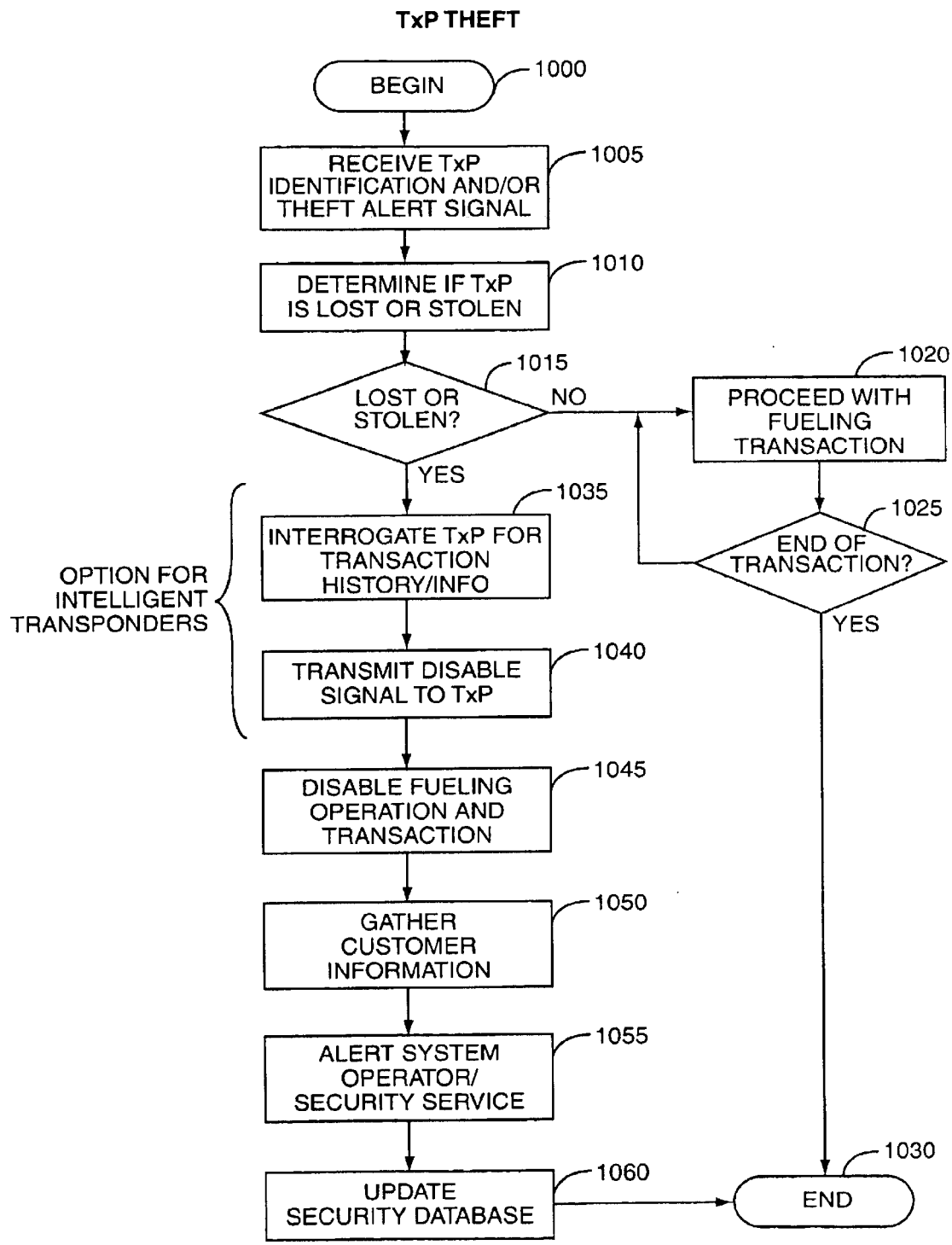
FIG. 20 is a flow chart of a basic transponder interaction for providing theft deterrence and prevention according to the present invention.

With the enhancements and transaction efficiency associated with using transponders, security concerns arise based on theft of information transmitted to and from the transponders, as well as theft of the transponders themselves. The present invention addresses the issue of stolen transponders in a number of ways. Preferably, a database is maintained, which keeps track of stolen or lost transponder ID's and is checked by the dispenser or central control system prior to authorizing each fueling operation in which transponders are used. The database may be kept at the dispenser, central control system 50, or at the remote network 94 for more regional and national protection. Where the transponder is intelligent, the dispenser control system 80 deletes a fraudulent transponder. The dispenser control system 80 may send a signal to the transponder 64, 66 to disable the transponder, act to inhibit future transactions, or alert other fueling environments when subsequent transactions are attempted. The basic flow of this theft deterrent and prevention system is shown in FIG. 20 wherein a fueling process begins (block 1000) and the transponder ID is received (block 1005). In addition to the transponder ID, the transponder may inform the dispenser control system 80 that the transponder has been stolen or is being used by an unauthorized party. This theft or unauthorized use signal is preferably generated by the transponder in response to a dispenser in a subsequent transaction attempt transmitting a form of disabling signal to the transponder. Transmission of this signal is described in greater detail below.

The dispenser will next determine if the transponder is lost or stolen based on the signals received from the transponder by accessing a local or national database listing transponders which were lost, stolen or used by unauthorized parties (block 1010). After comparing the transponder ID with those listed in the database, the dispenser will decide whether or not the transponder is lost, stolen or being used by an authorized party (block 1015). If the transponder does not appear in the database, the dispenser will proceed with the fueling transaction (block 1020) until the end of the transaction is reached (blocks 1025 and 1030). If the dispenser determines that any use of the transponder is unauthorized from any one of the local or national databases, the dispenser will preferably interrogate the transponder to download any transaction history or information available on the transponder to help track unauthorized uses and determine the identification of the unauthorized user (block 1035). For example, the transponder may be able to track the various locations in which the user attempted to use the transponder. If the user attempted to use any identification means in association with this transponder use, the prior dispensers and control systems may have attempted to transmit this user identification to the transponder for subsequent transaction attempts.

As noted above, an important aspect of one embodiment of the present invention is the dispenser's ability to transmit a disable signal to the transponder to prevent authorizations of unauthorized users and subsequent transaction attempts (block 1040). The disable signal may simply be a signal informing the transponder that any subsequent use is unauthorized. The signal may completely shut down the transponder to prevent any subsequent communications or disable any transaction authorization features while maintaining communication ability. In the latter case, the transponder may be used to help track unauthorized transaction attempts and identify the unauthorized user.

The dispenser will also disable the present fueling operation and attempted transaction (block 1045) before delivering fuel or authorizing a financial transaction associated with the transponder. During this time, the dispenser will attempt to gather as much customer information as possible (block 1050). For example, the dispenser control system 80 may mark any type of identification information received from the user as well as record any physical information possible, such as marking video taken from the camera 262 or audio from microphone 258 (block 1050). The system may also alert one or more of the operators of the fueling environment and one or more security services via the local or remote systems (block 1055). The system may be tied into a network which will alert the police or simply update the security database in order to maintain transaction or attempted transaction histories (block 1060) and the process will end (block 1030). Upon determining a transponder has been lost, stolen or used in an authorized manner, the system may communicate with the transponders to effectively lockout the dispenser as well as the transponder. Those of ordinary skill in the art will recognize that the preferred embodiments disclosed herein will not limit the inventive concept disclosed or protected by the claims that follow.

Drive-off Prevention

Similar to the theft prevention and general prevention of transponder use by unauthorized persons, steps must be taken to prevent authorized customers from using the transponder in unauthorized ways. Of primary concern is preventing a customer from driving off before paying for the fuel or any other purchases made at the dispenser or anywhere else in the fueling environment. In many situations, the complete financial transaction will require more than a purely remote interaction between the dispenser and transponder. The customer may be required to provide additional payment means, such as cash or a credit/debit/smart card. In a situation where the product or service may be delivered before the transaction is completed, the present invention will act to deter or prevent repetition of this event in the future. Notably, not all drive-offs are intentional, and the transponder may act with various fueling environments to remind the customer at a subsequent fueling transaction that a drive-off occurred during a previous operation.

Figure 21:
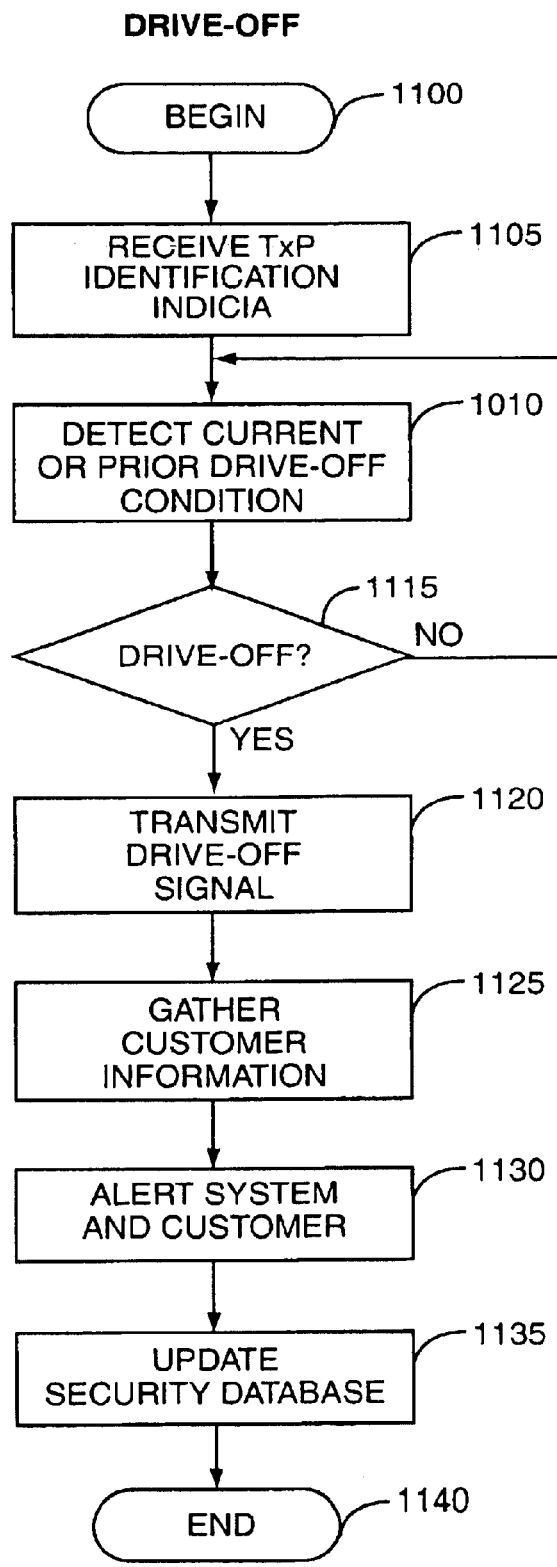
FIG. 21 is a flow chart of a basic transponder interaction for preventing drive-offs according to the present invention.

The flow of an embodiment of applicant's drive-off prevention process is shown in FIG. 21. The fueling operation will begin (block 1100) wherein the dispenser will receive transponder identification indicia, which is generally the transponder ID (block 1105). The dispenser control system 80 and/or central control system 50 will monitor the transaction to detect a drive-off condition (blocks 1110, 1115). The system will generally monitor for the drive-off condition until the transaction is both physically and financially complete. If a drive-off condition is detected (block 1115), the dispenser will transmit a drive-off signal to the transponder indicating the drive-off condition has or is occurring. The system will quickly gather any customer information from the transponder and from the fueling environment (block 1125) in the same fashion discussed with transponder theft. The dispenser will also alert the system operator, security personnel and, most importantly, the customer (block 1130). In many situations, the customer may have simply forgot to complete the transaction or may decide to abort the attempted drive-off after hearing the alert. If a drive-off occurs in spite of these warnings, a database associated with the local central control system 50 or the remote network 94 is updated accordingly. Once this database is updated, subsequent transactions will be prevented when the database is accessed to determine if prior drive-offs have occurred (see block 1 110). Alternatively, a transponder disable signal may be sent to the transponder before leaving the fueling area to lockout future transactions, as discussed in the previous section. The customer may be informed of the drive-off at the subsequent location in an attempt to perfect the prior transaction in which the drive-off occurred.

Transaction Guidelines and Limitations

Another unique aspect of an embodiment of the present invention is the ability to use transponders to provide guidelines and limitations on transactions associated with the transponder. These transactions may be cash, credit or debit type transactions so long as a transponder is communicably associated with the dispensing system somewhere before, during or after the fueling or purchase transaction. These guidelines and limitations on customer purchases are either stored in a database in association with a transponder ID and accessible by the dispenser or central control systems 80, 50 or transmitted from the transponder to the dispenser during each transaction. Regardless of the manner of access, the dispenser control system 80 and the central control system 50 will cooperatively operate to carry out transactions according to these guidelines and limitations.

Attempts to circumvent the guidelines or limitations will preferably result in a message to the customer or operator that the item or service presented for purchase is not available to that particular customer when the transaction is associated with the customer transponder. These guidelines and limitations may affect both fueling and non-fueling transactions. The guidelines and limitations may be used to set a particular dollar amount or limit what the customer associated with the transponder may spend, as well as limit the frequency and the types of purchases made by the customer. For example, parents may place limits on their children's spending amounts, snack purchases or the frequency of fill-ups, in addition to preventing the purchase of alcoholic beverages. Given the tremendous latitude made available with using such transponders for transactions, authorization controls provide safety and security features making the tasks of those supervising the customers associated with the transponders significantly easier. The invention is particularly useful for fleet fueling applications wherein drivers are limited to selected purchases and purchase amounts.

Figure 22:
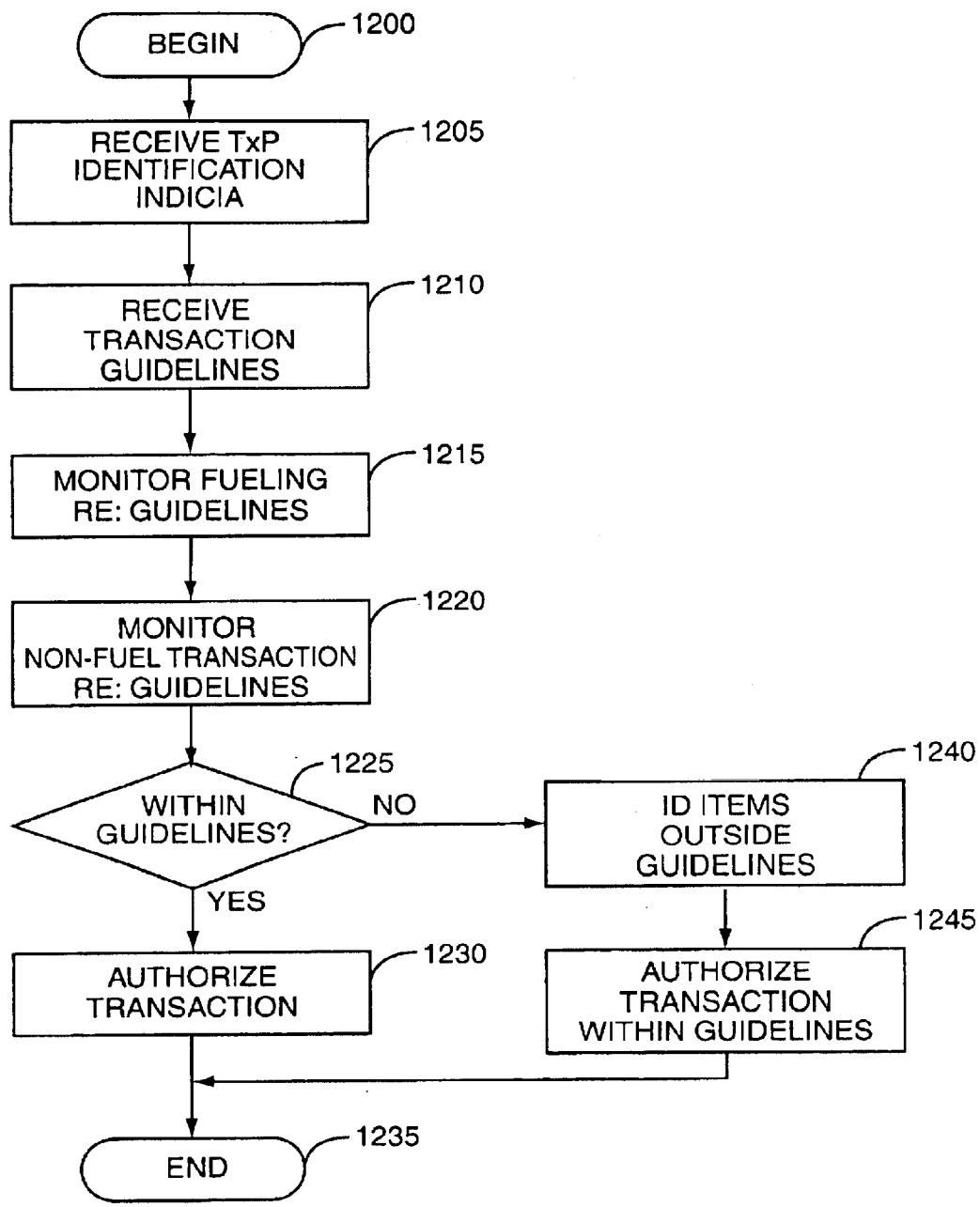
FIG. 22 is a flow chart of a basic process for providing guidelines or limitations for a fueling or purchase transaction made in association with a transponder according to the present invention.

With these concepts in mind, attention is directed to FIG. 22 depicting a general flow of a fueling or purchase transaction wherein transponder guidelines or limitations are enforced. Typically, the fueling operation will begin by a customer driving up to a fuel dispenser and an associated transponder transmitting identification indicia to the dispenser (block 1200). The dispenser control system 80 will receive the transponder identification indicia via the interrogator 52 (block 1205). At this point, the dispenser control system 80 and/or the central control system 50 will receive transaction guidelines from a database kept at the central control system 50 or the remote network 94. Alternatively, the dispenser control system 80 may receive the transaction guidelines directly from the transponder (block 1210).

Throughout the fueling operation, one or more of the control systems will monitor the operation to maintain fueling according to any guidelines or limitations as set forth above (block 1215). Additionally, the control systems will operate to monitor non-fuel transactions occurring before, during or after fueling to ensure that any guidelines or limitations are followed (block 1220). The non-fuel transactions may take place at the dispenser 18 or at one of the transaction terminals 30, 34 in the fuel station store. The control systems will monitor the purchases entered into the graphical user interface or scanned in by the operator. If the type, amount or frequency of the purchase is not within the guidelines or limitations, any such items are identified and the operator is alerted as necessary (block 1240).

If all of the fueling and non-fueling transactions are within the guidelines and limitations, the transaction is authorized (block 1230) and the transaction is ended (block 1235). The portions of the transaction which are authorized, if any, are allowed (block 1245) and the transaction is ended (block 1235).

Creating a Shadow Ledger

Given the significant advances in remote communications technology, remote communications units, or transponders as referred to herein, have ever increasing computational capabilities. As shown in FIGS. 4A and 4B, the transponders may have one or more controllers 124, 142 and a significant amount of associated memory 126. As noted, the transponders may be passive or active and may provide significant data processing and memory storage. In these "smart" transponder embodiments, it is preferable to keep a running tally of financial and transactional information. This is especially useful in 'smartcard-type embodiments wherein the transponder will actually provide prepaid functions directly on the transponder. In order to provide additional transaction security and tracking, a further aspect of the present invention is creating a shadow ledger at the central control system 50 or the remote network 94 of the transaction information stored on the transponder. This shadow ledger is updated during communications with the transponder. In this manner, transponder account information may be checked and the shadow ledger may be updated regarding transactions occurring outside of the fueling environment or associated transaction network.

Figure 23:
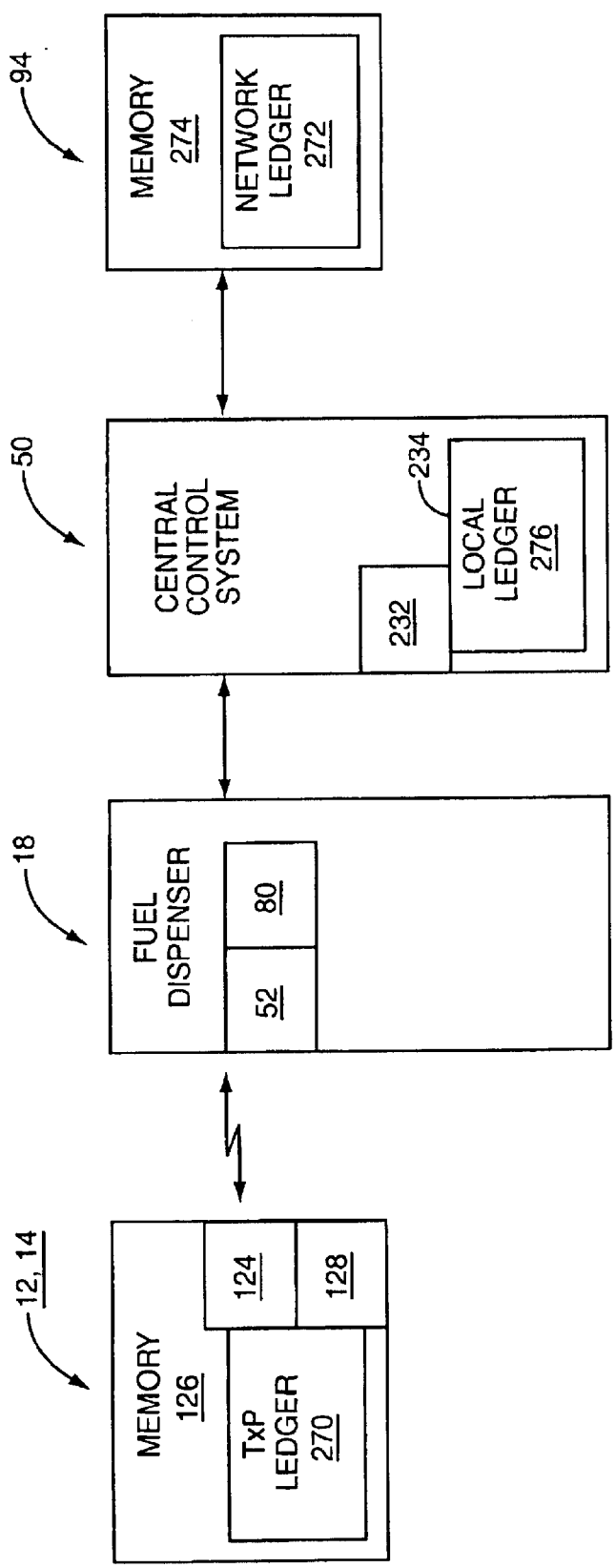
FIG. 23 is a schematic representation of a transponder and dispenser system for providing a shadow ledger of transponder transactions constructed according to the present invention.

Turning now to FIG. 23, a block diagram of the transponder 12, 14 is shown having controller communication electronics 124, memory 126 and software 128 sufficient to provide a transponder ledger 270. The transponder 64, 66 will communicate with a fuel dispenser interrogator 52 of a fuel dispenser 18. The fuel dispenser control system 80 will cooperate with the central control system 50 and its controller 232 to provide transaction and other transponder information to a remote network 94. The remote network 94 includes sufficient memory to provide a network ledger 272 for the particular transponder 64, 66 in communication with the fuel dispenser 18. The network ledger 272 is compared and updated as necessary during transactions involving the transponder 64, 66. Alternatively, a local ledger 276 may be kept at the central control system in memory 234.

Figure 24:
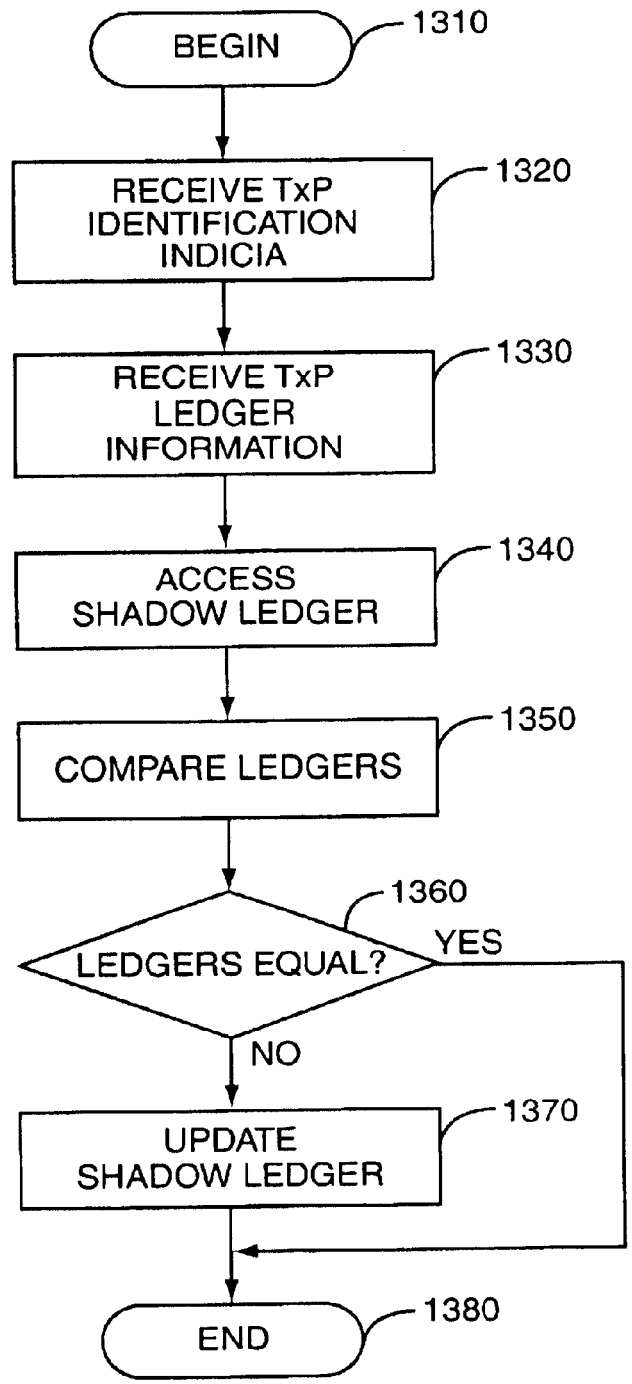
FIG. 24 is a flow chart of a basic process for maintaining a shadow ledger according to the present invention.

The basic process of maintaining a shadow ledger apart from the transponder is shown in FIG. 24. As a transaction process begins (block 1310), the dispenser 18 will receive transponder identification indicia (block 1320). The identification or other indicia may also indicate whether or not a transponder ledger is being kept or provide sufficient information to allow one of the control systems associated with the dispenser to access a database indicating whether or not there is a ledger for that particular transponder.

Next, the transponder will download the information in the transponder ledger 270 to the dispenser interrogator 52 and controller 80. The dispenser control system 80 will subsequently relay the transponder ledger information to the central control system 50 if a local ledger 276 is kept or relay the information to the host network 94, if a network ledger 272 is provided. The shadow ledger (local or network) is accessed for the particular transponder using the transponder identification indicia (block 1340) and the transponder and shadow ledgers are compared (block 1350). If the ledgers equate, no update is necessary and the process is ended (block 1360 and 1380). If the ledgers do not equate (block 1360), the shadow ledger is updated (block 1370) and the process is ended (block 1380). Keeping a shadow ledger and updating it as necessary when communications are available with the transponder provides additional security for transponder transactions, indicates transactions occurring outside of the ledger system or. associated network, and provides an up-to-date accounting accessible when the transponder is unavailable for communications.

Transaction Tracking

Figure 25:
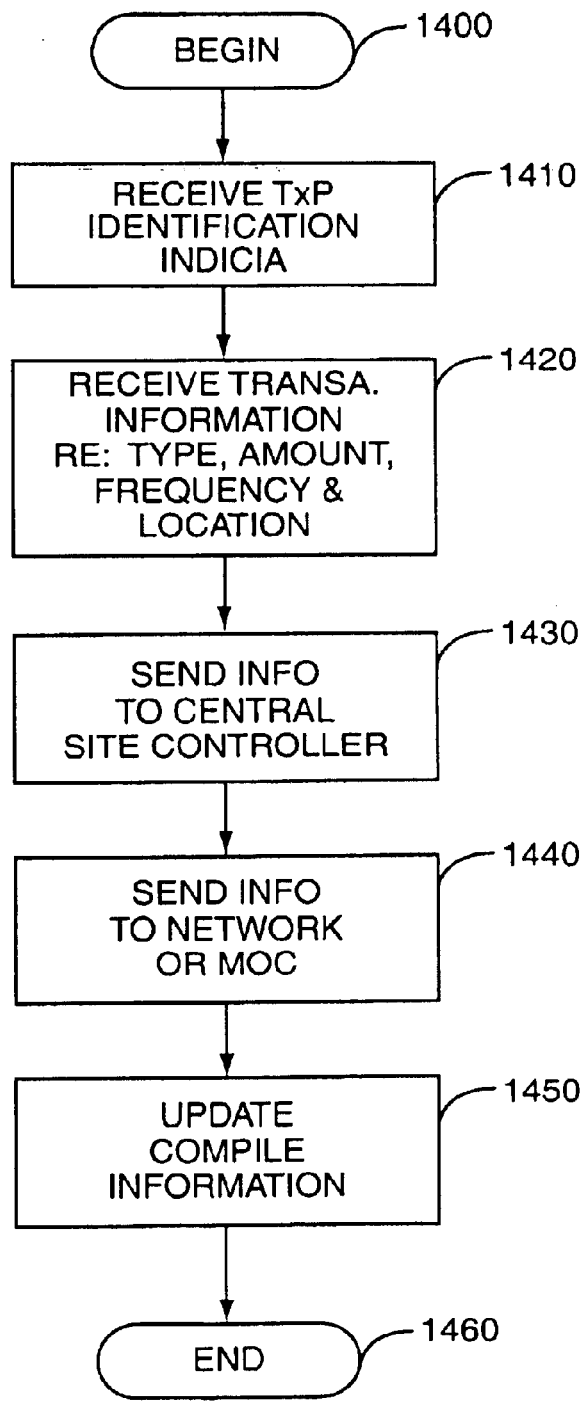
FIG. 25 is a flow chart of a basic process for transaction tracking throughout numerous fueling environments according to the present invention.

The present invention also provides an embodiment adapted to track transponder transactions throughout a number of fueling environments operatively associated with the host network 94. The basic flow of transaction tracking is shown in FIG. 25 wherein a typical fueling operation begins (block 1400) by a transmission from the transponder of transponder identification indicia to the dispenser 1 8 (block 1410). During the transaction, transaction information is received from the transponder and/or gathered by the dispenser and central control systems (blocks 14and 1430). The information received and gathered preferably includes information such as the type of transaction, the dollar amount per transaction, frequency of transactions, and the location of these transactions. The information gathered by the central control system 50 may be relayed to the host network or major oil company network 94 (block 1440). The information is updated and compiled at the host network (block 1450) to enable study of customer activities and transactions. This information is very valuable in advertising and merchandising in the fueling environment. Once the information is compiled at the network 94, the process is ended (block 1460).

Customer Preferences

The present invention may also provide a feature adapted to personalize a fueling operation on a customer-by-customer basis. The dispenser 18 will interrogate the transponder and receive customer preferences or an ID, which will allow the dispenser or associated control system to access customer preferences, early in the fueling operation. Preferably, the information is accessed as the customer approaches the dispenser to enable the dispenser and associated systems to provide the customer with a personalized greeting, pre-selected information, such as news, traffic, weather, scores or stock reports in addition to providing customer selected advertising, merchandising or entertainment presentations. Typically, a customer fills out information relating to the types of information, greetings and multimedia presentations he or she would be interested in receiving during a fueling operation. The information is entered into a database associated with the transponder ID or actually stored on the transponder in a format capable of instructing the dispenser or central control system accordingly.

Figure 26A:
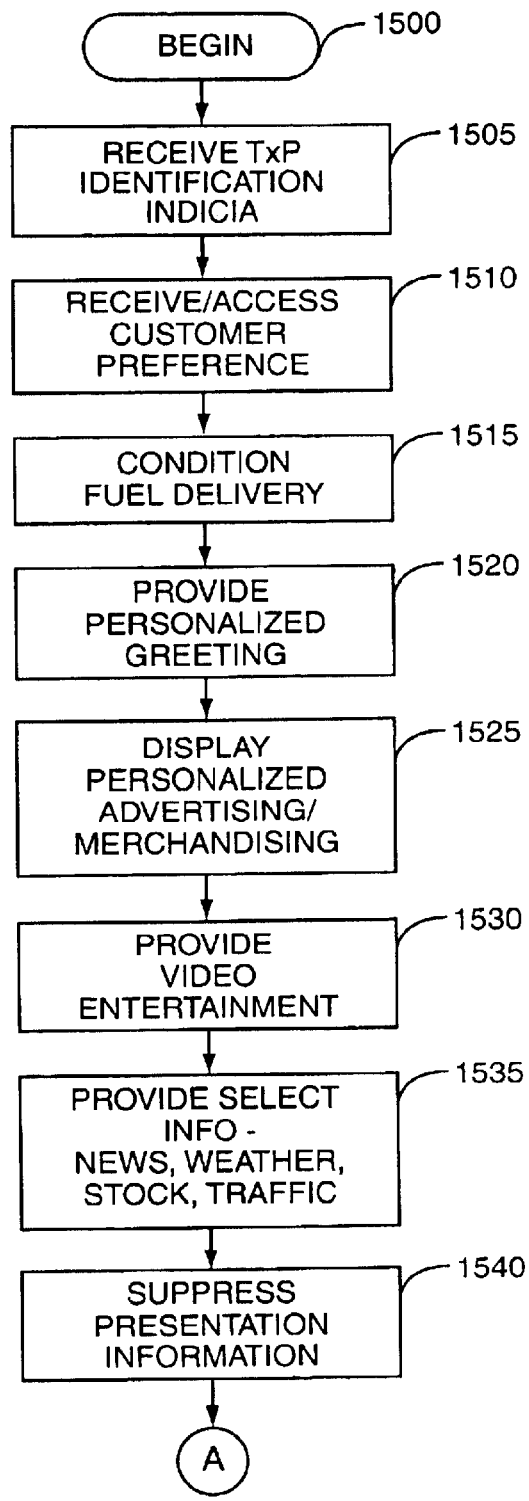
FIGS. 26A and 26B are a flow chart of a basic process for providing predefined preferences to a customer during a transaction made in association with a transponder according to the present invention.
Figure 26B:
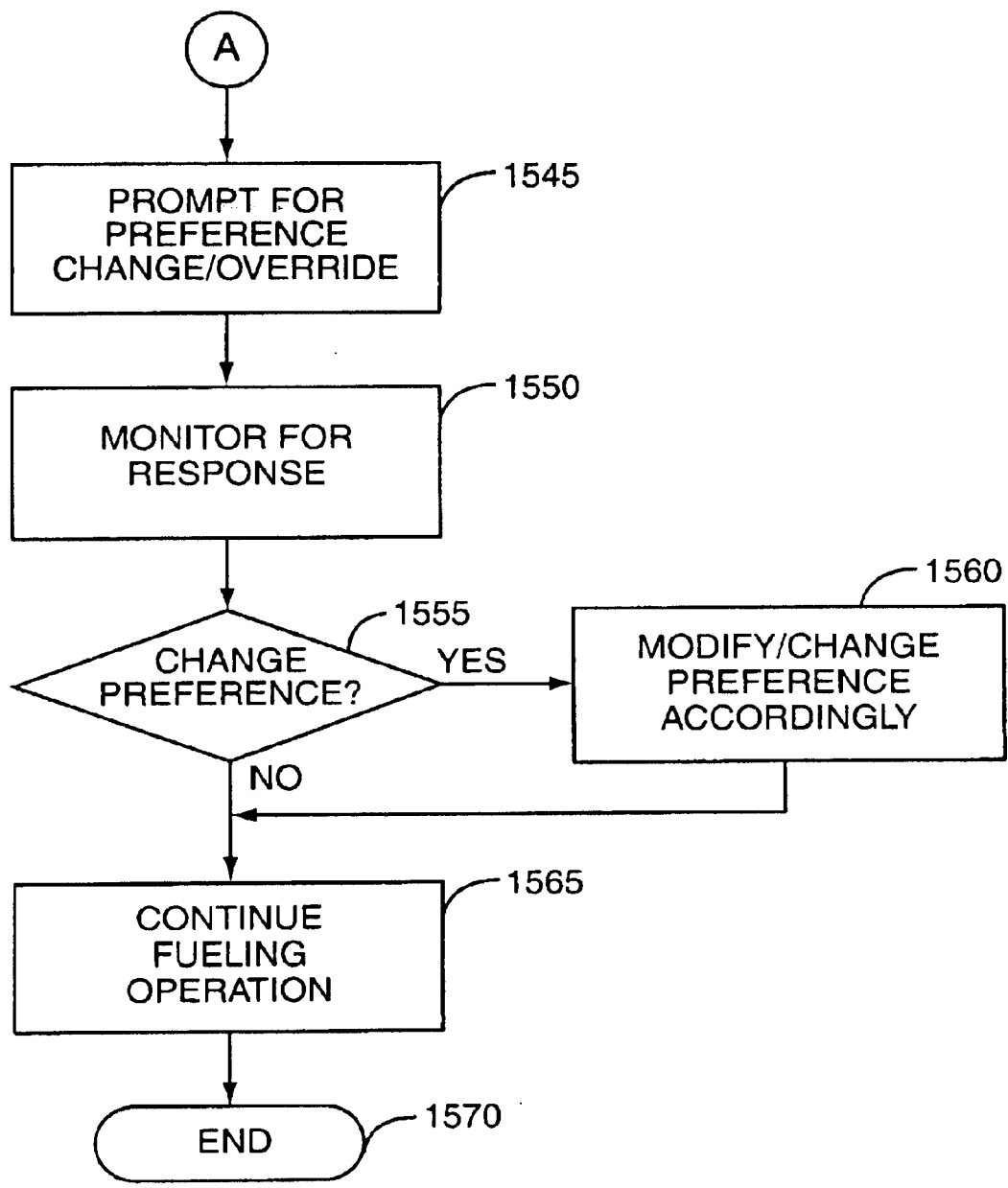

Reference is directed to FIGS. 26A and 26B. Once the customer preference information is in place, fueling processes will begin (block 1500) wherein the dispenser 18 receives transponder identification indicia (block 1505). The dispenser 18 will cooperate with the central control system 50 and remote network 94 as necessary to receive and access customer preferences. Alternatively, the preferences may be downloaded from the transponder directly. The preferences may precondition fuel delivery (block 1515) by selecting the desired type of fuel and fuel grade, and providing a personalized greeting (block 1520). The greeting may be configured to visually and/or audibly provide a message such as "good morning" or "good afternoon Mr. Hartsell." Additionally, a customer may have selected preferences as to the type of advertising and merchandising provided by the display 100 and audio/video electronics 86.

The advertising may come from a dedicated auxiliary audio/video source 156, such as a laser disk player or digital video disk (DVD) as well as via the remote network 94. The network 94 may be associated with the Internet. The Internet provides a wide range of multimedia capabilities to the fueling environment relating to remote control and information dissemination. Attention is drawn to U.S. patent application Ser. No. 08/896,988 for INTERNET CAPABLE BROWSER DISPENSER ARCHITECTURE, filed Jul. 18, 1997, in the name of Russel D. Leatherman et al. The disclosure of this application is incorporated herein by reference.

Similarly, the customer may elect to receive audio/video entertainment (block 1530), such as brief videos or music provided to make the customer's visit to the fueling environment more pleasurable. Additionally, the customer may elect to receive a wide variety of information relating to news, weather, scores, stock updates and traffic reports, just to name a few of the types of information available (block 1535). As noted, this information may be gathered and distributed locally by the central control system 50 or accessed via the remote network 94. Associating the central site control system with the Internet will allow significant access to various types of information.

Given the tremendous amount of information capable of being provided at the dispenser based on customer selection or independent merchandising, the present invention also provides for suppressing the presentation of certain information as desired by the customer (block 1540). For example, certain customers may not want to receive advertisements for tobacco products, alcoholic beverages or snack products. Preferably, any of the information may be suppressed upon customer election and use of the transponder.

In addition to suppressing available information, a customer is also provided the ability to change or override a preference previously elected during initial setup (block 1545). Typically, the customer is queried via a prompt on the video display 100 of the dispenser 18 to change or override a certain preference. Upon receiving customer input via the key pad 102, 104, the dispenser control system 80 (possibly in conjunction with the central control system 50) will override and/or change the information provided on the display 100. Changing the preference may include providing a customer with a menu of available information display options. Thus, the dispenser control system 80 will monitor the key pad 102, 104 for a customer response (block 1550). If the customer responds accordingly (block 1555), the preference is modified or changed (block 1560) by simply canceling the preference or selecting a new preference from a displayed menu. The preference may be made temporarily or permanently by updating the database and/or sending an appropriate control signal to the transponder. After the preference is changed, the dispenser will operate to continue the fueling operation (block 1565) until the operation comes to an end (block 1570). If the customer does not elect to change a predefined preference, the dispenser control system 80 will simply continue fueling until the end of the fueling operation (blocks 1565 and 1570). The dispenser may recognize other preferences to precondition the fuel dispenser for the impending fueling operation, including selecting a card type, payment method, account type, or other related transaction information to prepare the dispenser for fueling and carrying out the transaction. The customer may also elect to receive specific types of advertising and merchandising. Based on these elections, system operators may provide additional independent but targeted advertising and merchandising.

Preventing Fueling of Unauthorized Containers

Figure 27:
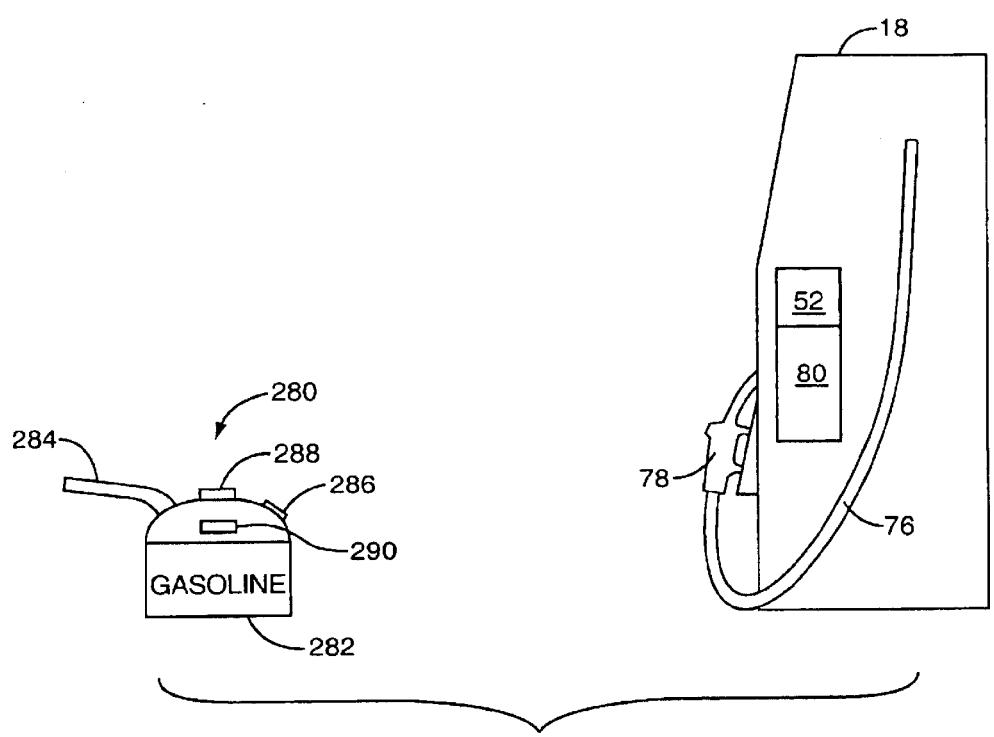
FIG. 27 is a schematic representation of a fuel dispenser and fuel container for personal transport of fuel.

The present invention may also provide for ensuring a container is proper for receiving and carrying fuel delivered by the dispenser 18. With reference to FIG. 27, a dispenser 18 is shown having a delivery hose 76 and nozzle 78 for delivering fuel to a vehicle or other acceptable container 280. Preferably, the container 280 is a fuel container manufactured to reduce the risk of igniting the fuel carried therein. The container 280 includes a body 282 having a spout 284, filling aperture 286, handle 288 and a transponder 290. Although active or passive transponders are acceptable for this aspect of the invention, a passive transponder, acting as a true transponder, is preferable. The transponder 290 is designed to reflect an interrogation signal sent from the dispenser interrogator 52 under the control of the dispenser control system 80. Upon receiving the interrogation signal, the transponder 290 will transmit a signal indicative of the type of container and whether that container is acceptable for carrying fuel.

Figure 28:
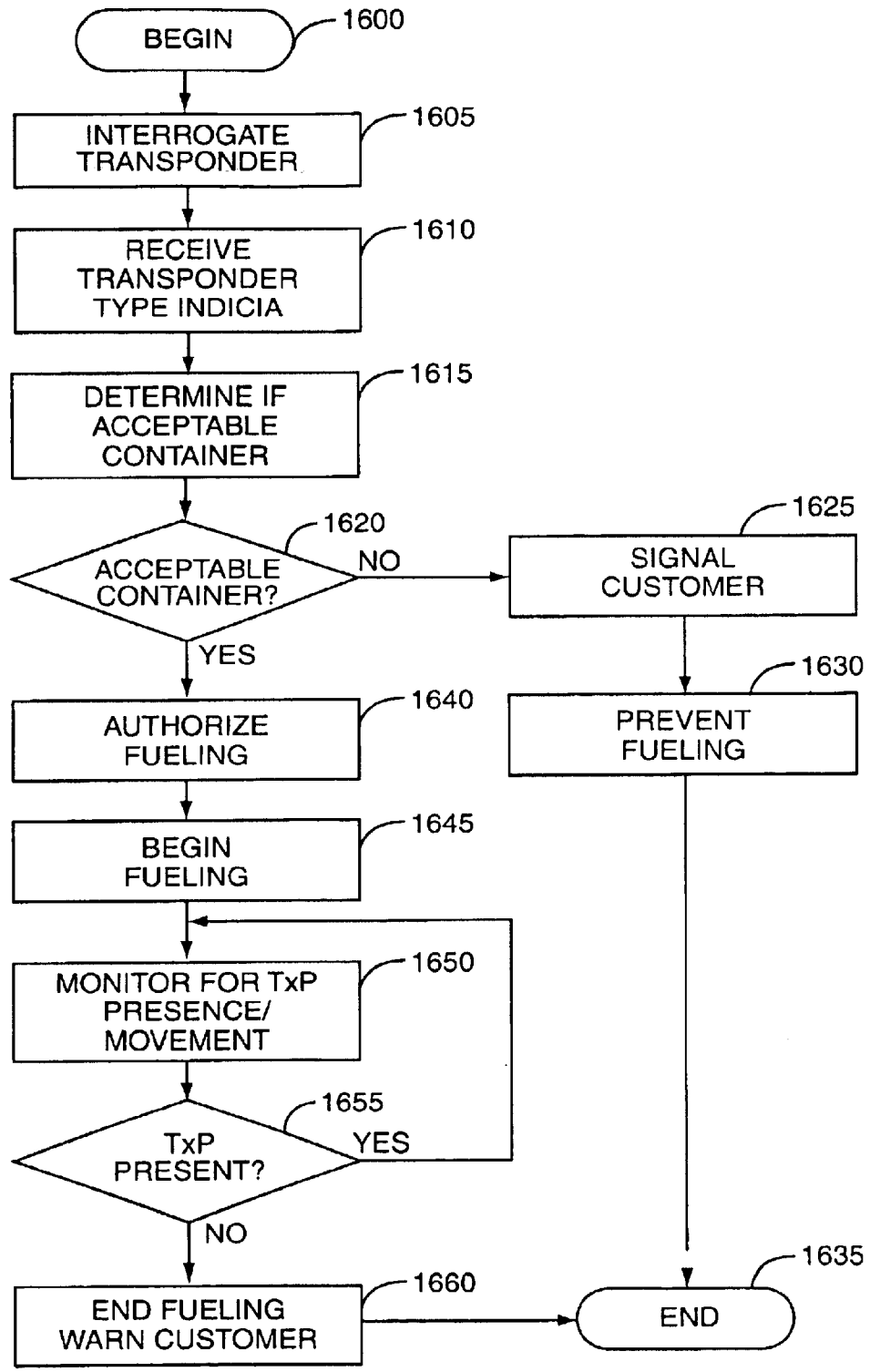
FIG. 28 is a flow chart of a basic process for monitoring and detecting acceptable containers for fueling.

Attention is drawn to the flow chart of FIG. 28 depicting the basic process of monitoring and detecting acceptable containers for fueling. At the beginning of the process (block 1600), the dispenser control system 80 will cause the dispenser interrogator 52 to transmit an interrogation signal in order to interrogate the transponder 290 (block 1605). When a transponder is within the interrogation field, it will transmit a signal in response to the interrogation signal. The dispenser interrogator 52 will receive this transponder signal, which typically includes indicia of the transponder type or an identification indicia allowing the controller to access a database to determine the type of transponder in communication with the dispenser (block 1610). The transponder may indicate that it is a personal transponder carried by the person, such as a card or key fob, a vehicle-mounted transponder or, in this particular instance, a stand-alone fuel container. Whether the transponder signal directly indicates the type of container being fueled or a database is accessed based on the transponder ID, the dispenser control system 80 or an associated control system is adapted to determine if the container is acceptable for receiving fuel (block 1615). The transponder indicia or database may also indicate the type or grade of fuel for the particular container.

If the container is not an acceptable container (block 1620), the dispenser control system 80 will provide an audible or visual signal to the customer and/or operator indicating that the container is not acceptable for receiving fuel (block 1625). The dispenser control system 80 will also act to prevent fueling by deactivating the pump and fueling electronics (block 1630) and the process ends (block 1635). If the control systems determine that the transponder is in an acceptable container (block 1620), fueling is authorized (block 1640) and fuel delivery begins (block 1645). A proper container may be a vehicle fuel tank wherein the vehicle-mounted transponder 64 will enable the control system to recognize the vehicle as an acceptable container. In certain embodiments, the vehicle transponder 64 may be mounted on or near the vehicle's fill neck.

Preferably, the dispenser will continue communications with the transponder to ensure that the transponder remains present during the fueling operation and, optionally, the dispenser may monitor movement of the transponder during this fueling operation (blocks 1650 and 1655). If no movement is detected and the transponder is present throughout fueling, the operation will end once the container is full and the customer stops fueling. If the transponder is moved or leaves the presence of the interrogation field, fueling is brought to a halt (block 1660 and 1635). If the transponder is moved and/or the dispenser determines that the transponder is no longer present and the fueling operation is in progress, the controller 80 may act to warn or instruct the customer accordingly in addition to halting the fueling operation. If the container 280 stops moving or is brought back to a proper fueling location, the dispenser 18 may be adapted to continue fueling as part of the same transaction. The proximity or location monitoring features of this aspect of the invention are discussed in greater detail above.

Restricting fueling to authorized containers in the manner described above greatly reduces the risk of severe bodily injury or death, not to mention substantial property damage that can occur when highly flammable fuels are carried in improper containers. In the preferred embodiment, the addition of a small passive transponder to a fueling container is minimal and modifying a dispenser 18 having an existing interrogator is basically updating software to recognize the information received from the transponder during interrogation. Notably, although a classical transponder is the preferred embodiment, as noted earlier in the specification, a transponder is used in a most generic sense and is deemed to include remote communication units having a receiver, a transmitter, or a combination thereof.

Pre-transaction Estimates

The present invention may also provide pre-transaction estimates of the amount of fuel required to fill the vehicle's tank along with the estimated total cost of filling the vehicle. This embodiment requires a vehicle-mounted transponder operatively associated with a vehicle control system or, at a minimum, the vehicle's fuel tank in a manner wherein the transponder is able to receive or determine information relating to fuel tank ullage. The ullage information may include the amount of fuel required to fill the tank, tank size and/or the quantity of fuel remaining in the tank. This information may be passed to the transponder and then to the dispenser, or used to generate data to be communicated to the dispenser. Ullage information is any type of information which relates to tank ullage or from which ullage can be derived. The ullage here refers to the volume of the tank which can receive additional fuel.

Figure 29A:
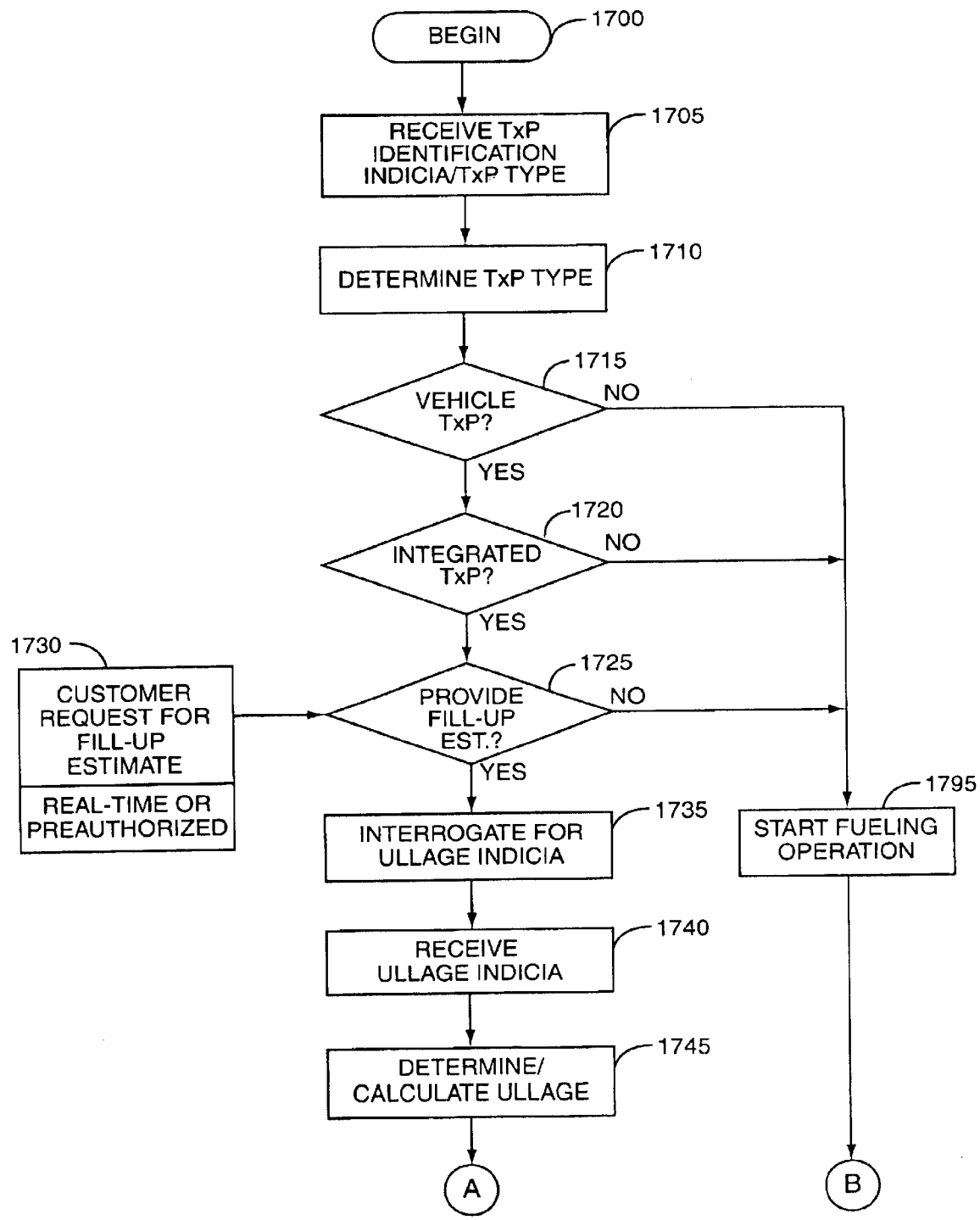
FIGS. 29A and 29B are a flow chart of a basic process for providing pre-transaction estimates according to the present invention.
Figure 29B:
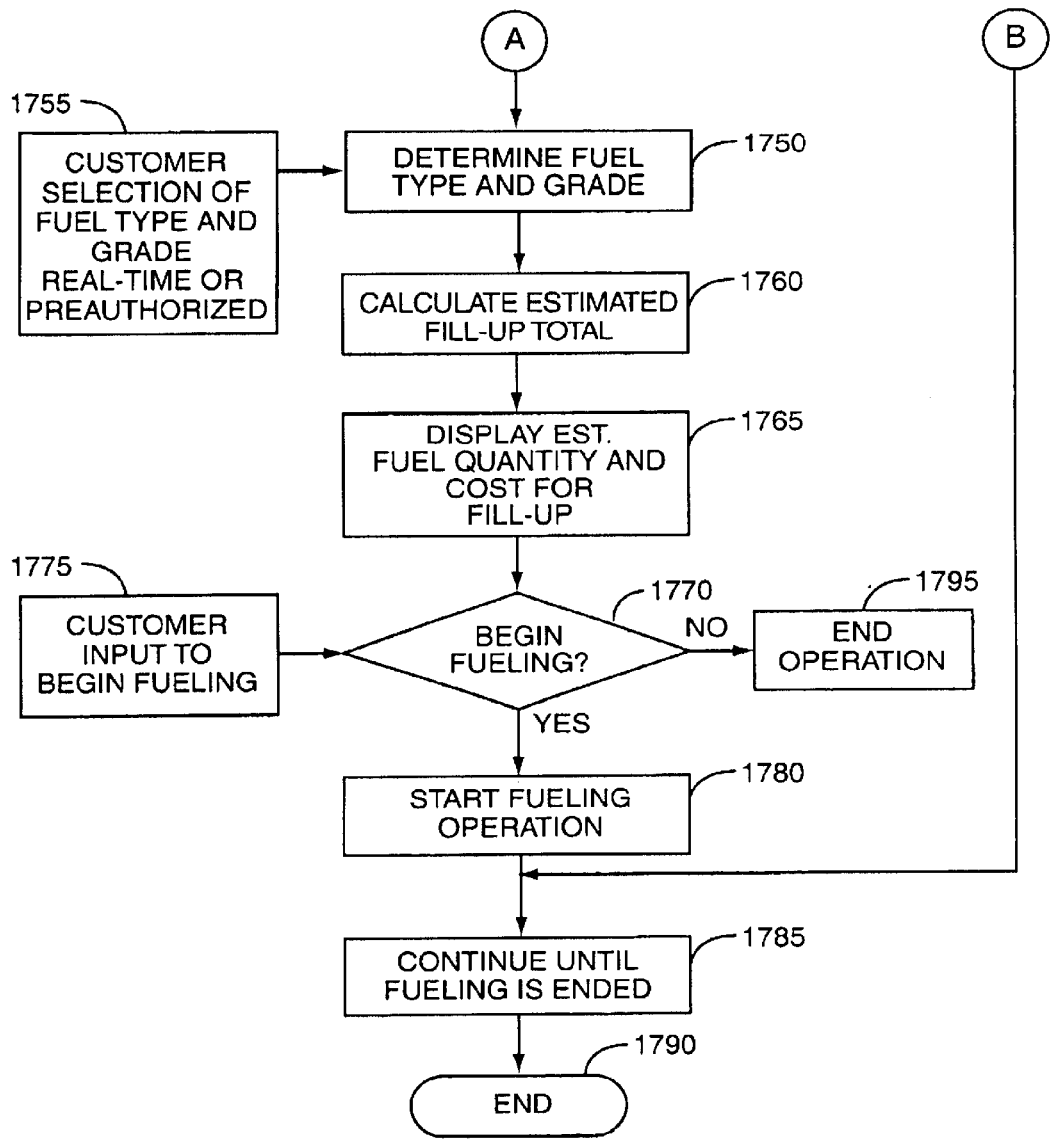

Referring now to FIGS. 29A and 29B, the basic process of providing customer pre-transaction estimates with a vehicle transponder is shown. The process begins (block 1700) when a customer drives up to a fueling operation and the associated transponder is interrogated by the dispenser interrogator 52 under the control of the dispenser control system 80. Generally, the transponder will return identification indicia (block 1705). The transponder may also return indicia indicating the transponder type. Alternatively, the transponder type may be included in the transponder identification indicia or sent separately to enable the dispenser control system 80 or other associated control system to determine the transponder type.

As discussed above, determining the type of transponder is helpful in many situations, such as determining whether a container is authorized for receiving fuel or allowing a personal transponder to leave the immediate fueling position during a fueling operation, while acting to prevent a vehicle-mounted transponder from leaving the fueling position. The dispenser control system 80 or associated control system may also use the transponder identification indicia to access a database correlating the type of transponder with the identification indicia. Distinguishing transponder types is discussed in detail in U.S. patent application Ser. No. 08/966,237 filed Nov. 7, 1997, in the name of William S. Johnson, Jr. and entitled TRANSPONDER DISTINCTION IN A FUELING ENVIRONMENT, the disclosure of which is incorporated herein by reference.

Regardless of the type of identification indicia transmitted to the dispenser 18, the dispenser control system 80 (in cooperation with other control systems, if necessary) determines the transponder type (block 1710). Next, it is determined whether the transponder communicating with the dispenser is a vehicle transponder (block 1715). If it is not, the fueling operation will proceed (block 1795) and continue until fueling has ended (block 1785), wherein the process comes to an end (block 1790).

If the transponder is a vehicle transponder (block 1715), it is determined whether or not the vehicle transponder is an integrated transponder capable of accessing ullage information (block 1720). This information is preferably derived from the transponder identification indicia and transponder type information transmitted to the dispenser. However, any manner of communicating this information to the dispenser is acceptable and within the inventive concept of the present invention. If the transponder is vehicle-mounted but not integrated to obtain ullage information, the fueling operation will start (block 1795) and continue until fueling has ended (block 1785) wherein the process is ended (block 1790).

If it is determined that the transponder is integrated and adapted to provide ullage information (block 1720), the dispenser must determine whether the customer wants an estimate of the transaction amount (block 1725). Typically, the estimate will be associated with completely filling the vehicle's fuel tank. The customer may provide a request for the fill-up at the dispenser by entering a response on the key pad 102 based on a prompt or query displayed on the display 100 (block 1730). Alternatively, the transponder may relay information during communications with the dispenser indicating that the customer has pre-authorized the dispenser to calculate an estimate associated with fueling the vehicle (block 1730).

If the ullage information has not already been received during initial interrogation, the dispenser interrogator 52 will interrogate the transponder 64 for the ullage indicia (block 1735) and receive the ullage indicia accordingly (block 1740). Based on the ullage indicia, the dispenser control system 80 or associated control system will determine or calculate the vehicle's tank ullage based on the ullage indicia received (block 1745).

The ullage indicia may include the exact ullage value representing the amount of fuel required to fill the tank, or the ullage indicia may indicate tank volume and the amount of gas currently present in the tank, wherein the control system will run the appropriate calculations to determine ullage. In yet another embodiment, the ullage information may simply include vehicle identification and remaining fuel indicia, and the control system will access a database at the central control system 50 or at the remote network 94 storing information relating to tank size for the identified vehicle. Those of ordinary skill in the art will quickly recognize various ways of obtaining ullage information. These ways are considered within the scope of this disclosure and any related claims which follow.

Once ullage is determined, the control system preferably determines or calculates an estimated cost of fueling the vehicle based on the ullage information. In order to do so, the type of fuel and fuel grade must be determined (block 1750). The dispenser controller may provide a prompt at the display 100 for the customer to select the type of fuel and grade desired for fueling (block 1755). Alternatively, the initial information received from the transponder may provide information on the type and grade of fuel desired for fueling, and the associated control system will determine fuel type and grade accordingly (blocks 1750 and 1755).

Once tank ullage and the type and grade of fuel are determined, the associated control systems will calculate the estimated cost for filling the vehicle (block 1760) by multiplying the ullage value by the fuel cost. Preferably, the estimated fuel quantity and the cost for fueling the vehicle with the selected type and grade is displayed to the customer on the display 100 (block 1765). At this point, the customer is given the option to continue with fueling. The customer may, for example, be provided with a prompt to begin fueling (block 1770) wherein the customer will respond by pressing a key on the key pad 102 (block 1775). If the customer elects not to fuel based on this information, the fueling operation is ended before it ever begins (block 1795). If the customer elects to continue fueling, the dispenser will start the fueling operation (block 1780) and continue fueling until the tank is full or the customer otherwise ends the operation (block 1785) wherein the process comes to an end (block 1790).

Determining estimated fueling totals benefits customers in many ways, especially customers wanting to pay cash at the dispenser using the cash acceptor 90 (shown in FIG. 3). As noted earlier, the difficulty with cash acceptors is providing the customer with the proper change when the amount of fuel purchased is less than the dollar amount placed in the cash acceptor. Providing an estimated amount required to fill the vehicle tank will allow the customer or dispenser to calculate a dollar amount which will not exceed an amount required to fill the vehicle. For example, the dispenser may determine that it will take $21.60 worth of premium, unleaded gasoline to fill the vehicle tank. If the customer only has two ten-dollar bills and a five-dollar bill, the customer will know that if the two ten-dollar bills are placed in the cash acceptor, he will come substantially close to maximizing the amount of fuel delivered to the vehicle without needing change.

Although the customer can elect to purchase any amount of fuel, it is often beneficial to determine how much fuel the vehicle will accept before determining how much fuel one wishes to purchase. In certain applications, the cash acceptor could be monitored to determine the amount of cash received and take appropriate action if the estimated filling total could not meet or exceeded that amount. In summary, the dispenser associated control system may determine if change is necessary, based on the ullage information, the fuel selected and the amount of cash received by the cash acceptor.

Figure 30:
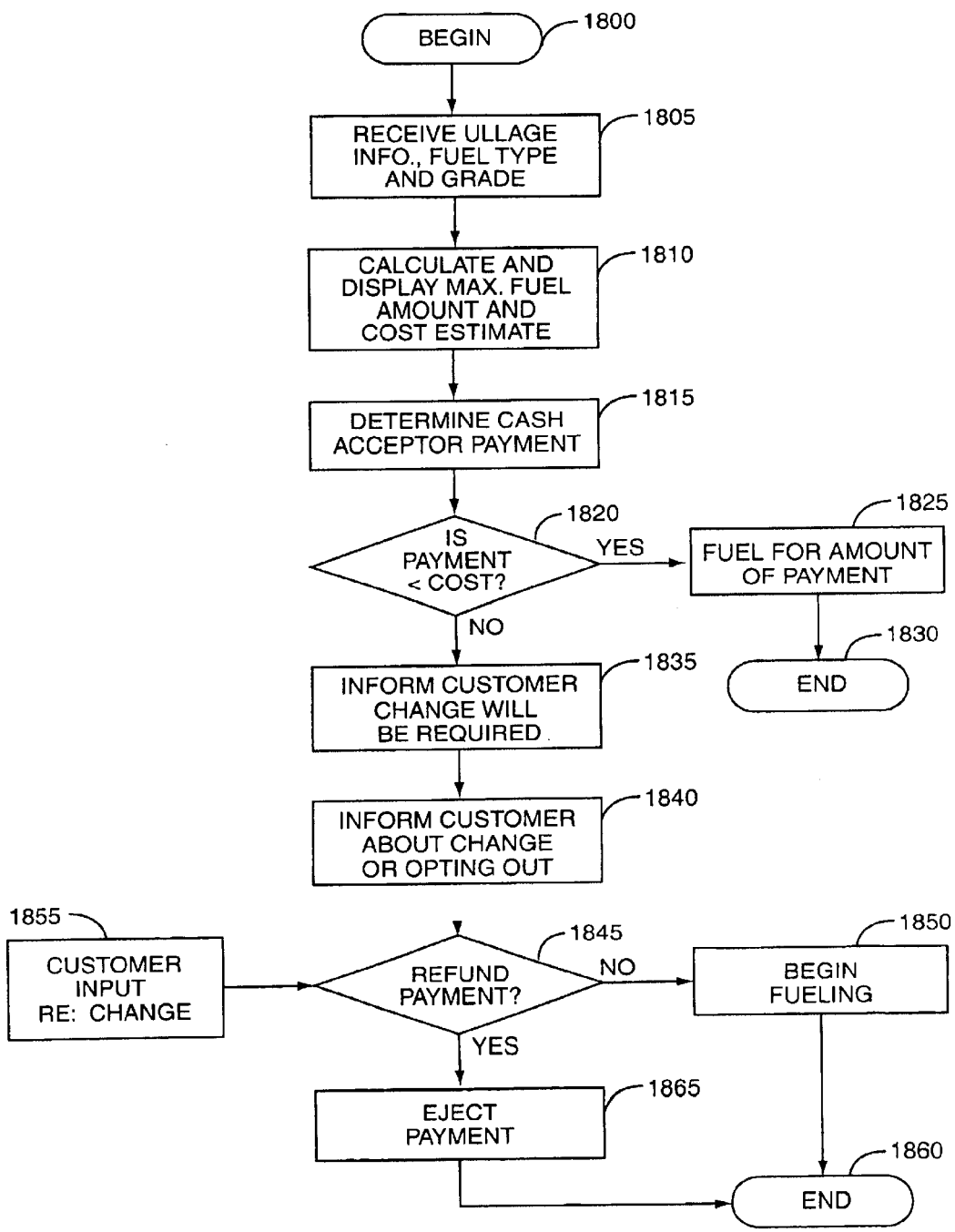
FIG. 30 is a flow chart of a basic process for providing a customer with estimated cost totals of a fueling transaction to enable a customer to make an informed decision regarding payment at a cash acceptor of a fuel dispenser.

Attention is drawn to FIG. 30 wherein a process is shown for providing a customer with estimated cost totals in order to make decisions on the amount of cash to enter into a cash acceptor for payment. The process begins (block 1800) where the dispenser control system 80 receives ullage information, fuel type and grade as discussed above (block 1805). Based on this information, the amount of fuel necessary to fill the vehicle and a corresponding cost estimate is calculated and displayed to the customer (block 1810). The customer may make fueling decisions based on this information, such as deciding what type of payment to make or how much fuel to purchase.

Assuming the customer is using a cash acceptor, the dispenser control system 80 will operate in conjunction with the cash acceptor 90 to determine the amount of cash payment (block 1815). If the payment made is less than the estimated cost of fueling (block 1820), then the dispenser control system 80 will allow fueling for the amount of payment (block 1825) until the operation is ended (block 1830). If the customer has placed more cash in the cash acceptor than necessary to completely fuel the vehicle (block 1820), the dispenser control system 80 will act to inform the customer that change will be required, preferably, using the display 100 (block 1835). The dispenser control system 80 will next prompt the customer using the display 100 on how to receive change (block 1840). The customer may be required to receive credit on his or her transponder or go into the station store and obtain change at one of the transaction terminals, just to point out a couple of options. Additionally, the dispenser may provide a customer with the choice to opt out of the transaction (also block 1840). The dispenser control system 80 will determine whether or not to refund the customer's initial payment (block 1845) based on a customer input received at key pad 102 (block 1855). If a refund of the payment is not desired and the customer chooses to receive change by other means, fueling will begin (block 1850) until the process ends (block 1860). If a refund is requested by the customer (blocks 185and 1845), the dispenser control system 80 will cause the cash acceptor 92 to eject the customer payment (block 1865) and the process is ended (block 1860). Those skilled in the art should quickly recognize the added benefit in providing customer information before fueling relating to the amount of the potential fuel purchased, especially in light of the difficulties in receiving change associated with cash acceptors.

It should be recognized that the various aspects discussed herein can be mixed and matched to provide a fueling environment with various combinations of capabilities. Each aspect was discussed individually in order to provide a more clear disclosure. Furthermore, the various flow charts and processes disclosed herein generally represent programs which are stored in memory and run on an associated controller. Given the shared control responsibilities between the dispenser control systems and the central control system in a typical fueling environment, the control systems defined in the claims that follow are to be construed as including control features provided by dispenser control systems, central control systems and remote network control systems, alone or in combination. Those skilled in the art will recognize the tremendous flexibility in providing the various control aspects throughout the numerous control systems (including remote networks) in and outside of the fueling environment. Certain modifications and improvements will occur to those skilled in the art upon a reading of the foregoing description. It should be understood that all such modifications and improvements have been deleted herein for the sake of conciseness and readability, but are properly within the scope of the following claims.

What is claimed is:

1. A system for providing a predefined parameter defining a transaction guideline or limitation in association with a customer's remote communication unit comprising:
   a) wireless communication electronics adapted to receive signals including indicia from a remote communication unit associated with the customer, said wireless communication electronics positioned inside a cabinet of a fuel dispenser;
   b) a transaction interface for carryout of transactions initiated by the customer;
   c) a control system and memory associated with said communication electronics and said transaction interface; and
   d) said control system adapted to receive said indicia from said remote communication unit in response to an interrogation initiated by said control system and control a transaction at said transaction interface involving said remote communication unit according to the customer's redefined parameter defining a transaction guideline or limitation associated with said remote communication unit, wherein said customer's predefined parameter defining a transaction guideline or limitation limits a transaction to a select type of fuel to be dispensed from the fuel dispenser.

2. The system of claim 1 wherein said control system includes a dispenser control system located within the fuel dispenser.

3. The system of claim 2 wherein said control system includes a central site control system located apart from the fuel dispenser.

4. The system of claim 1 wherein said wireless communication electronics are integrated into a face of the fuel dispenser.

5. The system of claim 1 wherein said wireless communication electronics are secured to a front face of the fuel dispenser.

6. A system for providing a predefined parameter defining a transaction guideline or limitation in association with a customer's remote communication unit comprising:

a) wireless communication electronics adapted to receive signals including indicia from a remote communication unit associated with the customer, said wireless communication electronics positioned within a cabinet of a fuel dispenser;

b) a transaction interface for carryout of transactions initiated by the customer;

c) a control system and memory associated with said communication electronics and said transaction interface; and d) said control system adapted to receive said indicia from said remote communication unit in response to an interrogation initiated by said control system and control a transaction at said transaction interface involving said parameter defining a transaction guideline or limitation associated with said remote communication unit;

wherein said customer's predefined parameter defining a transaction guideline or limitation limits a transaction to a select grade of fuel.

7. An interrogation system associated with a fuel dispensing system for enforcing a predefined parameter defining a transaction guideline or limitation associated with a customer's remote communication unit, said system comprising:

a) a customer transaction interface associated with an interrogator for communicating with a remote communication unit associated with the customer; and b) a control system and memory associated with said interrogator;

said control system adapted to interrogate said remote communication unit with said interrogator during a transaction and control said transaction according to the customer's predefined parameter defining a transaction guideline or limitation associated with said remote communication unit;

c) said interrogator positioned within a cabinet of said fuel dispenser.

8. The system of claim 7 wherein said predefined parameter defining a transaction guideline or limitation is stored in said memory in association with the interrogated remote communication unit and said control system is adapted to access said predefined parameters and control the transaction accordingly.

9. The system of claim 7 wherein the predefined parameter defining a transaction guideline or limitation is transmitted to the control system through said interrogator from said remote communication unit and said control system is adapted to receive the predefined parameters and control the transaction according to the predefined parameters.

10. The system of claim 7 wherein said control system includes a dispenser control system in a fuel dispenser including said customer transaction interface.

11. The system of claim 7 wherein said control system further includes a central site control system located apart from said fuel dispenser.

12. The system of claim 7 wherein said interrogator is integrated into a face of the fuel dispenser.

13. The system of claim 7 wherein said interrogator is secured to a front face of the fuel dispenser.

14. A system for providing a predefined parameter defining a transaction guideline or limitation in association with a customer's remote communication unit comprising:

a) wireless communication electronics adapted to receive signals including indicia from a remote communication unit associated with the customer, said wireless communication electronics positioned above a fuel dispenser;

b) a transaction interface for carryout of transactions initiated by the customer;

c) a control system and memory associated with said communication electronics and said transaction interface; and e) said control system adapted to receive said indicia from said remote communication unit in response to an interrogation initiated by said control system and control a transaction at said transaction interface involving said remote communication unit according to the customer's predefined parameter defining a transaction guideline or limitation associated with said remote communication unit, wherein said customer's predefined parameter defining a transaction guideline or limitation limits a transaction to a select type of fuel to be dispensed from the fuel dispenser.

* * * * *